(12) United States Patent
Shinohara et al.

(10) Patent No.: US 8,836,853 B2
(45) Date of Patent: Sep. 16, 2014

(54) BODY STRUCTURE OF IMAGING APPARATUS

(75) Inventors: Junichi Shinohara, Yokohama (JP); Atsushi Sato, Yokohama (JP); Ryota Kaga, Tokyo (JP); Takashi Tada, Kawasaki (JP); Shu Kambe, Fujisawa (JP); Norihiro Yoshida, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 628 days.

(21) Appl. No.: 13/128,511

(22) PCT Filed: Nov. 26, 2009

(86) PCT No.: PCT/JP2009/070264
§ 371 (c)(1),
(2), (4) Date: May 10, 2011

(87) PCT Pub. No.: WO2010/061960
PCT Pub. Date: Jun. 3, 2010

(65) Prior Publication Data
US 2011/0216237 A1 Sep. 8, 2011

(30) Foreign Application Priority Data

Nov. 26, 2008 (JP) ................................. 2008-300423
Sep. 1, 2009 (JP) ................................. 2009-201201
Nov. 4, 2009 (JP) ................................. 2009-252578

(51) Int. Cl.
*H04N 5/225* (2006.01)
*G03B 17/02* (2006.01)
*H04N 5/232* (2006.01)

(52) U.S. Cl.
CPC .............. *G03B 17/02* (2013.01); *H04N 5/2252* (2013.01); *H04N 5/23209* (2013.01)
USPC ........................................................ 348/373

(58) Field of Classification Search
USPC ............ 348/211.8, 333.01, 333.05, 376, 373; 345/173
See application file for complete search history.

(56) References Cited

U.S. PATENT DOCUMENTS 4,945,368 A 7/1990 Ishino et al.
5,070,356 A 12/1991 Nakamura et al.
(Continued)

FOREIGN PATENT DOCUMENTS

EP 0 422 447 A2 4/1991
JP 3-117181 A 5/1991
(Continued)

*Primary Examiner* — Trung Diep
(74) *Attorney, Agent, or Firm* — Dickstein Shapiro LLP

(57) ABSTRACT

A camera body (1) of the present invention is provided with a concave portion (1A) in which an imaging unit (2) including a rectangular solid shaped case (2a) having an optical system and an imaging device is detachably disposed. When the case (2a) is viewed from a front side in a state where the case (2a) is disposed in the concave portion (1A), the camera body (1) includes a back face portion (1B) having a back face wall (4) located on the back of the case (2a) and facing a back face of the case (2a), a side face portion (1C) having a side face wall (6) facing a side face of the case (2a), and an upper face portion (1D) having an upper face wall (5) facing an upper face of the case (2a). The concave portion (1A) is defined by the back face wall (4), the side face wall (6), and the upper face wall (5), and is open on three sides where the remaining faces of the case (2a) are located at the time of attachment.

11 Claims, 43 Drawing Sheets

(56) References Cited

U.S. PATENT DOCUMENTS

| | | |
|---|---|---|
| 5,150,143 A | 9/1992 | Ohno et al. |
| 5,192,860 A | 3/1993 | Shinohara et al. |
| 5,192,964 A | 3/1993 | Shinohara et al. |
| 5,270,755 A | 12/1993 | Ohno et al. |
| 5,293,034 A | 3/1994 | Ohno et al. |
| 5,309,190 A | 5/1994 | Shinohara et al. |
| 5,606,420 A | 2/1997 | Maeda et al. |
| 5,661,823 A | 8/1997 | Yamauchi et al. |
| 5,682,563 A | 10/1997 | Shinohara et al. |
| 6,020,982 A | 2/2000 | Yamauchi et al. |
| 6,295,139 B1 | 9/2001 | Yamauchi et al. |
| 7,042,495 B2 | 5/2006 | Nakamura |
| 7,106,959 B2 | 9/2006 | Sato |
| 7,259,923 B2 | 8/2007 | Nuno et al. |
| 7,280,147 B2 | 10/2007 | Kitajima et al. |
| 7,286,164 B2 | 10/2007 | Shinohara et al. |
| 7,301,579 B2 | 11/2007 | Shinohara et al. |
| 7,365,790 B2 | 4/2008 | Shinohara |
| 7,477,454 B2 | 1/2009 | Shinohara et al. |
| 7,483,056 B2 | 1/2009 | Shinohara et al. |
| 7,637,674 B2 | 12/2009 | Misawa |
| 7,726,890 B2 | 6/2010 | Misawa |
| 2002/0089678 A1 | 7/2002 | Aoto et al. |
| 2003/0043281 A1 | 3/2003 | Nakamura |
| 2003/0164956 A1 | 9/2003 | Aoto et al. |
| 2005/0012846 A1 | 1/2005 | Shinohara et al. |
| 2005/0200737 A1 | 9/2005 | Shinohara et al. |
| 2006/0128429 A1* | 6/2006 | Cha ........................... 455/556.1 |
| 2007/0128429 A1* | 6/2007 | Murphy .................... 428/319.3 |
| 2007/0268371 A1* | 11/2007 | Misawa et al. ........... 348/207.99 |
| 2007/0273786 A1* | 11/2007 | Ahn et al. ..................... 348/373 |
| 2008/0084487 A1 | 4/2008 | Yoshida |

FOREIGN PATENT DOCUMENTS

| | | |
|---|---|---|
| JP | 4-200184 A | 7/1992 |
| JP | 11-32240 A | 2/1999 |
| JP | 11-122565 A | 4/1999 |
| JP | 11-265229 A | 9/1999 |
| JP | 2000-10166 A | 1/2000 |
| JP | 2000-106640 A | 4/2000 |
| JP | 2000-236469 A | 8/2000 |
| JP | 2002-341423 A | 11/2002 |
| JP | 2003-69244 A | 3/2003 |
| JP | 2003-158654 A | 5/2003 |
| JP | 2004-7121 A | 1/2004 |
| JP | 2004-193771 A | 7/2004 |
| JP | 3579403 B2 | 7/2004 |
| JP | 2005-341119 A | 12/2005 |
| JP | 2005-354177 A | 12/2005 |
| JP | 2006-317710 A | 11/2006 |
| JP | 2007-78827 A | 3/2007 |
| JP | 2007-134959 A | 5/2007 |
| JP | 2007-173909 A | 7/2007 |
| JP | 2007-194953 A | 8/2007 |
| JP | 2008-76507 A | 4/2008 |
| JP | 2008-98818 A | 4/2008 |

* cited by examiner

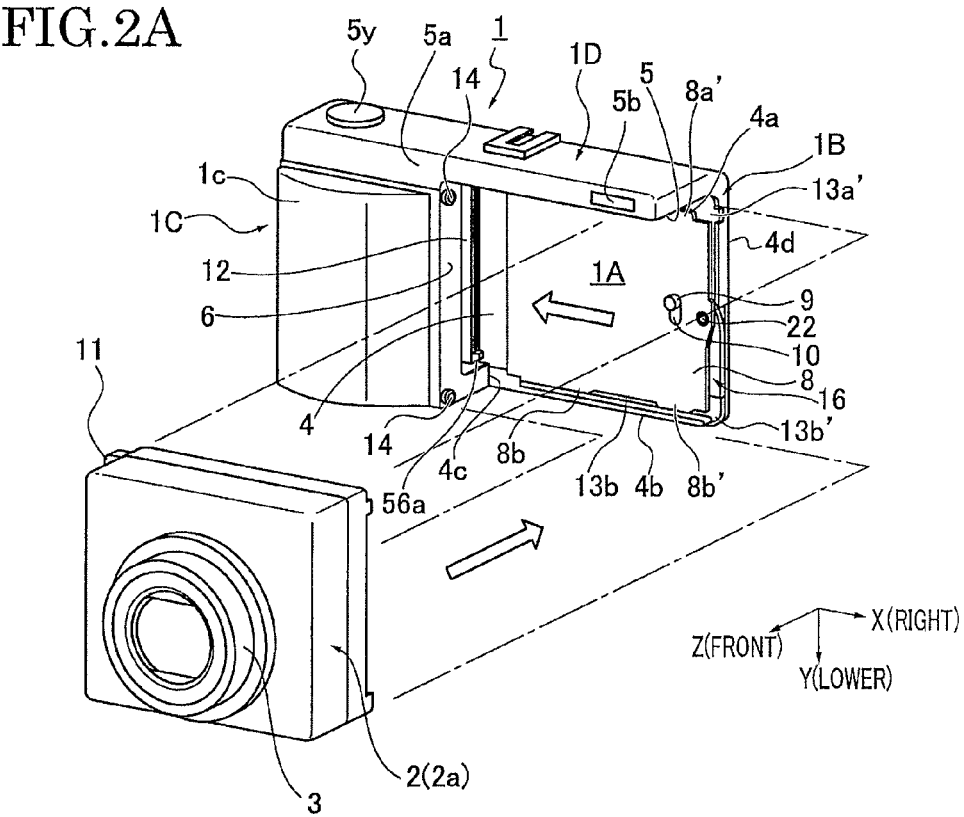
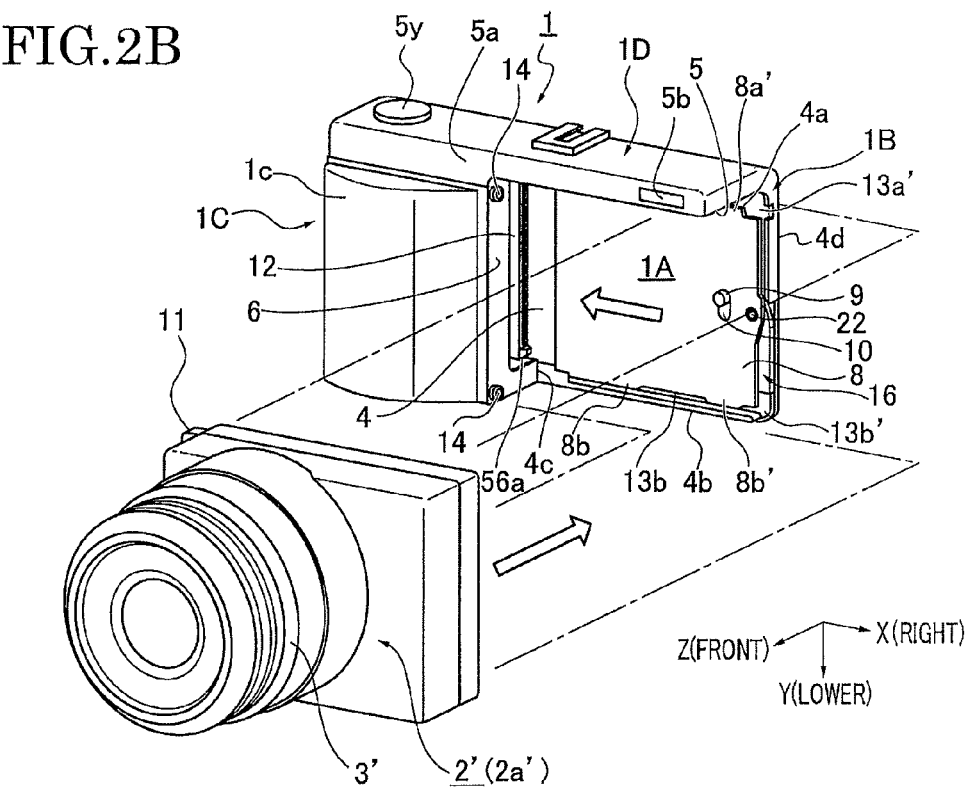

BODY STRUCTURE OF IMAGING APPARATUS

TECHNICAL FIELD

The present invention relates to an improvement in a body structure, for example, a camera body suitable for attaching an imaging unit in an imaging apparatus such as a camera.

BACKGROUND ART

An imaging apparatus in which an imaging unit is detachably attached to a camera body has heretofore been known (for reference, see Japanese Patent Application Publication No. 2007-173909).

In this conventional imaging apparatus, a camera body includes a housing part for attachably and detachably housing an imaging unit. This housing part includes a back wall portion as well as an upper wall portion, a lower wall portion, and one sidewall portion which are integrated with this back wall portion. Accordingly, this housing part is open in a front wall portion and the other sidewall portion, and a fitted portion of the imaging unit can be inserted from this open sidewall portion into the housing part.

On the other hand, the imaging unit can be detached from the camera body by pulling the imaging unit out of the housing part through the open sidewall portion.

SUMMARY OF THE INVENTION

However, according to this conventional imaging system, the housing part is surrounded on four sides by the wall portions, namely, by the back wall portion, the upper wall portion, the lower wall portion, and one of the sidewall portions, and the camera body and the imaging unit are inevitably put into a one-to-one relationship. Therefore, this imaging system has limited design freedom for the shape of the imaging unit.

An object of the present invention is to provide a body structure of an imaging apparatus in which a camera body can be easily combined with various imaging units by making a relationship between the camera body and the imaging units more flexible.

To accomplish the above object, a body structure according to one embodiment of the present invention includes a body portion configured so that an imaging unit is to be attached to and detached from the body portion, the imaging unit including a fitted portion and at least an optical system provided on the fitted portion. The body portion includes a housing part in which the fitted portion of the imaging unit is to be detachably housed, and at least three out of walls that close the housing part are open.

CROSS-REFERENCE TO THE RELATED APPLICATION

This application is based on and claims the priority benefit of each of Japanese Patent Application Nos. 2008-300423 filed on Nov. 26, 2008, 2009-201201 filed on Sep. 1, 2009, 2009-252578 filed on Nov. 4, 2009, the disclosure of which is incorporated herein by reference in its entirety.

BRIEF DESCRIPTION OF THE DRAWINGS

FIG. 2A is an external view showing a separated state of the imaging unit and the camera body to which the present invention is applied, and is a view showing a state where the small-sized imaging unit shown in FIG. 1A is detached from the camera body.

FIG. 2B is a view showing a state where the large-sized imaging unit shown in FIG. 1B is detached from the camera body.

FIGS. 34A and 34B are explanatory views for explaining the receiver, in which FIG. 34A is a schematic diagram of the receiver viewed from a front face side (a positive side in a Z direction) and FIG. 34B is a schematic diagram of the receiver viewed from a back face side (a negative side in the Z direction).

FIGS. 35A and 35B are explanatory views for explaining the received-image transmitter, in which FIG. 35A is a schematic diagram of the received-image transmitter viewed from a front face side (a positive side in a Z direction) and FIG. 35B is a schematic diagram of the received-image transmitter viewed from a side face side (a positive side in an X direction).

FIGS. 38A to 38C are explanatory views for explaining the image reader unit, in which FIG. 38A is a schematic diagram of the image reader unit viewed from a front face side (a positive side in a Z direction), FIG. 38B is a schematic diagram of the image reader unit viewed from a back face side (a negative side in the Z direction), and FIG. 38C is a schematic diagram showing a usage example of the image reader unit.

FIGS. 42A and 42B are explanatory views for explaining the fiberscope unit, in which FIG. 42A is a schematic diagram of the fiberscope unit viewed from a front face side (a positive side in a Z direction) and FIG. 42B is a schematic diagram of the fiberscope unit viewed from a back face side (a negative side in the Z direction).

FIGS. 45A and 45B are explanatory views for explaining the image printing unit, in which FIG. 45A is a schematic diagram of the image printing unit viewed from a front face side (a positive side in a Z direction) and FIG. 45B is a schematic diagram of the image printing unit viewed from a back face side (a negative side in the Z direction).

FIGS. 48A and 48B are explanatory views for explaining the image projection unit, in which FIG. 48A is a schematic diagram of the image projection unit viewed from a front face side (a positive side in a Z direction) and FIG. 48B is a schematic diagram of the image projection unit viewed from a back face side (a negative side in the Z direction).

FIGS. 51A and 51B are explanatory views for explaining the external storage unit, in which FIG. 51A is a schematic diagram of the external storage unit viewed from a front face side (a positive side in a Z direction) and FIG. 51B is a schematic diagram of the external storage unit viewed from a back face side (a negative side in the Z direction).

EMBODIMENT MODES FOR CARRYING OUT THE INVENTION

Embodiments

Now, preferred embodiments of the present invention will be described in detail hereinafter with reference to the accompanying drawings.

A body structure in an imaging apparatus according to the present invention basically includes a body portion to which an imaging unit having a fitted portion is detachably attached, the imaging unit including at least an optical system which is provided on this fitted portion. This body portion includes a concave portion or housing part configured to detachably house the fitted portion of the imaging unit, and at least three out of walls that close the housing part are open. Here, the state of being open means either a state where the three walls do not exist or a state where an aperture large enough for allowing insertion of the fitted portion of the imaging unit are provided. Concrete examples of such a structure will be described in the following embodiments.

First Embodiment

Brief Description of Camera Body and Imaging Unit

Figure 1A:
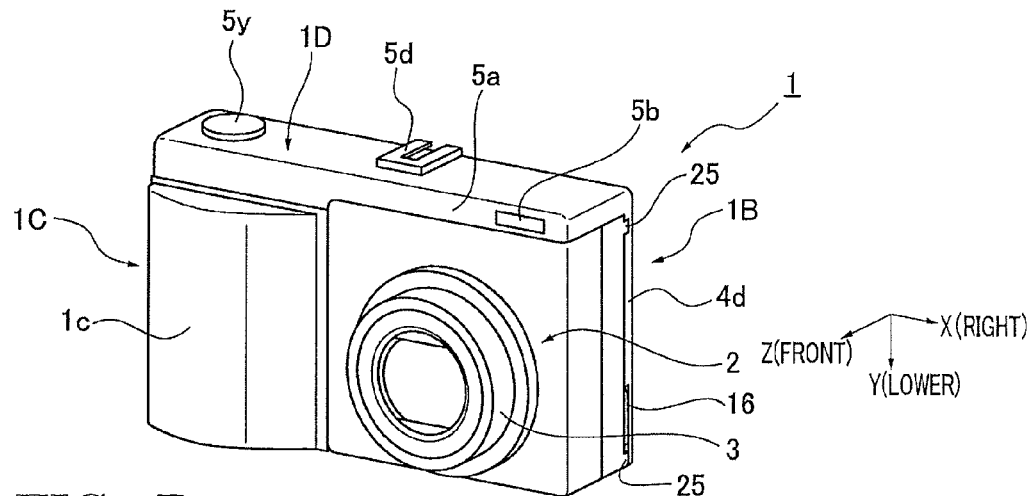
FIG. 1A is an external view showing an attachment state of an imaging unit and a camera body to which the present invention is applied, and is an explanatory view showing a state where the small-sized imaging unit is attached to the camera body.
Figure 1B:
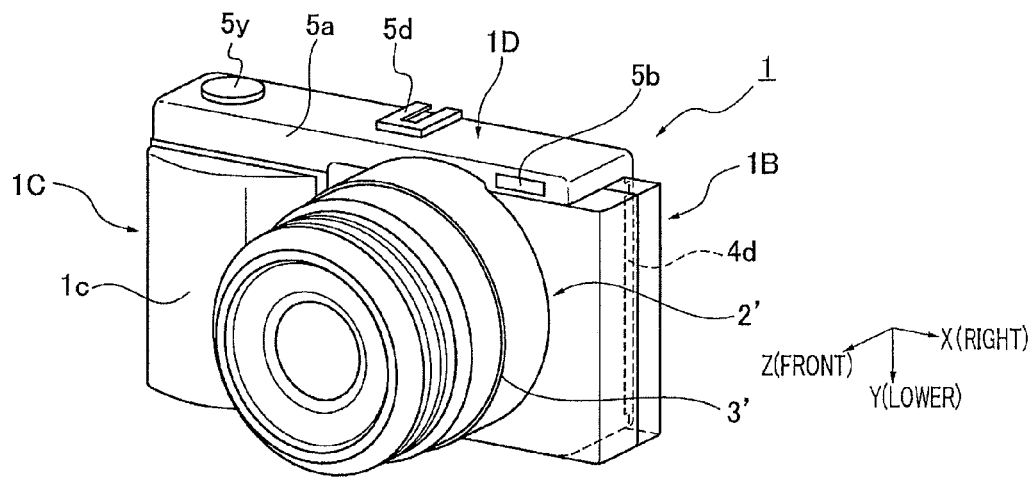
FIG. 1B is an explanatory view showing a state where a large-sized imaging unit is attached to the same camera body as the camera body shown in FIG. 1A.
Figure 1C:
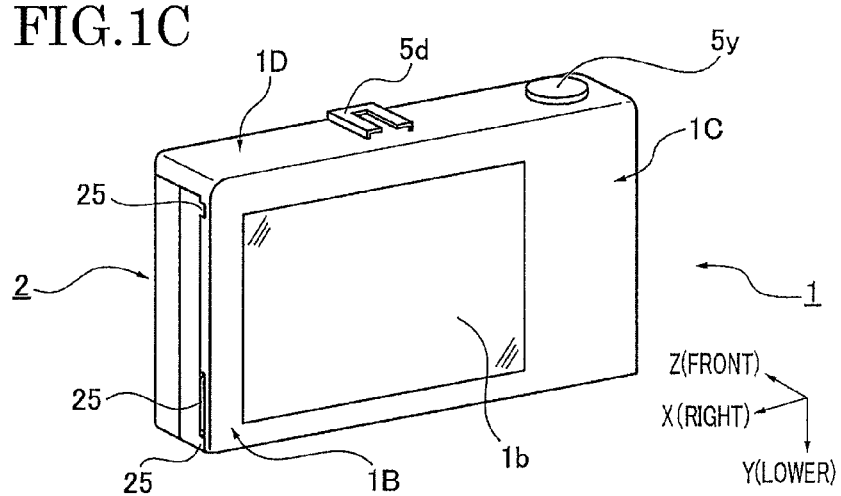
FIG. 1C is a view of the camera body shown in FIG. 1A which is viewed from a back face side.

FIGS. 1A and 1B illustrate a state of attaching an imaging unit provided with a rectangular solid-shaped case to a body portion of an imaging apparatus such as a camera body, the imaging unit being an example of an external unit according to the present invention. In these FIGS. 1A and 1B, reference numeral 1 denotes a camera body, reference numerals 2 and 2' denote imaging units provided with fitted portions, for example, rectangular solid shaped cases 2a and 2a', respectively. Here, each of the imaging units 2 and 2' includes an interchangeable lens barrel unit, for example. The imaging unit (a first imaging unit) 2 includes a lens barrel 3, while the imaging unit (a second imaging unit) 2' includes a lens barrel 3'. FIG. 1C is a perspective view of the camera body shown in FIG. 1A which is viewed from a back face side.

Here, the first imaging unit 2 includes a first optical system, a first imaging device, and a first imaging unit-side connector. Meanwhile, the second imaging unit 2' includes a second optical system, a second imaging device, and a second imaging unit-side connector. Here, the terms "first" and "second" are used for descriptive purposes in order to distinguish the imaging units 2 and 2' from each other.

The first optical system guides incident light from an object to the first imaging device, and the first imaging device converts an object image guided by the first optical system into electric signals. Meanwhile, the second optical system guides incident light from an object to the second imaging device, and the second imaging device converts an object image guided by the second optical system into electric signals.

As shown in FIGS. 2A and 2B, these imaging units 2 and 2' can be attached to and detached from the same camera body 1.

In the following description, a direction parallel to an optical axis direction of an imaging optical system (a lens system) of the lens barrel 3 in a state where the imaging unit 2 is attached to the camera body 1 will be referred to as a Z direction or a front-back direction. Moreover, a positive side in the Z direction will be defined as a front face side (a front side) of a camera and a negative side in the Z direction will be defined as a back face side (a back side) of the camera. Meanwhile, a direction which is orthogonal to the Z direction and which is also a height (vertical) direction in the state of normal use of the camera body 1 will be defined as a Y direction. Furthermore, a direction orthogonal to a Y-Z plane will be defined as an X direction or a right-left direction. A positive side in this Y direction will be defined as a lower side and a negative side in the Y direction will be defined as an upper side. Meanwhile, a positive side in the X direction will be defined as a right side and a negative side in the X direction will be defined as a left side.

(Description of Detailed Structure of Camera Body)

As shown in FIGS. 2A and 2B, the camera body 1 includes a housing part or a concave portion 1A functioning as a space to dispose the case 2a or 2a'. The camera body 1 includes a back face portion 1B, a side face portion 1C, and an upper face portion 1D as three portions constituents constituting the concave portion 1A. The back face portion 1B is located on the back of the case 2a or 2a' in a view from a front side of the imaging unit 2 or 2' when the imaging unit 2 or 2' is attached to the camera body 1 and disposed in the concave portion 1A. The side face portion 1C is located on a left side (as indicated with an arrow in the X direction) of the case 2a or 2a' as viewed from the front side (as indicated with an arrow in the Z direction) of the imaging unit 2 or 2' when the imaging unit 2 or 2' is attached to the camera body 1 and disposed in the concave portion 1A. The upper face portion 1D is located on the upper side (as indicated with an arrow in the Y direction) of the case 2a or 2a' in the view from the front side of the imaging unit 2 or 2' when the imaging unit 2 or 2' is attached to the camera body 1 and disposed in the concave portion 1A and when the imaging unit 2 or 2' is used normally. The back face portion 1B, the side face portion 1C, and the upper face portion 1D are integrally formed.

An operation part configured to electrically operate the camera body 1 and the imaging unit 2 or 2' is provided on any of the back face portion 1B, the side face portion 1C, and the upper face portion 1D, and a release button 5y as the operation part is provided on the upper face portion 1D as shown in FIGS. 1A, 1B, 1C, 2A, and 2B, for example.

The back face portion 1B includes a back face wall 4 which faces a back face of the case 2a or 2a' when the case is attached. This back face wall 4 is parallel to an X-Y plane and is exposed outside when the imaging unit 2 or 2' is not disposed in the concave portion 1A. The back face wall 4 has a substantially rectangular outline corresponding to a shape of the back face of the case 2a or 2a' when viewed from the back face of the case 2a or 2a'.

In FIGS. 2A and 2B, reference numeral 4a denotes an upper edge portion of the back face wall 4, and corresponds to an upper edge portion of the back face of the case 2a or 2a' extending in the right-left direction. Reference numeral 4b denotes a lower edge portion of the back face wall 4, and corresponds to a lower edge portion of the back face of the case 2a or 2a' extending in the right-left direction. Reference numeral 4c denotes a left edge portion of the back face wall 4, and corresponds to a left edge portion of the back face of the case 2a or 2a' extending in the vertical direction. Reference numeral 4d denotes a right edge portion of the back face wall 4, and corresponds to a right edge portion of the back face of the case 2a or 2a' extending in the vertical direction.

The upper face portion 1D includes an upper face wall 5 facing an upper face of the case 2a or 2a' when the case is attached, the upper face wall 5 extending in the right-left direction and having an eave-like shape. This upper face 5 seems like protruding forward from the upper edge portion 4a of the back face wall 4 when the side face portion 1C is directly viewed from sideways while seeing the upper face portion 1D on the upper side. The upper face wall 5 is parallel to an X-Z plane.

A strobe light-emitting part including a strobe light source 5b and so on, as an illuminating device is provided. The strobe light source 5b is disposed on a right side of a front face 5a of the upper face portion 1D. Here, the description is made on the assumption that the strobe light source 5b is provided on the upper face portion 1D. However, it is also possible to provide this strobe light source 5b on the side face portion 1C instead. By providing the strobe light source 5b on the upper surface, it is possible to illuminate an object from above an optical axis of a lens in the imaging unit 2, and thereby to perform illumination of the object properly.

The side face portion 1C includes a side face wall (which is also referred to as a metal plate member) 6 facing a side face of the case 2a or 2a' when the case 2a or 2a' is attached. This side face wall 6 seems like rising upward from the left edge portion 4c when this side face wall 6 is directly viewed while seeing the back face portion 1B on the lower side, seeing the upper face portion 1D on the right side, and seeing a forward portion on the upper side. The side face wall 6 is parallel to the Y-Z plane. The side face portion 1C includes a bulging portion 1c which bulges upward from the side face wall 6. This bulging portion 1c is used as a grip portion. A container is formed inside the side face portion 1C, and a battery and various electric components required for the imaging apparatus are housed in this container.

Specifically, housed in this container are the battery, a circuit used for controlling the imaging unit 2 by operating the operation part, a processing circuit for processing an image taken by the imaging unit 2, a storage medium for storing the image taken by the imaging unit 2 and processed by the processing circuit, a power circuit, a strobe control circuit, a circuit board for mounting circuit components forming these constituents, and the like.

Figure 3A:
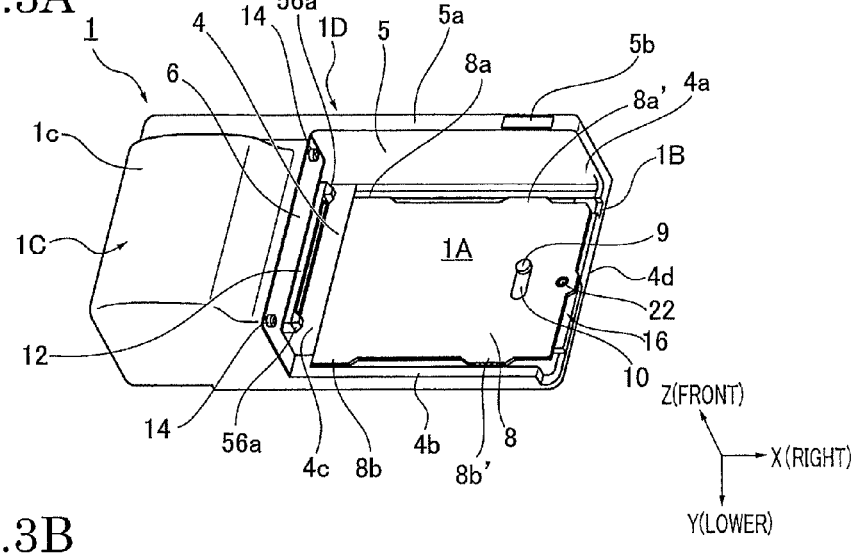
FIG. 3A is an external view showing a separated state of the imaging unit and the camera body to which the present invention is applied, and is a view showing a state where the imaging units shown in FIGS. 1A and 1B are detached from the camera body.

As schematically shown in FIG. 3A, an outline shape of the concave portion 1A is defined by the back face wall 4, the upper face wall 5, and the side face wall 6. This concave portion 1A is open on three sides, namely, in a downward direction where a lower face as a remaining surface of the case 2a or 2a' is located, in a right side direction where a right side face as a remaining surface of the case 2a or 2a' is located, and in a forward direction where a front face as a remaining surface of the case 2a or 2a' is located when the case 2a or 2a' is attached. On this concave portion 1A, the lens barrels 3 having different sizes and the imaging units 2 and 2' having different sizes are interchangeably attached. That is, the lens barrel 3 of the imaging unit 2 and a lens barrel 3' of the imaging unit 2' have mutually different sizes. Meanwhile, the size of the imaging device of the imaging unit 2 is also different from the size of the imaging device of the imaging unit 2'.

As shown in FIG. 1C, a display face 1b for displaying an image taken by the imaging unit 2 or 2' is provided on a back face of the back face portion 1B. Images stored in the storage medium can be replayed on the display face 1b. The back face portion 1B is continuously connected to the side face portion 1C. The size of this back face portion 1B is defined substantially by the size of the display face 1b. However, the display face 1b may be or may not be provided on the back face portion 1B.

Figure 3B:
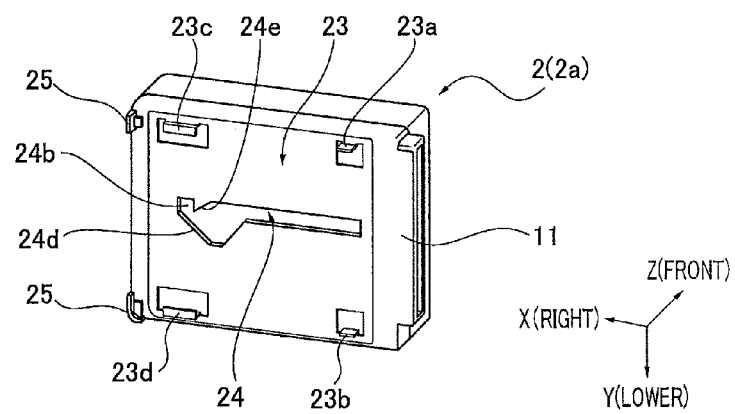
FIG. 3B is a view showing a state of the imaging unit shown in FIG. 1A viewed from the back face side.
Figure 3C:
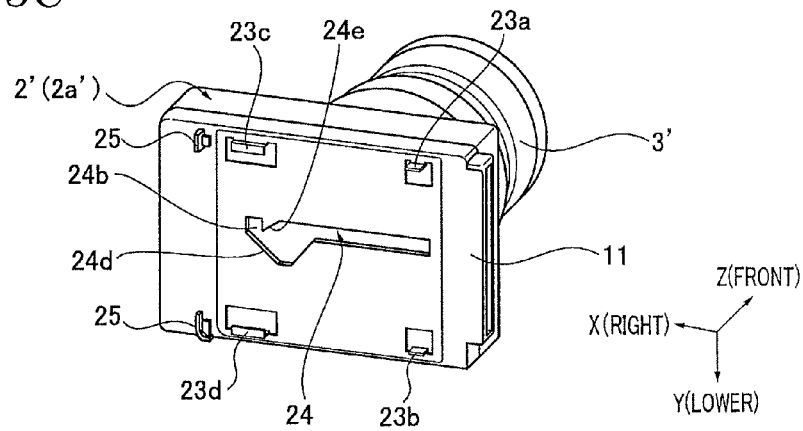
FIG. 3C is a view showing a state of the imaging unit shown in FIG. 1B viewed from the back face side.

The back face portion 1B is provided with a base plate 8 which constitutes part of the back face wall 4 and a locking pin 9 which serves as locking means. An oval guide groove 10 is formed on the base plate 8 to guide the locking pin 9. The locking pin 9 protrudes toward the concave portion 1A through the guide groove 10. As shown in FIGS. 3B and 3C, the cases 2a and 2a' of the imaging units 2 and 2' have substantially the same shapes of the back face, the left side face, the lower face, the upper face, and the right side face but except the front face. Accordingly, only the structures of the camera body 1 and the imaging unit 2 will be hereinafter described with reference to FIGS. 4 to 15D. Explanation on details of the structures of the imaging unit 2' will be omitted, and only the same reference numerals will be designated to those structures corresponding to that of the imaging unit 2.

Figure 4:
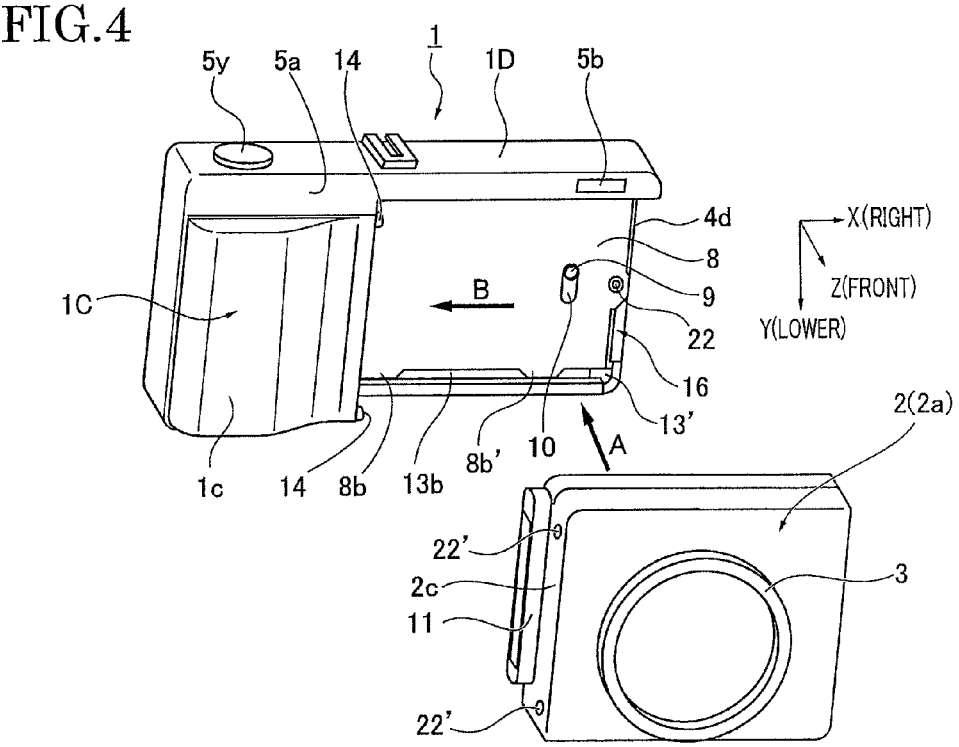
FIG. 4 is an exploded view corresponding to the separated state in FIG. 2A, and is an external view of the imaging unit and the camera body viewed from a right oblique side of the imaging unit and the camera body.

As shown in FIG. 4, an attachment plug as a connector (imaging unit-side connector) 11 extending in the vertical direction is provided on the left side face 2c of the imaging unit 2, the left side face 2c facing the side face wall 6. This attachment plug is fixed to a plug board set (not shown) provided with an electric circuit. This plug board set is disposed inside the imaging unit 2 by means of a floating structure.

When establishing electrical coupling between the connector 11 and a connector (camera body-side connector) 12 by attaching the imaging unit 2 to the camera body 1, this floating structure performs a function to absorb and relax a fitting error between the connector 11 and the connector 12, thereby relaxing a stress to be applied when the connector 11 is engaged with the connector 12.

Figure 5:
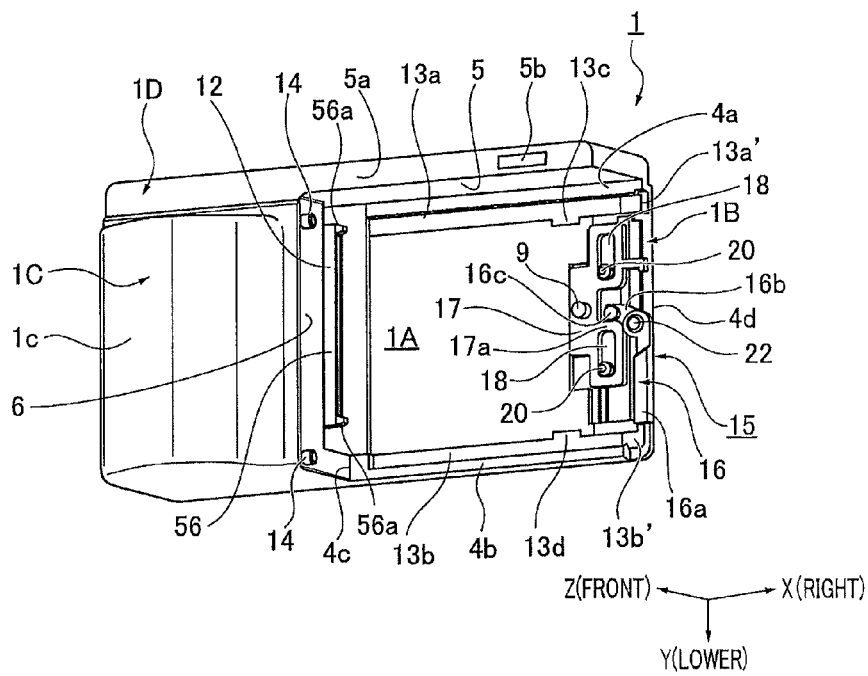
FIG. 5 is an external view showing a state where a base plate shown in FIG. 4 is detached.

As shown in FIG. 5, the connector 12 extending in the vertical direction is provided on the side face wall 6 of the camera body 1. The connector 12 includes positioning protrusions 56a and 56a on both ends in the vertical direction. Meanwhile, the connector 11 includes positioning holes to be described later on both ends in the vertical direction. Commercially available bay connectors are used as the connectors 11 and 12, for example.

The connector 11 has a function to perform communication with an external device, which is, in this case, a function to perform communication with the connector 12.

The connector 12 is disposed at a rising base end of the side face wall 6, which seems in a rising manner from the back face wall 4 when viewing the side face wall 6 from the front of the side face wall 6 while seeing the back face portion 1B on the lower side, seeing the upper face portion 1D on the right side, and seeing the forward portion on the upper side so as to avoid a careless touch.

The connector 12 includes a coating member 56 for coating a connector terminal. This coating member 56 has a function to prevent electric circuits, electric elements, and the like from being damaged by an electrostatic discharge from a human body which may occur upon contact of the hand of the person when the imaging unit 2 is attached to the camera body 1.

The connector 12 faces the concave portion 1A. This connector 12 is engaged with the connector 11 by a movement of the imaging unit 2 in a direction from the right to the left when attaching the imaging unit 2 to the camera body 1, whereby the camera body 1 and the imaging unit 2 are electrically connected to each other. Details of the structures of these connectors 11 and 12 will be described later.

The base plate 8 is fixed to the back face portion 1B by a locking screw which is not illustrated. The back face portion 1B is provided with a guide mechanism, which is configured to control a positional relation of the connector 12 of the camera body 1 to the connector 11 of the imaging unit 2 in cooperation with a guide mechanism on the imaging unit 2 and to guide this imaging unit 2 from the right to the left.

Figure 6:
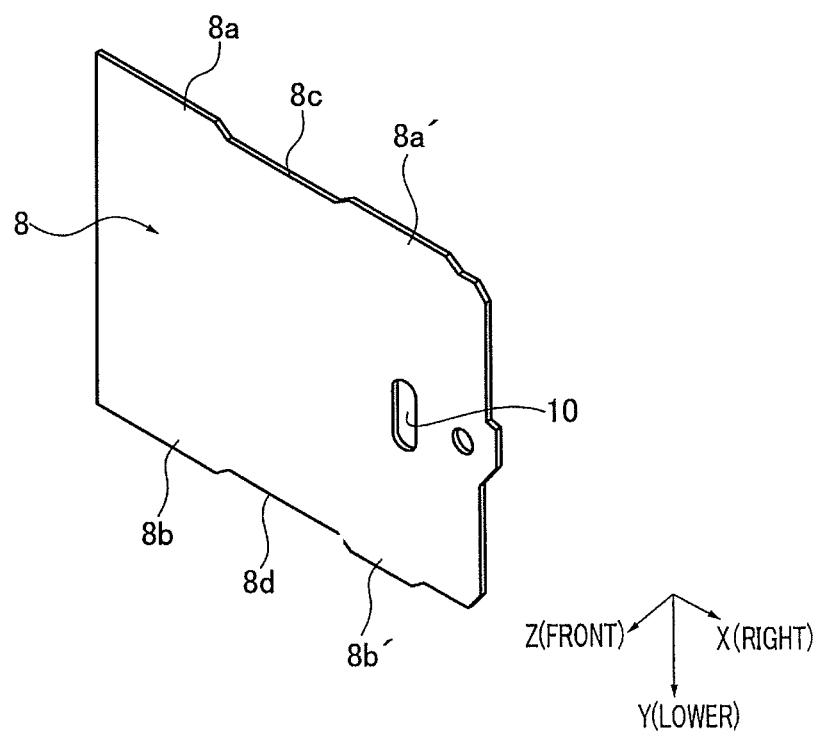
FIG. 6 is an external view of the base plate shown in FIG. 4.

The base plate 8 is formed of a metal thin plate having a substantially rectangular shape as shown in FIG. 6. This base plate 8 constitutes part of the guide mechanism on the camera body 1 side. In an upper edge wall of the base plate 8, a guide wall 8a is formed on a left edge 4c side which is close to the side face wall 6 while an engagement portion 8a' is formed on a right edge 4d side which is away from the side face wall 6. In a lower edge wall of the base plate 8, a guide wall 8b is formed on the left edge 4c side which is close to the side face wall 6 while an engagement portion 8b' is formed on the right edge 4d side which is away from the side face wall 6. A pair of guide protrusions to be described later slidably abuts on the pair of guide walls 8a and 8b, thereby controlling the positional relation between the connector 11 and the connector 12. A pair of engagement claws to be described later are engaged with the pair of engagement portions 8a' and 8b'. An upper edge portion between the engagement portion 8a' and the guide wall 8a of the base plate 8 is formed into a notch portion 8c extending in the right-left direction. Meanwhile, a lower edge portion between the engagement portion 8b' and the guide wall 8b of the base plate 8 is formed into a notch portion 8d.

The pair of engagement portions 8a' and 8b' are provided with biasing plate springs as biasing portions (to be described later), respectively, to bias the imaging unit 2 toward the back face portion 1B. When the imaging unit 2 is attached to the camera body 1 and a force in the forward direction is applied to this imaging unit 2 in the state where this imaging unit 2 is locked on the camera body 1, the pair of engagement portions 8a' and 8b' perform a function to prevent the imaging unit 2 from coming off due to this force in cooperation with the pair of engagement claws.

When the back face wall 4 is viewed from the front face while seeing the side face portion 1C on the left side and seeing the upper face portion 1D on the upper side, the back face wall 4 is provided with an upper side concave groove 13a and a lower side concave groove 13b with a large interval therebetween in the vertical direction as shown in FIG. 5. The upper side concave groove 13a as a guide groove extends long in the right-left direction along the upper edge portion 4a. The lower side concave groove 13b as a guide groove extends long in the right-left direction parallel to this upper side concave groove 13a and along the lower edge portion 4b of the back face wall 4. Right ends of the upper concave groove 13a and the lower concave groove 13b are respectively formed into open ends 13a' and 13b' which are opened to the outside. The upper side concave groove 13a and the lower side concave groove 13b constitute part of the guide mechanism.

The guide mechanism is provided in the camera body 1 and the imaging unit 2, and has functions to control the positional relation of the camera body-side connector 12 to the imaging unit-side connector 11, and to guide the imaging unit 2 in a direction (X direction) to approach or recede from the side face wall 6.

Figure 7:
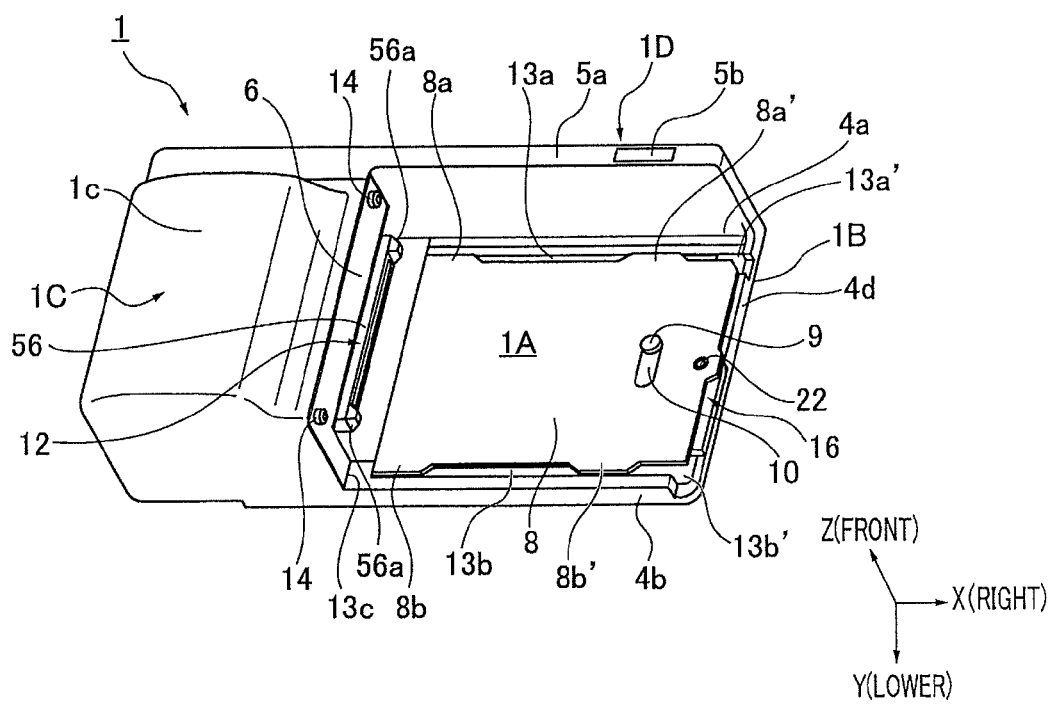
FIG. 7 is an external view showing a state of the camera body viewed from a lower left oblique side.

The guide groove 10 is formed into a vertically extended shape and is located substantially in the center of a line connecting the pair of engagement portions 8a' and 8b' to each other. The side face wall 6 is provided with a pair of engaging protrusions 14 and 14 protruding toward the concave portion 1A with an interval therebetween in the vertical direction as shown in FIGS. 5 and 7. The pair of engaging protrusions 14 and 14 have a function to fix the imaging unit 2 to the camera body 1 in cooperation with the pair of engagement portion 8a' and 8b'. The pair of engaging protrusions 14 and 14 also have a function to prevent, in cooperation with a pair of engaging holes 22' and 22', a connector terminal of the connector 12 in the camera body 1 and a connector terminal of the connector 11 in the imaging unit 2 from being destroyed when an unexpected twisting power is applied to the imaging unit.

The pair of engaging protrusions 14 and 14 is disposed above the connector 12 when the side face wall 6 is directly viewed while seeing the back face portion 1B on the lower side, seeing the upper face portion 1D on the right side, and seeing the forward portion on the upper side.

FIG. 5 is a view showing the state where the base plate 8 is detached from the back face portion 1B. As shown in FIG. 5, a release mechanism 15 made of metal is provided on the right edge portion 4d of the back face portion 1B. This release mechanism 15 mainly includes an ejection lever (a release lever) 16 and an unlocking plate 17. The locking pin 9 is provided on the unlocking plate 17. Guide grooves 18 and 18 are formed on this unlocking plate 17. The back face wall 4 is provided with guide pins 20 and 20. These guide pins 20 and 20 are engaged with the guide grooves 18 and 18, respectively, and the unlocking plate 17 is controlled by these guide pins 20 and 20 to slide vertically.

The unlocking plate 17 is biased upward with an unillustrated unlocking plate biasing device such as a spring. When no external force is applied to an operating lever, the guide pins 20 and 20 abut on lower ends of the guide grooves 18 and 18.

Figure 8:
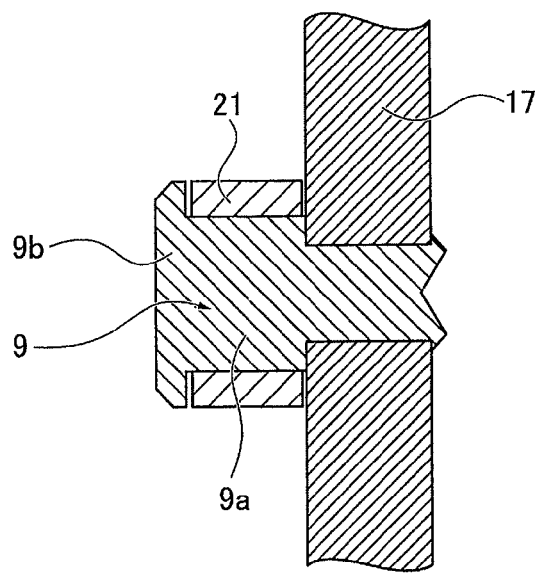
FIG. 8 is a detailed configuration diagram for explaining a fitting structure of a locking pin shown in FIGS. 4, 5, and 7.

As shown in an enlarged view in FIG. 8, the locking pin 9 is fixed to the unlocking plate 17 by caulking means. This locking pin 9 includes a shaft portion 9a and a flange portion 9b. A collar member 21 is rotatably provided on the shaft portion 9a. The flange portion 9b prevents this collar member 21 from coming off. This collar member 21 has a function to reduce friction resistance between the locking pin 9 and the guide groove 10. An operation of the locking pin 9 will be described later in further detail.

A shaft portion 22 is provided on the right edge portion 4d of the back face wall 4 as shown in FIG. 5. The ejection lever 16 includes an operating arm 16a and an acting arm 16b located on two sides of the shaft portion 22. This ejection lever 16 is rotatable around the shaft portion 22 as a fulcrum. The operating arm 16a is formed longer than the acting arm 16b, and is thereby configured to gain a large acting force with a small operating force. The acting arm 16b is provided with an acting pin 16c. An action target wall 17a is formed on the unlocking plate 17 and the acting pin 16c engageably faces the action target wall 17a.

(Description of Detailed Structures of Imaging Unit 2)

As shown in FIG. 4, the pair of engaging holes 22' and 22' to be engaged with the pair of engaging protrusions 14 and 14 at the time of attachment is formed on the left side face 2c of the imaging unit 2, the left side surface 2c facing the side face wall 6. A engagement plate 23 configured to lock the imaging unit 2 to the camera body 1 in cooperation with the locking pin 9 is fixed to the back surface of the imaging unit 2 as shown in FIG. 9 by a locking screw which is not illustrated therein.

Figure 9:
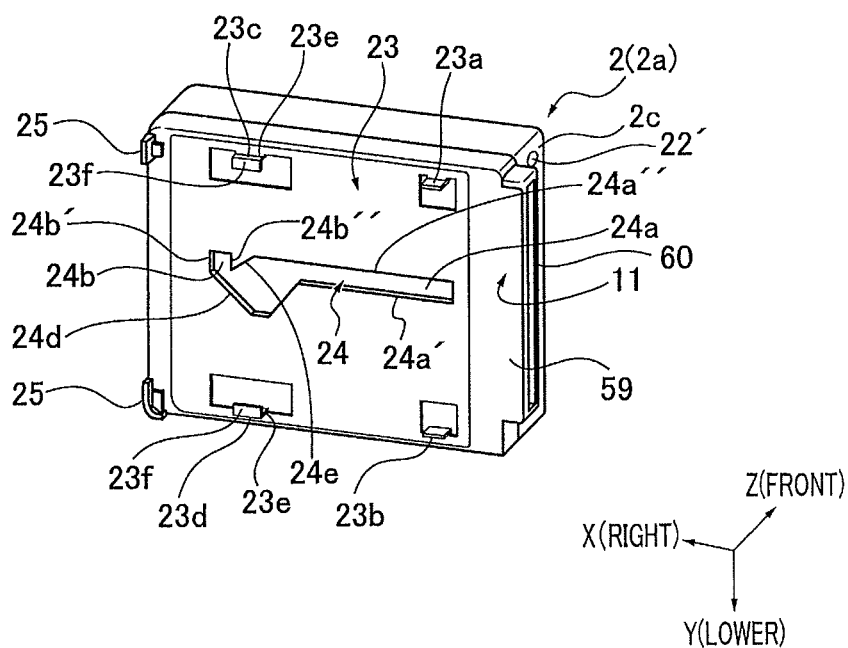
FIG. 9 is an external view for explaining a configuration on the back face side of the imaging unit to be attached to the camera body shown in FIG. 7.
Figure 10:
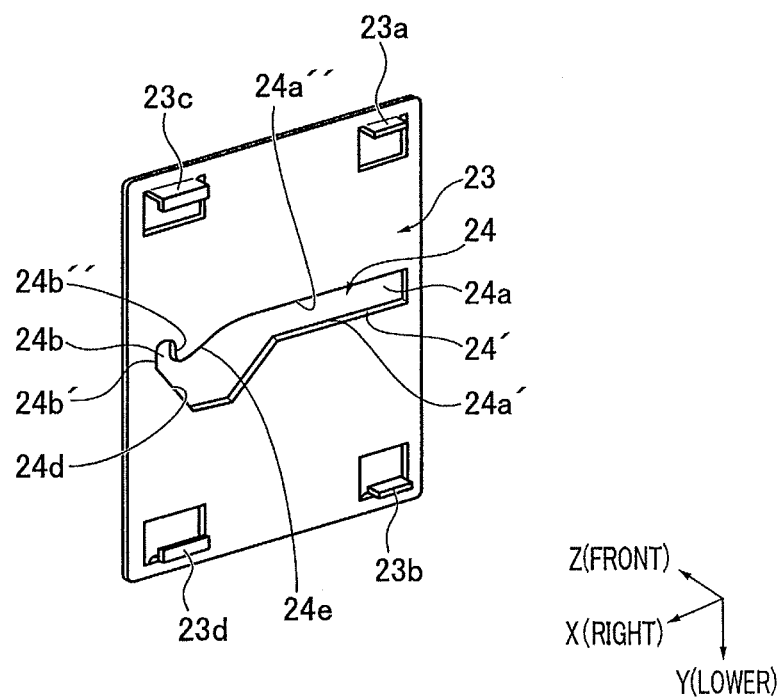
FIG. 10 is an external view for explaining a structure of an engagement plate shown in FIG. 9.
Figure 11:
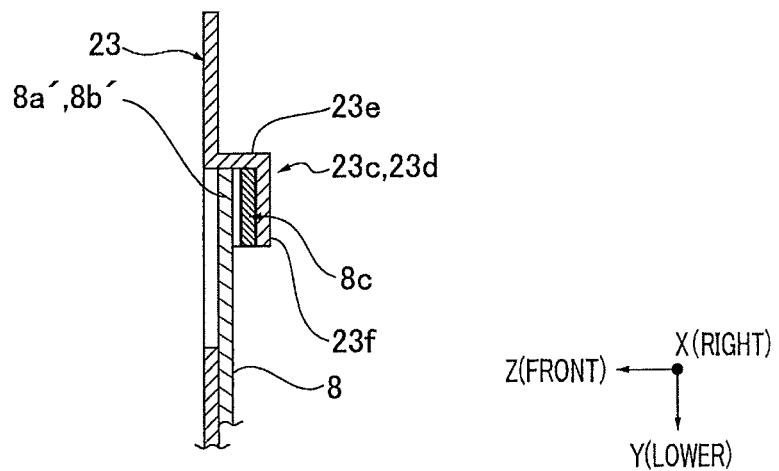
FIG. 11 is a partial cross-sectional view showing a detailed configuration of an engagement claw formed on the engagement plate shown in FIG. 10.

As shown in FIGS. 9 and 10, a pair of guide protrusions 23a and 23b is formed on the engagement plate 23 by cutting and lifting the plate, the guide protrusions 23a and 23b configured to be inserted to the upper side concave groove 13a and the lower side concave groove 13b, respectively, at the time of attachment and to abut slidably on the guide walls 8a and 8b. Moreover, engagement claws 23c and 23d are formed by cutting and lifting the plate, the engagement claws 23c and 23d configured to be inserted to the upper side concave groove 13a and the lower side concave groove 13b, respectively, at the time of attachment and to be engaged on the pair of engagement portions 8a' and 8b' in a thickness direction of the base plate 8. As shown in FIG. 11, each of the engagement claws 23c and 23d includes a lifted portion 23e and a bent portion 23f. When the bent portion 23f is disposed inside the back face portion 1B of the camera body 1 relative to the base plate 8, both of the connectors 11 and 12 are disposed in a positional relation to be connected to each other in a parallel state.

Figure 12:
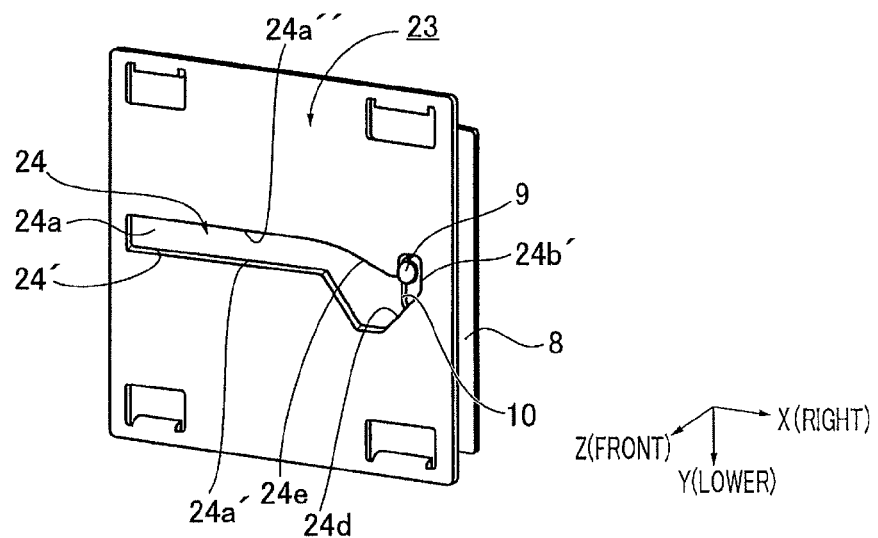
FIG. 12 is a perspective view for explaining a relation between the base plate shown in FIG. 6 and the engagement plate shown in FIG. 10 in a locked state.

As shown in FIGS. 9, 10, and 12, an insertion groove 24 for allowing insertion of the locking pin 9 is drilled in the engagement plate 23. Reference numeral 24' denotes an insertion groove constituent wall of the insertion groove 24. The insertion groove constituent wall 24' includes a pair of straight groove constituent walls 24a' and 24a", a pair of locking groove constituent walls 24b' and 24b", an inclined wall 24e, and an inclined wall 24d. The pair of straight groove constituent walls 24a' and 24a" forms a straight groove 24a extending in a direction corresponding to a direction of extension of the upper side concave groove 13a and the lower side concave groove 13b. The pair of locking groove constituent walls 24b' and 24b" forms a locking groove 24b extending in the vertical direction orthogonal to the direction of extension of the upper side concave groove 13a and the lower side concave groove 13b, and is provided to maintain the locking pin 9 in a lock position. The inclined wall 24e is located between the locking groove constituent wall 24b" and the straight groove constituent wall 24a", and is configured to abut on the locking pin 9 when the imaging unit 2 is attached to the camera body 1 to generate an abutting component force to move the locking pin 9 downward against the biasing force of the unlocking plate biasing means such as the spring (not shown). The inclined wall 24d allows the imaging unit 2 to move in a releasing direction by the abutting component force of the locking pin 9 when the imaging unit 2 is released from the camera body 1. The locking groove constituent wall 24b" out of the locking groove constituent walls 24b' and 24b" functions as an unlock prevention wall configured to prevent the locking pin 9 from unlocking.

Figure 13:
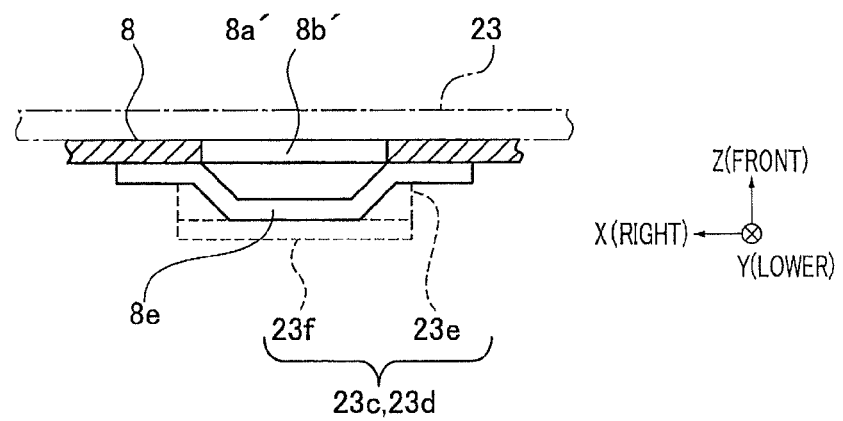
FIG. 13 is a partial cross-sectional view for explaining a configuration of a biasing plate spring provided on the engagement plate shown in FIG. 7.

As shown in FIGS. 11 and 13, on the base plate 8, a biasing plate spring 8e as a biasing portion is provided on a face opposite to the face opposing the engagement plate 23, i.e., on the face opposing the pair of concave grooves 13a and 13b, in each of positions where the engagement portions 8a' and 8b' are formed. Each biasing plate spring 8e has a function to bias the imaging unit 2 toward the back face wall 4.

Notches 13c and 13d are formed on the upper side concave groove 13a and the lower side concave groove 13b as shown in FIG. 5 so as to allow entry of the biasing plate springs 8e for biasing the engagement claws 23c and 23d (imaging unit 2) into the upper side concave groove 13a and the lower side concave groove 13b, respectively.

Next, attachment of the imaging unit 2 to the camera body 1 will be described.

A user holds the imaging unit 2 and places the imaging unit 2 in such a position that the pair of guide protrusions 23a and 23b and the pair of engagement claws 23c and 23d shown in FIG. 9 can be inserted into the upper side concave groove 13a and the lower side concave groove 13b of the camera body 1 shown in FIG. 5, for example. Moreover, the imaging unit 2 is placed so that the pair of guide protrusions 23a and 23b can slidably abut on the guide walls 8a and 8b, and that the engagement claws 23c and 23d can be engaged on the engagement portions 8a' and 8b'. Subsequently, the user holds the imaging unit 2 while maintaining the posture and pushes the imaging unit 2 into the camera body 1 in a direction of an arrow W (the negative side in the X direction (see FIG. 4)) from the front side to the back side. In this way, the back face of the case 2a of the imaging unit 2 abuts on the back face wall 4 of the camera body 1. Accordingly, the locking pin 9 is inserted into the insertion groove 24. At this time, the locking pin 9 is located in the straight groove 24a.

Then, the imaging unit 2 is moved relative to the camera body 1 in a direction of an arrow B (the negative side in the Z direction (see FIG. 4)) toward the side face wall 6 on the left side. Thus, the engagement claws 23c and 23d are moved in a direction to approach the engagement portions 8a' and 8b' while the guide protrusions 23a and 23b slidably abut on the guide walls 8a and 8b. As a result, the bent portion 23e abuts on the biasing plate spring 8e, and the back face of the case 2a of the imaging unit 2 closely contacts the back face wall 4 of the camera body 1 by means of the biasing force of this biasing plate spring 8e. In this way, looseness of the imaging unit 2 relative to the camera body 1 is eliminated. At this time, the locking pin 9 is just about to abut on the inclined wall 24d.

Subsequently, as the imaging unit 2 is moved toward the side face wall 6, the pair of engaging protrusions 14 and 14 is engaged with the pair of engaging holes 22' and 22'. In this way, a relative positional relation between the connector 11 and the connector 12 is supplementary controlled. Then, the positioning protrusions 56a and 56a of the connector 12 are engaged with the positioning holes of the connector 11. In this way, the connector terminals of the connectors 11 and 12 are electrically connected to each other, and the connector 11 is electrically connected to the connector 12. Note that the electrical connection between the connectors 11 and 12 will be described later.

Meanwhile, due to the pushing of the imaging unit 2 of the locking pin 9 toward the side face wall 6, the locking pin 9 is moved downward against the biasing force of the unlocking plate biasing means by the abutting component force of the inclined wall 24e, and hence the locking pin 9 passes the inclined wall 24e. At a point passing this inclined wall 24e, the locking pin 9 is moved upward to the locking groove 24b by the biasing force of the unlocking plate biasing means, whereby the locking pin 9 enters the locking groove 24b. In this way, the imaging unit 2 is locked on the camera body 1. Attachment of the imaging unit 2' is performed similarly.

Figure 14:
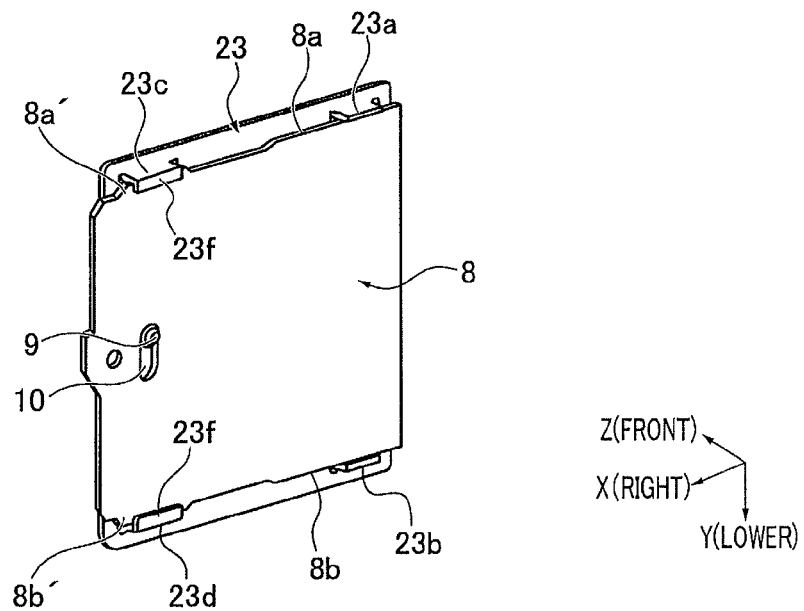
FIG. 14 is a perspective view of the base plate and the lock plate in a positional relation shown in FIG. 12 viewed from the base plate side.

In the state where the imaging unit 2 is completely attached to the camera body 1, the pair of engagement claws 23c and 23d are securely engaged on the engagement portions 8a' and 8b' as schematically shown in FIG. 14. The imaging unit 2 is attached firmly to the camera body 1 without being loose by the pair of engaging protrusions 14 and 14 formed on the side face wall 6 and by the pair of engagement claws 23c and 23d located very distant from the pair of engaging protrusions 14 and 14. Accordingly, in a case where the imaging unit 2 is attempted to be pulled out forward by applying a force in the opposite direction to the direction of the arrow A (see FIG. 4) to the imaging unit 2, the imaging unit 2 is avoided from being pulled out. Moreover, during the pulling, application of an excessive force to the connectors 11 and 12, which occurs due to the pulling action, is prevented.

Moreover, in a case where the lower edge portion on the right side of the imaging unit 2 is grabbed and the imaging unit 2 is attempted to be pulled out forcibly in the right downward direction, the imaging unit 2 is similarly avoided from being pulled out. This is because the imaging unit 2 is attached firmly to the camera body 1 without being loose by the pair of engaging protrusions 14 and 14 and by the pair of engagement claws 23c and 23d located very distant from the pair of engaging protrusions 14 and 14. Hence, application of an excessive force to the connectors 11 and 12, which occurs due to the pulling action, is prevented.

Note that the imaging unit 2 or 2' is provided with decorative lid portions 25 on the back face in positions facing the upper side concave groove 13a and the lower side concave groove 13b, respectively, as shown in FIG. 9. The decorative lid portions 25 are provided to improve appearance by occluding the open ends 13a' and 13b' of the upper side concave groove 13a and the lower side concave groove 13b when attaching the imaging unit 2 to the camera body 1.

This embodiment applies the configuration in which the electrical connection between the imaging unit 2 and the camera body 1 is established by attaching the imaging unit 2 to the camera body 1 from the direction of the arrow A and then moving the imaging unit 2 in the direction of the arrow B. Instead, it is also possible to apply a configuration in which the electrical connection between the imaging unit 2 and the camera body 1 is established merely by moving the imaging unit 2 in the direction of the arrow B.

Next, an action to pull the imaging unit 2 out of the camera body 1 will be described with reference to FIGS. 15A to 15D.

Figure 15A:
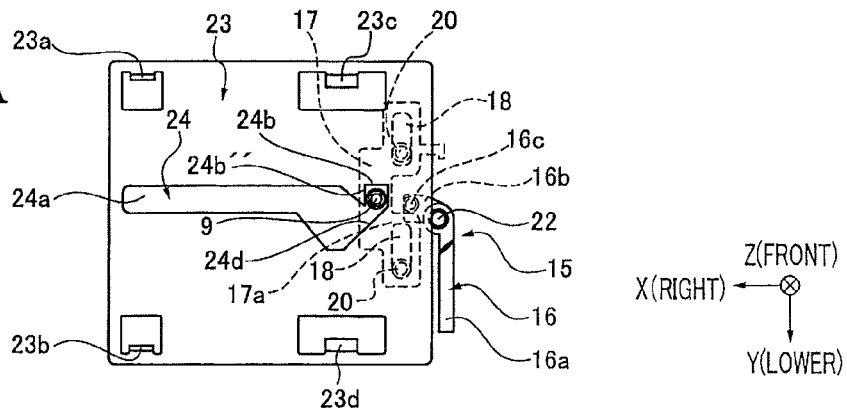
FIG. 15A is a schematic diagram for explaining an unlocking between the imaging unit shown in FIG. 1A and the camera body, and is an explanatory view showing that the imaging unit and the camera body are in a locked state.

The base plate 8 and the engagement plate 23 are positioned as schematically illustrated in FIG. 15A when the imaging unit 2 is attached to the camera body 1. Here, the locking pin 9 is located in the locking groove 24b, and the locking groove constituent wall 24b'' prevents the imaging unit 2 from coming off in the right-left direction.

Figure 15B:
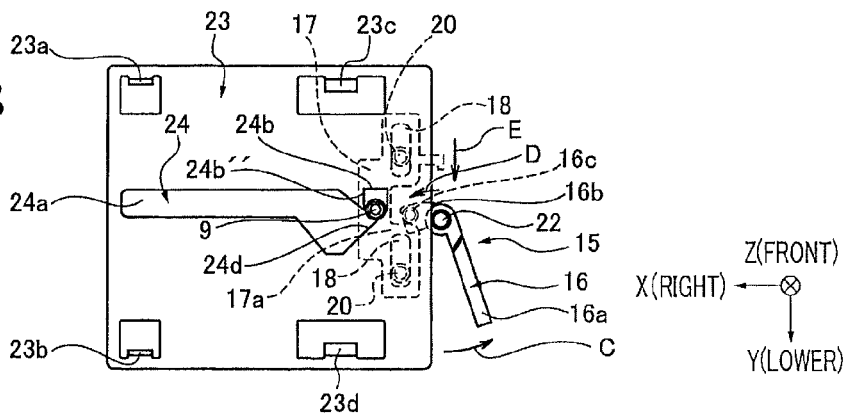
FIG. 15B is an explanatory view showing a transition process of the imaging unit to an unlocked state.

As shown in FIG. 15B, when the operating arm 16a is rotated in a direction of an arrow C, the acting arm 16b is rotated in a direction of an arrow D around the shaft portion 22 as the fulcrum, and the acting pin 16c abuts on the action target wall 17a. In this way, the unlocking plate 17 is moved in a direction of an arrow E against the biasing force of the unlocking plate biasing device. As the unlocking plate 17 is moved in the direction of the arrow E, the locking pin 9 is moved out of the locking groove 24b. Thus, the lock between the imaging unit 2 and the camera body 1 is released.

Figure 15C:
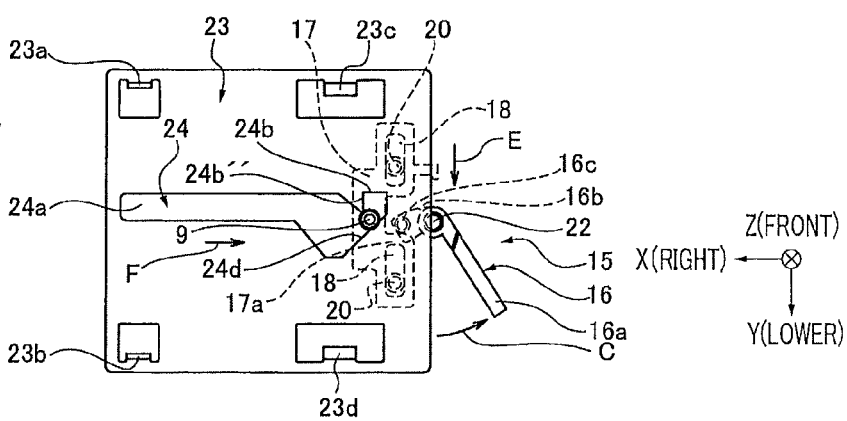
FIG. 15C is an explanatory view showing an ejecting process of the imaging unit.

As shown in FIG. 15C, when the operating arm 16a is further rotated in the direction of the arrow C, the unlocking plate 17 is further moved in the direction of the arrow E and the locking pin 9 abuts on the inclined wall 24d. Here, the movement of the imaging unit 2 in the direction of the arrow E is restricted by the pair of guide protrusions 23a and 23b and by the pair of engagement claws 23c and 23d. Accordingly, the imaging unit 2 is moved in a pulling direction (a direction of an arrow F) as shown in FIG. 15C by the abutting component force of the locking pin 9 which is generated when the locking pin 9 abuts on the inclined wall 24d.

Figure 15D:
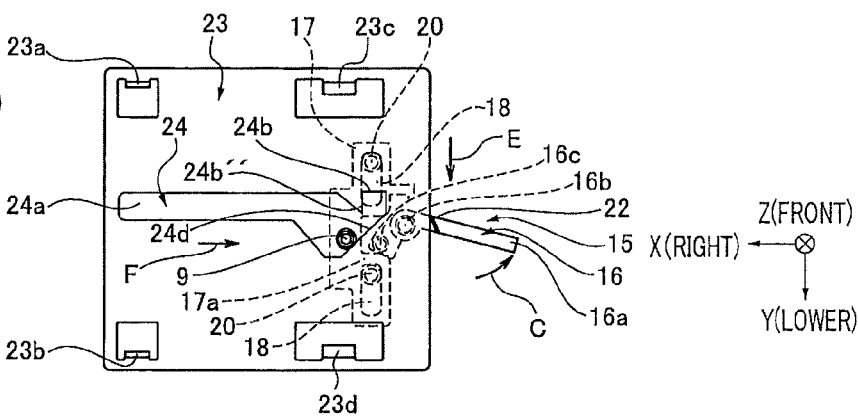
FIG. 15D is an explanatory view showing a completely unlocked state of the imaging unit.

In this way, the engagement of the pair of engaging protrusions 14 and 14 with the pair of engaging holes 22 and 22 is released, and the engagement between the pair of engagement claws 23c and 23d and the pair of engagement portions 8a' and 8b' is also released. Moreover, the engagement between the connector 11 and the connector 12 is also released almost at the same time, and the electrical connection between the camera body 1 and the imaging unit 2 is also cut off. FIG. 15D shows a state in which the connector 11 of the imaging unit 2 is completely pulled out of the connector 12 of the camera body 1. The same applies to an action to pull out the imaging unit 2'.

Here, the guide groove 10 of the base plate 8, the locking pin 9 of the unlocking plate 17, the guide pins 20 and 20 of the back face portion 1B, the guide grooves 18 and 18 of the unlocking plate 17, the inclined wall 24e and the locking groove 24b of the engagement plate 23 provided on the imaging unit 2, and the unlocking plate biasing means constitute a locking mechanism. Meanwhile, the ejection lever 16, the action target wall 17a of the unlocking plate 17, the guide pins 20 and 20, and the guide grooves 18 and 18 constitute an unlocking mechanism. Moreover, the guide groove 10 of the base plate 8, the ejection lever 16, the action target wall 17a of the unlocking plate 17, the guide pins 20 and 20, the guide grooves 18 and 18, and the inclined wall 24d of the engagement plate 23 provided on the imaging unit 2 constitute an ejecting mechanism. As described above, since the constituents of the unlocking mechanism and the constituents of the ejecting mechanism are common, it is possible to perform the series of operations from unlocking to ejecting only by operating the ejection lever 16.

In the first embodiment, the length of the operating arm 16a of the ejection lever 16 is formed longer than the length of the acting arm 16b. Accordingly, it is possible to gain a large pulling force with a small force for a releasing operation. It is possible to adjust a force required for pulling the connector 11 out of the connector 12 by adjusting an arm ratio of this ejection lever 16. Meanwhile, if the position of the locking pin 9 is adjusted so that the force in the pulling direction is concentrated on an intermediate portion in a direction orthogonal to the direction of extension of the connector 12 and in a direction of extension of a connector portion, it is possible to relax stress applied to the connector terminals when pulling the connector 11 out of the connector 12.

Although the ejection lever 16 is rotatable in this first embodiment, the configuration of the ejection lever 16 is not limited thereto. For example, the ejection lever 16 may also be configured to be slid vertically along the right edge portion 4d of the back face portion 1B.

In this first embodiment, the release mechanism 15 is provided on the back face portion 1B of the camera body 1 to achieve a compact configuration of the imaging unit 2. Instead, it is also possible to provide the release mechanism 15 on the imaging unit 2 to achieve a compact and downsized configuration of the camera body 1.

In this first embodiment, the camera body 1 is provided with the engagement portions 8a' and 8b', the biasing plate springs 8e, the upper side concave groove 13a, and the lower side concave groove 13b, while the imaging unit 2 is provided with the engagement claws 23c and 23d. Instead, it is possible to provide the camera body 1 with the engagement claws and to provide the imaging unit 2 with the engagement plate portions, the biasing plate springs, the upper side concave groove, and the lower side concave groove.

Moreover, in this first embodiment, the camera body 1 is provided with the engaging protrusions 14 and 14, while the imaging unit 2 is provided with the engaging holes 22' and 22'. Instead, it is possible to provide the camera body 1 with the engaging holes and to provide the imaging unit 2 with the engaging protrusions.

Further, in this first embodiment, the unlocking mechanism as an unlocking operation unit is configured to include the rotatable release lever. Instead, it is possible to provide a different type of the unlocking operation unit such as a push button or a slidable lever.

The camera body 1 and the imaging unit 2 of the first embodiment exert an advantageous effect by the cooperation of the guide mechanisms provided on both the camera body 1 and the imaging unit 2. Therefore, it is also possible to provide the imaging unit 2 with the guide mechanism originally provided on the camera body 1 and to provide the camera body 1 with the guide mechanism originally provided on the imaging unit 2.

(Description of Electric Components Installed in Camera Body and Imaging Unit)

Next, electric components installed in the camera body 1 and the imaging unit 2 will be described with reference to FIG. 16.

Figure 16:
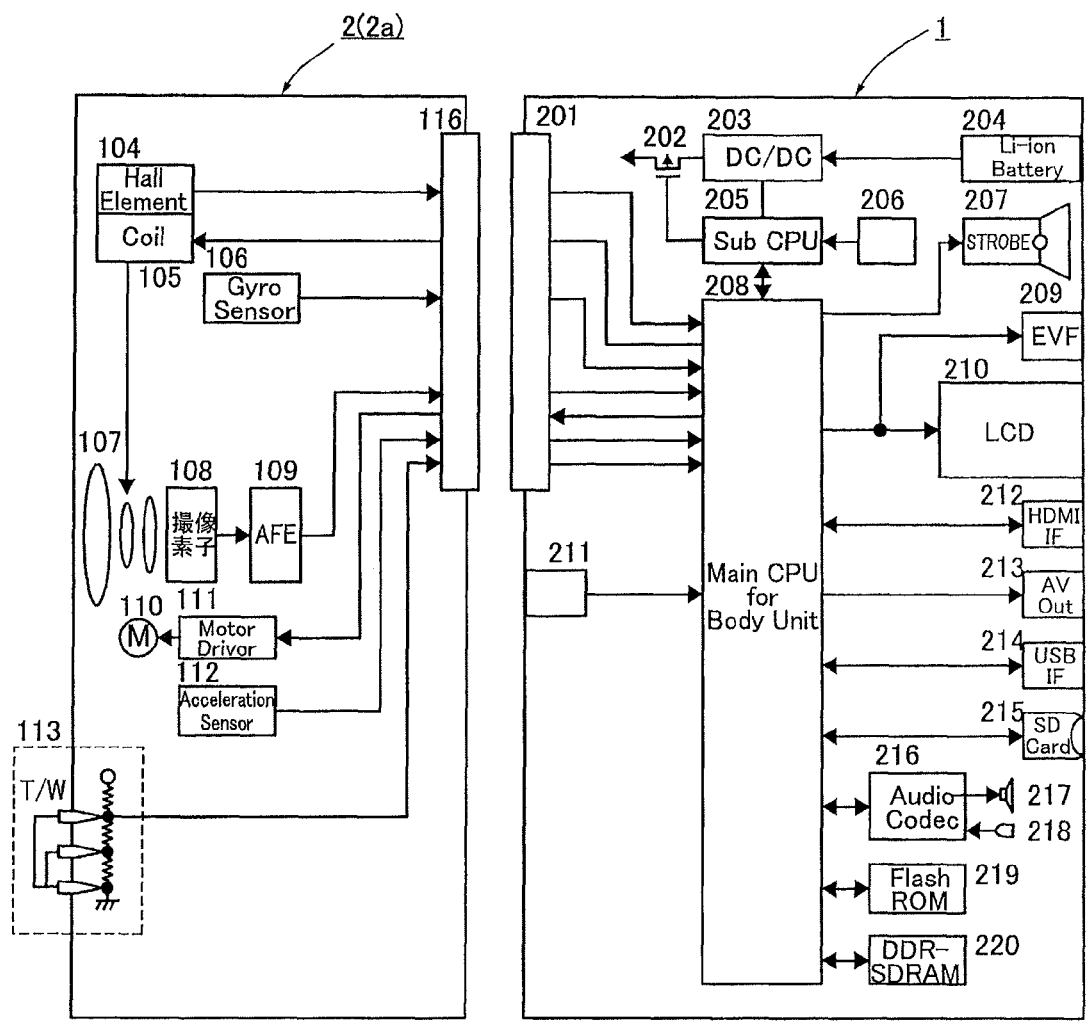
FIG. 16 is a view showing an example of a circuit configuration of electric components incorporated in the camera body and the imaging units shown in FIGS. 1A to 1C.

As shown in FIG. 16, for example, the camera body 1 includes a lithium ion battery 204, a strobe light source 207 (5b), an electronic viewfinder device 209, a liquid crystal display device (LCD) 210, a high-definition multimedia interface (HDMI) 212, an audio-video (AVOut) output terminal 213, a USB interface (USBIF) 214, an SD card interface (SD card) 215, an audio codec circuit (Audio codec) 216, a speaker 217, a microphone 218, a flash ROM 219, a DDR-SDRAM 220, a main CPU 208, operating switches 206 and 211, a sub CPU 205, a DC/DC power circuit 203, a switching element 202, and a connector terminal 201 as the connector 12.

These components constitute part of electric components having publicly-known functions required for a digital camera as an imaging apparatus. The operating switch 206 is a release shutter switch 5y, for example. Meanwhile, the operating switch 211 is an operating key used for operating the liquid crystal display device (LCD) 210 and the like, for example. The liquid crystal display device (LCD) 210 is provided on the back face portion 1B, for example. The operating switch 211 is provided in an appropriate position on the back face portion 1B.

The case 2a of the imaging unit 2 includes an imaging lens unit 107 as an optical system, an imaging device 108, an AFE circuit 109, a hall element 104, a driving coil (Coil) 105, a gyro sensor 106, a motor driver 111, a driving motor (M) 110, an acceleration detection sensor 112, a tele/wide detection switch 113, and a connector terminal 116 as the connector 11.

These components also constitute part of electric components having publicly-known functions for a digital camera as an imaging apparatus. The imaging lens unit 107 includes multiple lenses, and some of those multiple lenses are located in the lens barrel 3.

The first embodiment describes the configuration in which the driving motor (M) 110 and the motor driver 111 are provided in the imaging unit 2. Instead, these components may be provided in the camera body 1.

Here, an electric power is supplied from the camera body 1 to the imaging unit 2. For example, the hall element 104, the driving coil 105, and the gyro sensor 106 constitute part of an image stabilization mechanism. Signals from this image stabilization mechanism are inputted to the main CPU 208 via the connector terminals 116 and 201, and the main CPU 208 executes image stabilization processing based on these signals. The image stabilization processing is processing to correct blurs of an image to be projected onto a receiving surface of the imaging device, the blurs caused by a camera shake. For example, this processing may be conducted so as to drive the imaging device in a direction opposite to a direction of a camera shake detected with the gyro sensor 106. Alternatively, the processing may be conducted by driving some of optical elements in the imaging lens unit 107 in the same direction as the direction of the camera shake detected with the gyro sensor 106.

Image signals from the imaging device 108 are inputted to the main CPU 208 via the AFE circuit 109, and are displayed on the LCD 210 and the like after undergoing predetermined image processing.

A switching signal from the tele/wide detection switch 113 is inputted to the main CPU 208 via the connector terminals 116 and 201. The main CPU 208 controls the motor driver 111 and the driving motor 110 on the basis of switching signals from the tele/wide detection switch 113, the operating switch 211, and the like, thereby controlling drive of the imaging lens unit 107.

A detection output from the acceleration detection sensor 112 is inputted to the main CPU 208 via the connector terminals 116 and 201. The main CPU 208 controls tilt of an image to be displayed on the LCD 210 on the basis of the detection output from the acceleration detection sensor 112. A degree of the tilt of the imaging unit 2 relative to a horizontal line is displayed on the LCD 210 on the basis of the detection output from the acceleration detection sensor 112. The degree of the tilt of the imaging unit 2 relative to the horizontal line may be indicated with a numerical value or displayed with an image.

Figure 17:
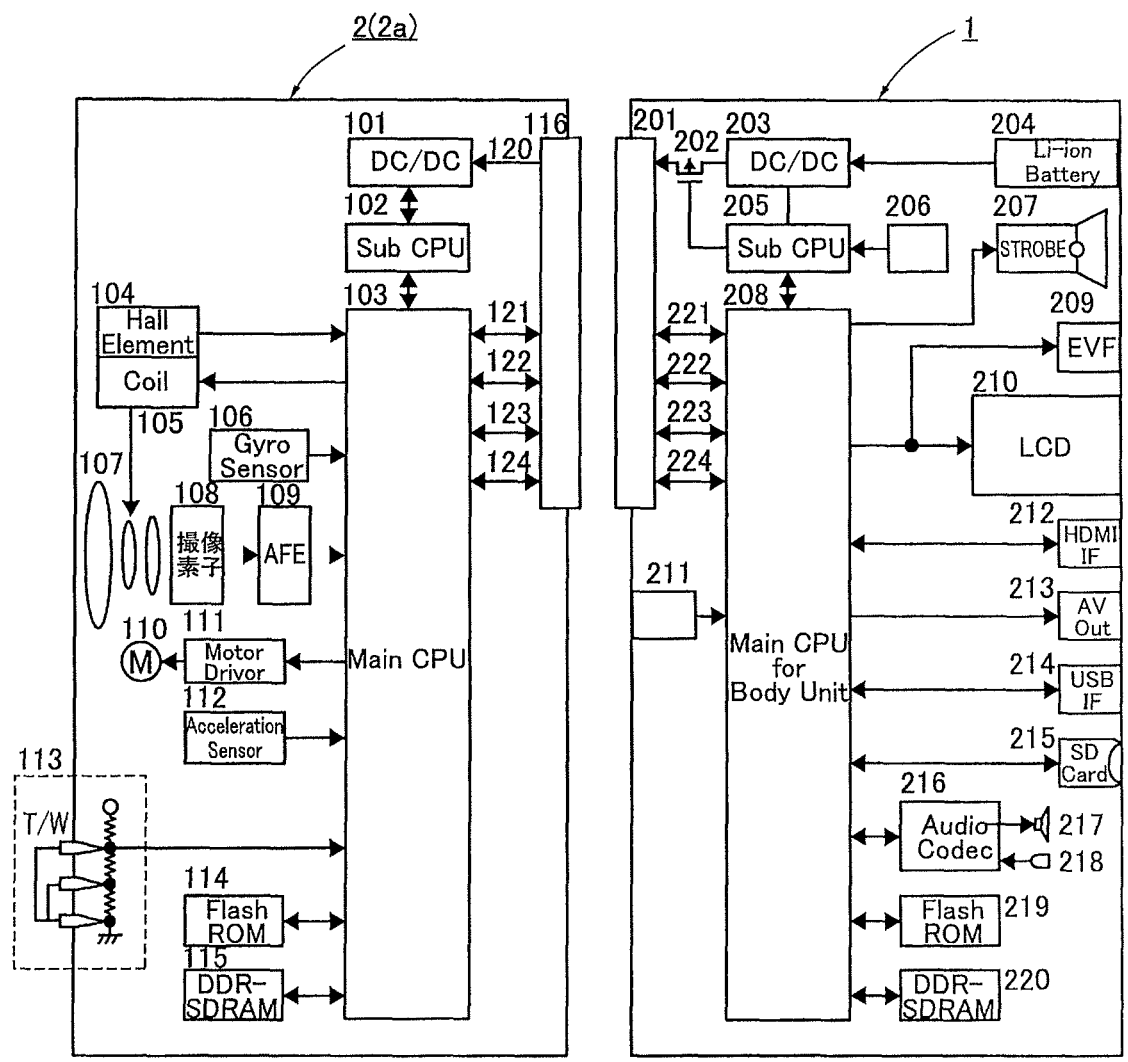
FIG. 17 is a view showing another example of a circuit configuration of electric components incorporated in the camera body and the imaging unit shown in FIG. 1.

As shown in FIG. 17, the imaging unit 2 or 2' may be provided with a DC/DC power circuit 101, a sub CPU 102, a main CPU 103, a flash ROM 114, and a DDRSDRAM 115, and may be configured to perform image processing with the main CPU 103 and then to transmit an image processing signal to the main CPU 208 via the connector terminals 116 and 201. It is also possible to apply a configuration to perform compression processing into a format such as JPEG with the main CPU 103 and then to transmit the compressed image data to the main CPU 208 via the connector terminals 116 and 201. When the imaging unit 2 or 2' is configured to perform the image processing or the compression processing as described above, it is possible to transmit stable images with less noises to the main CPU 208 of the camera body 1.

The main CPU 208 of the camera body 1 monitors a state of connection of a given pin (a camera body side connection detecting pin) of the connector 12. When the main CPU 208 detects that the camera body side connection detecting pin is connected to an imaging unit-side connection detecting pin, the main CPU 208 starts communication and power transmission (supply) between the connector 11 and the connector 12. Here, the communication and the power transmission may be immediately started upon detection of connection of the connection detecting pins, or the communication and the power transmission may be started after a lapse of a predetermined time period. Alternatively, when the connection detecting pin detects the connection, the communication and the power transmission may be started in response to an operation of the operation part provided on the camera body 1 for starting the communication and the power transmission. Moreover, it is also possible to provide a locked state detector configured to detect whether the locking mechanism is set to a locked state and to start the communication and the power transmission when the locked state detector detects that the locking mechanism is set to the locked state.

As described above, according to the embodiment of the present invention, it is possible to attach or detach, to and from the same camera body 1, the imaging units 2 and 2' respectively provided with the lens barrels 3 and 3' having the different sizes and with the imaging devices having the different sizes. The lens barrel 3' of the imaging unit 2' protrudes upward from the case 2a' as shown in FIG. 1B in comparison with the lens barrel 3 of the imaging unit 2. Here, it is preferable to design the camera body 1 and the imaging units 2 and 2' so that the lower faces of the cases 2a and 2a' of the imaging units 2 and 2' are flush with the lower face of the camera body 1 when the imaging unit 2 or 2' is attached to the camera body 1.

Specifically, in this case, the concave portion 1A of the camera body 1 is open on three sides so as to relax the size restriction of the imaging unit 2 to the camera body 1. Accordingly, it is possible to install a large-sized highly-sensitive imaging device or a small-sized imaging device in the imaging unit 2 and to attach or detach various imaging units 2 having different lens barrels or imaging devices to and from the common camera body 1 to meet the needs of a customer. Moreover, since the lens barrel 3 of the imaging unit 2 can be more freely designed in size as compared to the related art, it is possible to offer various imaging units as interchangeable lens group units ranging from a single focus lens to a high magnification zoom lens. Accordingly the customer can upgrade the imaging apparatus by purchasing only a new imaging unit 2 in accordance with a progress in the imaging device 108. Moreover, as the connectors 11 and 12 apply the bay connectors, it is possible to transfer image data in a short time period.

More specifically, conventional standards for lens mounts for interchangeable lenses have restrictions in terms of the size of the imaging device, a distance between the lens mount and the imaging device in an optical axis direction (a flange back), the diameter of the lens mount, and so forth (for example, in the Four Thirds System). Due to these restrictions, there have been limitations in achieving a camera with a thinner thickness and a smaller size as a whole.

On the other hand, according to the present invention, it is possible to design the size of the imaging device, a distance between the optical system and the imaging device in the optical axis direction, the diameter of the lens barrel, and other factors freely for each imaging unit. Depending on the intended use of each of the imaging units, it is possible to combine various optical system with various types and sizes of imaging devices (types: CMOS, CCD, and the like, sizes: APS-C, ⅔ inch type, ½.33 type, and the like) freely.

Moreover, in order to achieve a camera with a thinner thickness and a smaller size as a whole, it is possible to further reduce the length in the optical axis direction of the imaging unit and to further reduce the diameter of the lens barrel, thereby reducing the size of the entire imaging unit.

Meanwhile, in order to improve imaging performance of a camera, it is possible to combine a larger imaging device with a larger optical system. In this way, it is possible to enhance various imaging performances of the camera. In this case as well, there is a high degree of freedom of combination between the optical system and the imaging device. Thus, the optical system and the imaging device can be optimally designed together. Accordingly, it is possible to reduce the size of the entire imaging unit while improving the imaging performance thereof. Here, it is also possible to combine a large optical system with a small imaging device or to combine a small optical system with a large imaging device depending on the intended use.

In addition, both the imaging device achieving a thinner thickness and a smaller size as the entire camera and the imaging unit with an improved imaging performance as a camera can be attached to the same camera body. Accordingly, it is possible to reduce the weight and the size of the entire imaging system including the cameras having various characteristics. In other words, according to the present invention, it is possible to reduce the size of a digital camera (imaging apparatus) itself as well as the size of the entire imaging system, thereby improving portability thereof.

Since 68-pin bay connectors are used for the connectors 11 and 12 configured to perform the communication between the camera body 1 and the imaging unit 2, it is possible to transfer large-capacity image data in a short time period.

Here, in order to perform the communication between the camera body 1 and the imaging unit 2, it is also possible to apply other methods including, for example, a radio communication method, an optical communication method, a contact communication method performing communication by means of abutment instead of engagement, and the like.

Moreover, according to the first embodiment, both of the connectors 11 and 12 are also configured to supply the electric power from the camera body 1 to the imaging unit 2 in addition to the communication. Accordingly, the connectors 11 and 12 are less likely to cause troubles when connecting or disconnecting the connectors. Nevertheless, it is also possible to provide connectors for communication and connectors for power supply separately.

Second Embodiment

Figure 18:
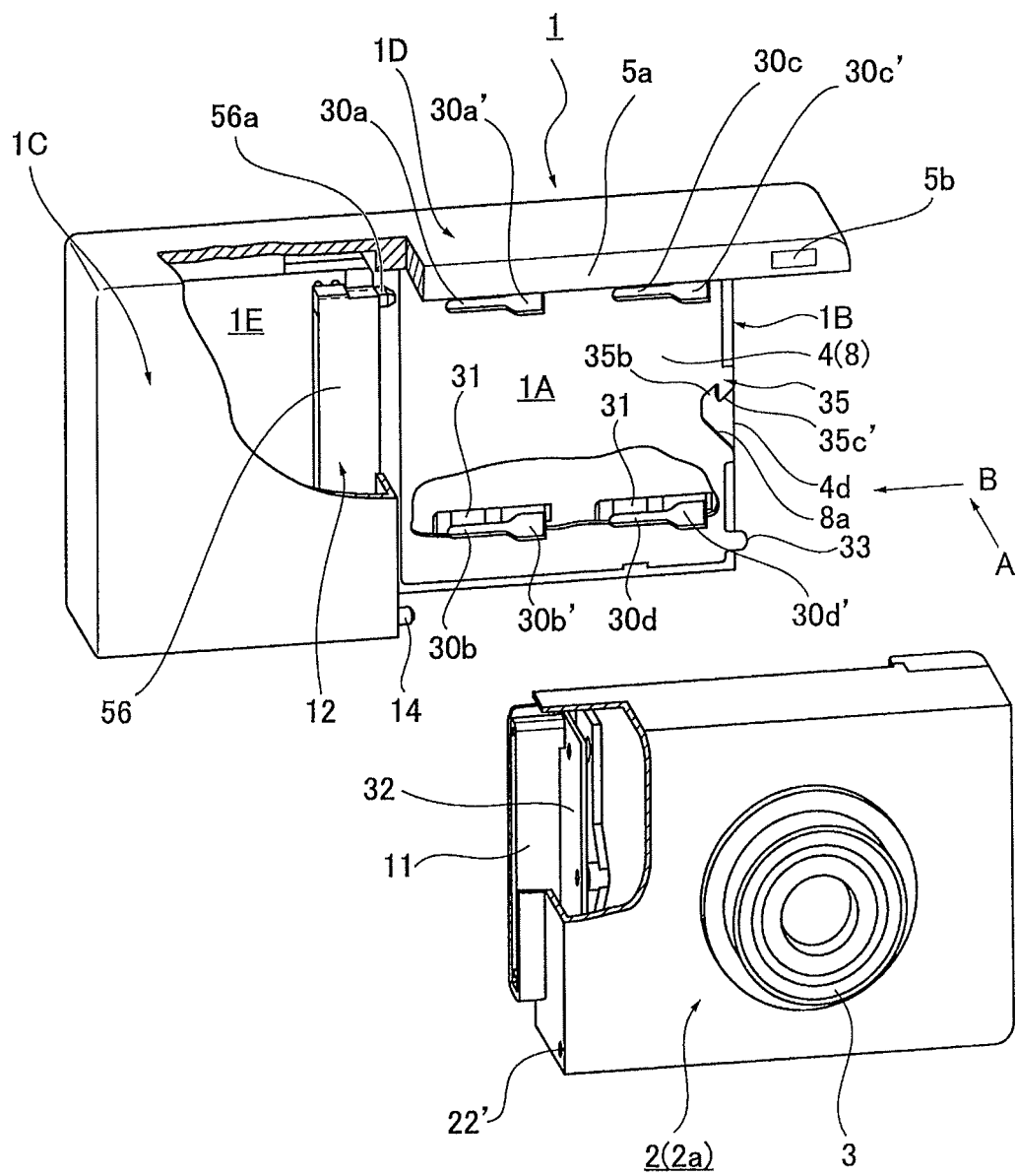
FIG. 18 is an external view for explaining another example of a camera body and an imaging unit to which the present invention is applied, and is a view showing a state where the imaging unit is separated from the camera body.

FIGS. 18 to 22 are explanatory views of an imaging system according to a second embodiment of the present invention. FIG. 18 is an external view showing a state before attaching an imaging device 2 according to the second embodiment to a camera body 1 according to the second embodiment.

As similar to the first embodiment, the camera body 1 includes a concave portion 1A for the imaging unit 2. The imaging unit 2 is formed of a rectangular solid-shaped case 2a. The camera body 1 includes a back face portion 1B, a side face portion 1C, and an upper face portion 1D as three constituents constituting the concave portion 1A. The back face portion 1B is located on the back of the case 2a in a view from a front side of the imaging unit 2 when the imaging unit 2 is attached to the camera body 1 and disposed in the concave portion 1A. The side face portion 1C is located on the left side of the case 2a in the view from the front side of the imaging unit 2 when the imaging unit 2 is attached to the camera body 1 and disposed in the concave portion 1A. The upper face portion 1D is located on the upper side of the case 2a in the view from the front side of the imaging unit 2 when the imaging unit 2 is attached to the camera body 1 and disposed in the concave portion 1A and when the imaging unit 2 is used normally. The back face portion 1B, the side face portion 1C, and the upper face portion 1D are integrally formed.

Figure 19:
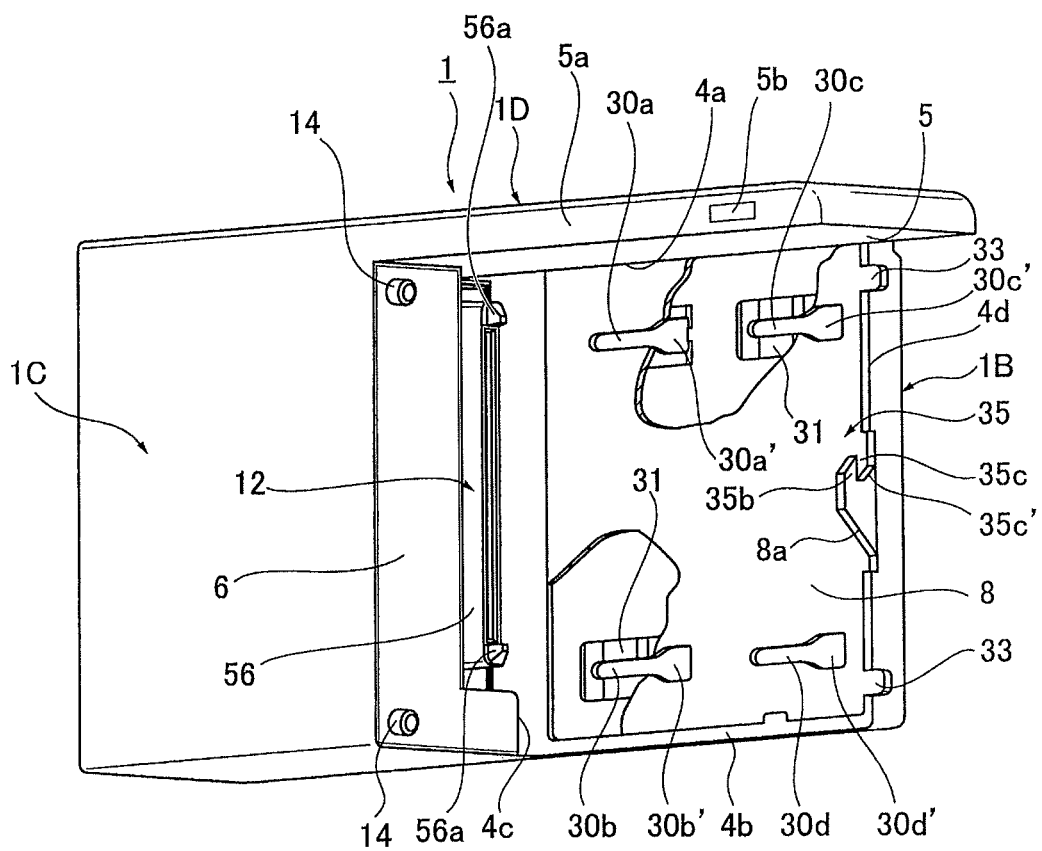
FIG. 19 is a perspective view showing a state of the camera body shown in FIG. 18 viewed from a lower left oblique side.

The back face portion 1B includes a back face wall 4 which faces a back face of the case 2a when the case is attached. A base plate 8 constituting part of the back face wall 4 is fixed to this back face portion 1B. As shown in FIG. 19, the base plate 8 has a substantially rectangular outline shape. Reference numerals 4a and 4b respectively denote an upper edge portion and a lower edge portion extending in the right-left direction. Meanwhile, reference numerals 4c and 4d respectively denote a left edge portion and a right edge portion extending in the vertical direction.

The upper face portion 1D includes an upper face wall 5 facing an upper face of the case 2a when the case is attached, the upper face wall 5 extending in the right-left direction, and having an eave-like shape. This upper face 5 protrudes forward from the upper edge portion 4a of the back face wall 4 when a front face side of the case 2a is defined as a forward side.

The side face portion 1C is formed into a box-shaped portion protruding forward from the back face portion 1B. This box-shaped portion is also used as a grip portion. As shown in FIG. 19, the side face portion 1C includes a side face wall 6 facing a left side face of the case 2a when the case is attached. This side face wall 6 protrudes forward from the left edge portion 4c.

As schematically shown in FIGS. 18 and 19, an outline shape of the concave portion 1A is defined by the back face wall 4, the upper face wall 5, and the side face wall 6. This concave portion 1A is open at a lower end where a lower face of the case 2a is to be located, at a right end where a right side face of the case 2a is to be located, and at a front end where a front face of the case 2a is to be located when the case 2a is disposed therein. The imaging units 2 having different sizes are interchangeably disposed in this concave portion 1A.

The base plate includes four guide holes 30a to 30d extending in the right-left direction. The guide hole 30a and the guide hole 30b constitute a pair of guide grooves which are located closely to the left edge portion 4c with an interval therebetween in the vertical direction. The guide hole 30c and the guide hole 30d constitute another pair of guide grooves which are located closely to the right edge portion 4d with an interval therebetween in the vertical direction. Right edge sides of the respective guide grooves 30a to 30d are formed into enlarged holes 30a' to 30d' so as to allow entry of guide pins to be described later.

Figure 20:
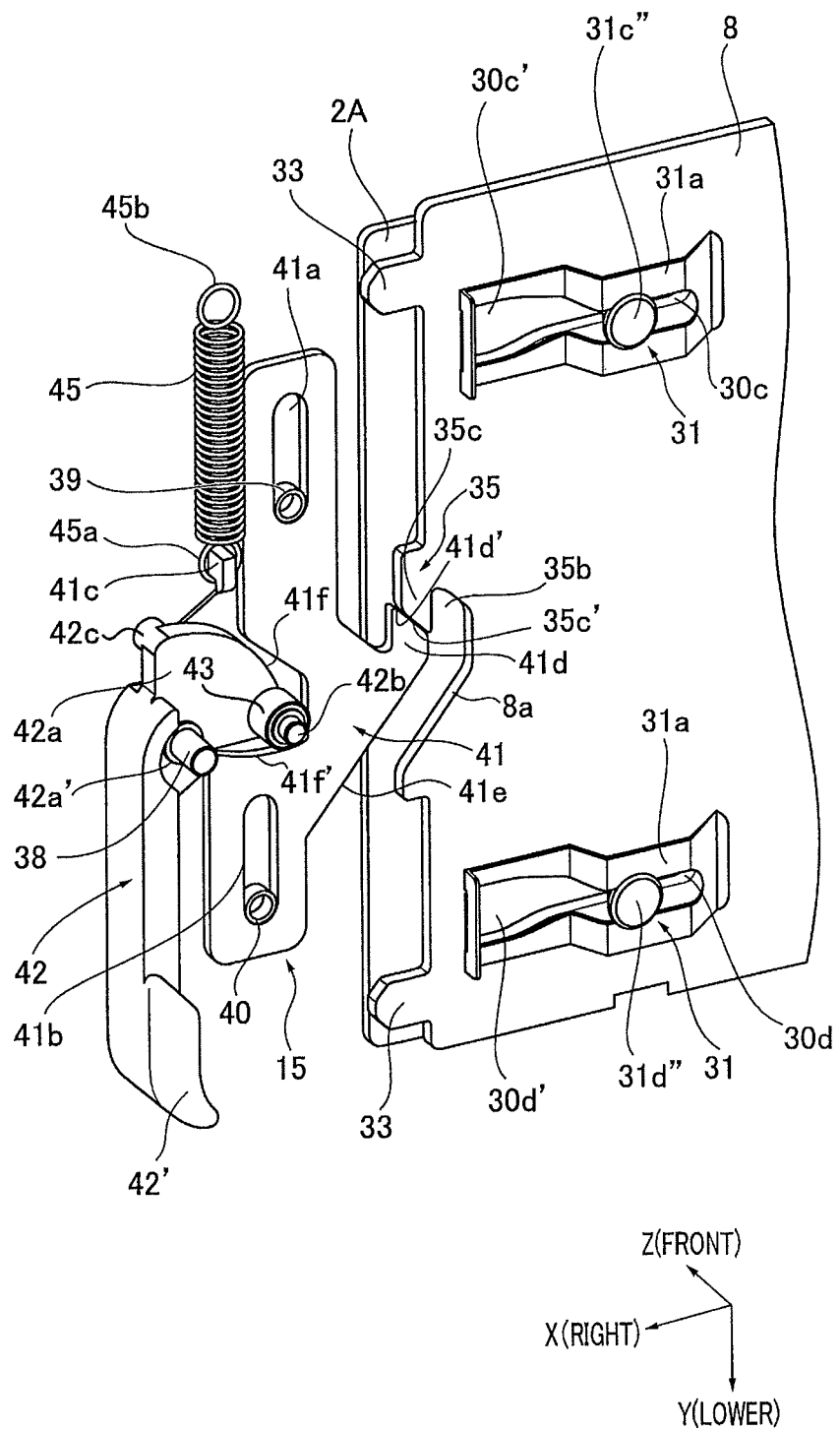
FIG. 20 is a partially enlarged view of a locking portion and an unlocking mechanism shown in FIG. 21.

As shown in FIG. 20, the base plate 8 is provided with biasing plate springs 31 as biasing portions on the side facing the back face wall 4 at positions opposed to the guide holes 30a to 30d, respectively. These biasing plate springs 31 perform a function to bias the imaging unit 2 toward the back face wall 4 when the imaging unit 2 is set on the camera body 1.

In the side face portion 1C, as similarly to the first embodiment, a container 1E for housing various electric components required for the imaging apparatus is formed as shown in FIG. 18, and a connector 12 exposed from the side face wall 6 toward the concave portion 1A is provided. This connector 12 is a multiple-pin connector having a similar configuration and functions to that used in the first embodiment.

The guide holes 30a to 30d extend in a direction corresponding to a direction of insertion of a connector 11. The length of the guide holes 30a to 30d in the right-left direction is designed such that a moving stroke when the guide pins to be described later are inserted to these guide holes 30a to 30d and then the imaging unit 2 is moved toward the side face portion 1C is longer than an insertion stroke of a connector terminal.

As similar to the first embodiment, a pair of engaging protrusions 14 and 14 is formed on the side face wall 6. As similar to the first embodiment, the pair of engaging protrusions 14 and 14 have a function to control positioning of the imaging unit 2 to the camera body 1 in cooperation with a pair of engaging holes 22' and 22' (see FIG. 21) formed on the left side face of the case 2a. When the imaging unit 2 is viewed from the front side, as similar to the first embodiment, an attachment plug as the connector 11 to be engaged with the connector 12 is disposed on the left side face located on the left side as shown in FIG. 18. This attachment plug is fixed to a plug board set 32 provided with an electric circuit. This plug board set 32 is disposed inside the imaging unit 2 by means of a floating structure. The floating structure has a similar function to that in the first embodiment.

On the camera body 1, a pair of engagement protrusions 33 and 33 is provided on the right edge portion 4d of the base plate 8 with an interval therebetween in the vertical direction as shown in FIG. 19. The pair of engagement protrusions 33 and 33 protrudes rightward from the right edge portion 4d.

Figure 21:
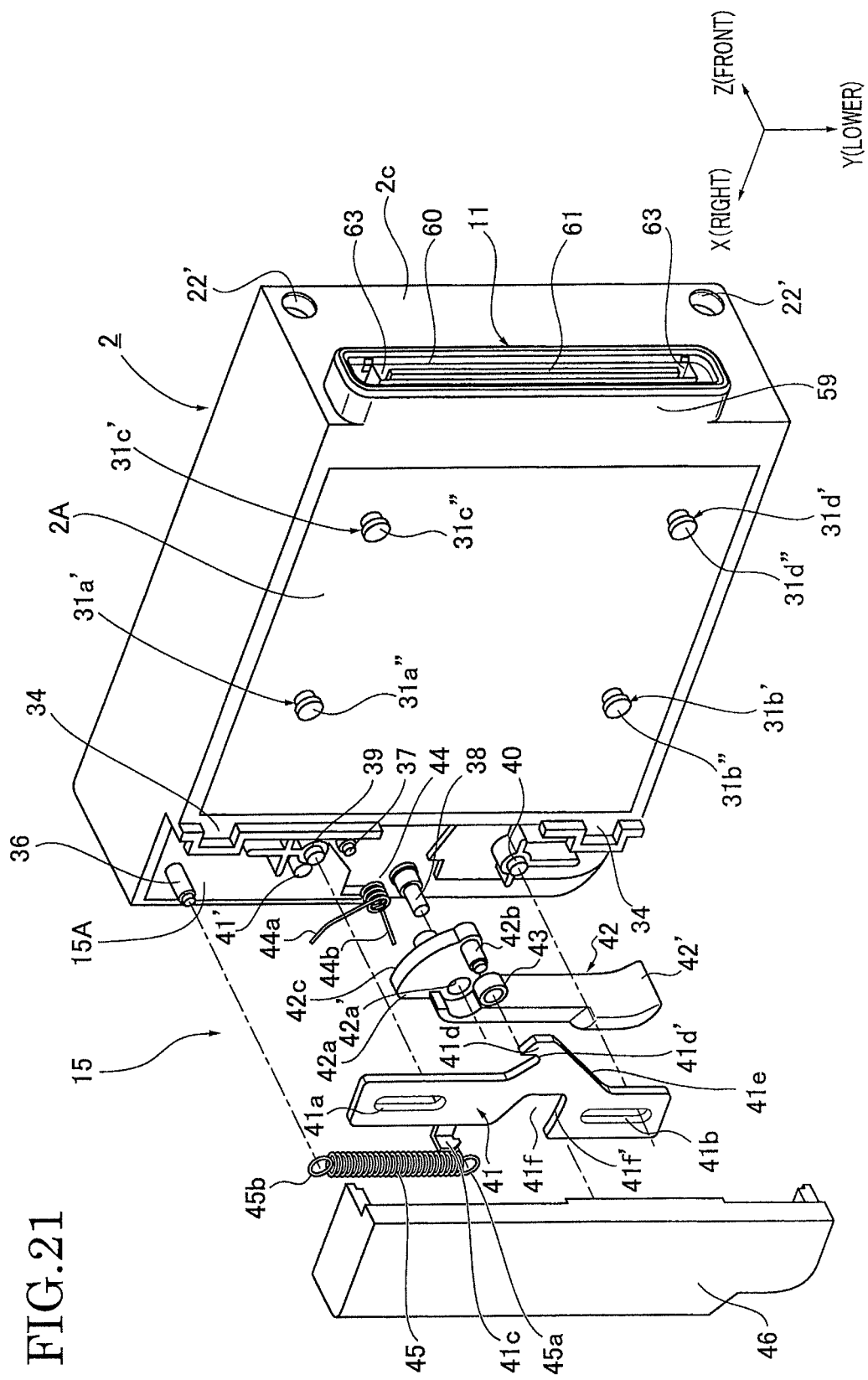
FIG. 21 is an exploded perspective view of the imaging unit shown in FIG. 18 viewed from the back face side, and shows partially exploded internal structures of the imaging unit.

As shown in FIG. 21, guide pins 31a' to 31d' as guide protrusions are provided on a back face plate 2A of the imaging unit 2 so as to correspond to the respective guide holes 30a to 30d. These guide pins 31a' to 31d' include flange head portions 31a'' to 31d'', respectively. These flange head portions 31a'' to 31d'' are inserted from the enlarged holes 30a' to 30d' into the guide holes 30a to 30d, respectively.

Meanwhile, engaging concave sections 34 and 34 to be engaged with the pair of engagement protrusions 33 and 33 are formed on the back face plate 2A in positions corresponding to the pair of engagement protrusions 33 and 33 as shown in FIG. 21. The pair of engagement protrusions 33 and 33 is engaged with the pair of engaging concave sections 34 and 34 when the imaging unit 2 is attached to the camera body 1. The pair of engagement protrusions 33 and 33 and the pair of engaging sections 34 and 34 have a function to attach the imaging unit 2 to the camera body 1 without being loose in cooperation with the pair of engaging protrusions 14 and 14 and the pair of engaging holes 22' and 22', and a function to prevent a connector terminal of the connector 12 on the camera body 1 and a connector terminal of the connector 11 on the imaging unit 2 from being damaged when a careless twisting power is artificially applied to the imaging unit 2.

As shown in FIGS. 20 and 21, an embedding step portion 15A for embedding an ejecting mechanism 15 is provided on the left side of the back face portion when the imaging unit 2 is viewed from the back face side. As shown in FIGS. 18 to 20 and 22, a locking portion 35 is formed on the right edge portion 4d of the base plate 8 of the camera body 1.

The locking portion 35 includes a locking groove 35b and a fall-out prevention piece 35c configured to prevent an engagement claw piece to be described later from coming off. The fall-out prevention piece 35c includes an inclined wall 35c' which allows an engagement plate to be described later to move downward. An inclined wall 8a on which an inclined wall of a lock plate to be described later abuts is formed on the base plate 8.

Figure 22:
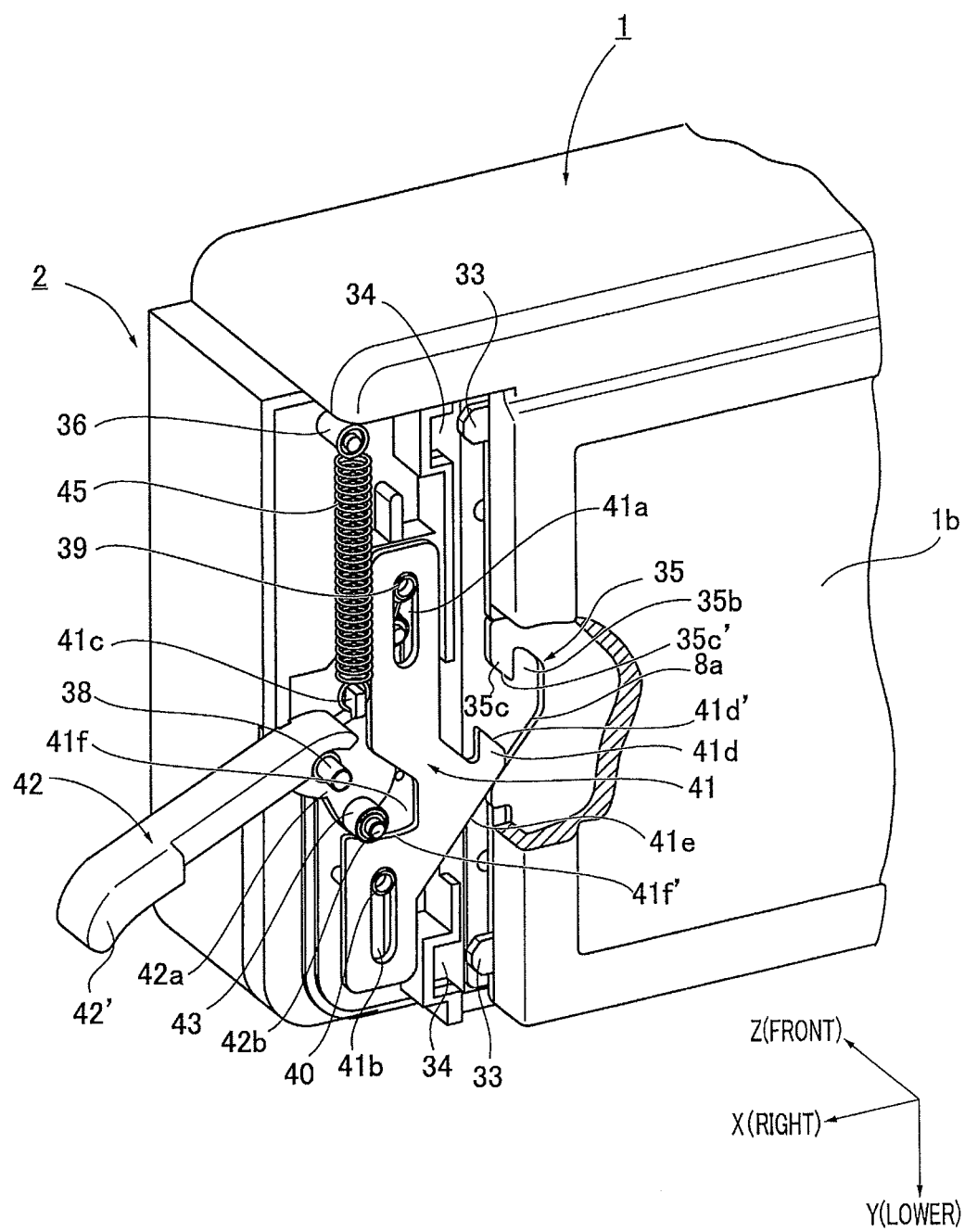
FIG. 22 is a partial perspective view showing a relation between the locking portion and the unlocking mechanism shown in FIG. 20.

As shown in FIGS. 21 and 22, a latch pin 36, support shafts 37 and 38, guide shafts 39 and 40, and an engagement shaft 41' are formed on the embedding step portion 15A in a protruding fashion. A lock plate 41 and a release lever 42 are disposed on the embedding step portion 15A. The release lever 42 includes a fan-shaped plate portion 42a, a shaft hole 42a', a spindle 42b, and an engagement shaft 42c. A collar tube 43 is rotatably provided on the spindle 42b.

A torsion coil spring 44 is provided on the support shaft 37, and the support shaft 38 is inserted to the shaft hole 42a', whereby the release lever 42 is allowed to rotate around the support shaft 38. One end 44a of the torsion coil spring 44 is engaged with the engagement shaft 41' and the other end 44b of the torsion coil spring 44 is engaged with the engagement shaft 42c. The release lever 42 is rotatably biased in a direction opposite to a direction of a releasing operation by a biasing force of the torsion coil spring 44.

Guide grooves 41a and 41b extending in the vertical direction are formed on the lock plate 41 with an interval therebetween in the vertical direction. The guide shafts 39 and 40 are respectively inserted to the guide grooves 41a and 41b, whereby movability of the lock plate 41 in the vertical direction is controlled by cooperation of the guide shafts 39 and 40 and the guide grooves 41a and 41b.

A latch piece 41c is formed on the lock plate 41, and one stopper ring 45a of an extension coil spring 45 is hooked on this latch piece 41c while the other stopper ring 45b of the extension coil spring 45 is hooked on the latch pin 36. Accordingly, the lock plate 41 is biased upward by the extension coil spring 45.

The lock plate 41 is provided with an engagement claw piece 41d to be inserted into the locking groove 35b. This engagement claw piece 41d performs a function to prevent the imaging unit 2 from coming off from the camera body 1 in cooperation with the fall-out prevention piece 35c. This engagement claw piece 41d includes an abutting wall 41d' to abut on the inclined wall 35c'. This abutting wall 41d' is engaged with the inclined wall 35c' when the imaging unit 2 is attached to the camera body 1.

An inclined wall 41e configured to abut on the inclined wall 8a when the imaging unit 2 is attached to the camera body 1 is formed on the lock plate 41. This inclined wall 41e performs a function to allow the imaging unit 2 to move in a pulling-out direction relative to the camera body 1 in cooperation with the inclined wall 8a.

A notch portion 41f is provided in the lock plate 41. A slide wall 41f' as a cam face is formed on this notch portion 41f so as to allow the collar tube 43 to slidably abut thereon. The collar tube 43 performs a function to allow the lock plate 41 to move downward against the biasing force of the extension coil spring 45 in cooperation with the slide wall 41f'. The release lever 42 includes an operating piece 42'. This release lever 42 has a function to cover an ejecting mechanism 15 in cooperation with a decorative lid member 46, thereby improving appearance.

The operating piece 42' slightly protrudes outward from the decorative lid member 46. When the imaging unit 2 is detached from the camera body 1, the release lever 42 is operated in the direction opposite to the biasing force of the torsion coil spring 44 by putting the finger on this operating piece 42'.

Here, the engagement claw piece 41d of the lock plate 41, the extension coil spring 45, and the locking portion 35 of the base plate 8 constitute a locking mechanism. Meanwhile, the collar tube 43 of the release lever 42 and the slide wall 41f' of the lock plate 41 constitute an unlocking mechanism. In addition, the collar tube 43 of the release lever 42, the slide wall 41f' of the lock plate 41, the inclined wall 41e of the lock plate 41, and the inclined wall 8a of the base plate 8 constitute an ejecting mechanism.

Next, procedures for attaching the imaging unit 2 of this second embodiment to the camera body 1 will be described.

When the imaging unit 2 is not attached to the camera body 1, the lock plate 41 is in a lifted position by the biasing force of the extension coil spring 45, and the release lever 42 is located in a position to cover the ejecting mechanism 15 in cooperation with the decorative lid member 46 by the biasing force of the torsion coil spring 44.

The imaging unit 2 is pushed in a direction of an arrow A (the negative side in the Z direction) as shown in FIG. 18 toward the base plate 8 of the camera body 1 while placing the imaging unit 2 so that the guide pins 31a' to 31d' face the enlarged holes 30a' to 30d' of the camera body 1 shown in FIGS. 18 and 19.

Subsequently, when a force in a direction of an arrow B (the negative side in the X direction) toward the side face portion 1C is applied to the imaging unit 2, the imaging unit 2 is moved in the direction toward the side face portion 1C while being controlled by the guide holes 30a to 30d. In midcourse of this motion of the imaging unit 2, the flange head portions 31a'' to 31d'' of the guide pins 31a' to 31d' abut on biasing pieces 31a of the biasing plate springs 31 shown in FIG. 20. Hence a force in the direction toward the back face portion 1B is applied to the imaging unit 2 thereby preventing the imaging unit 2 from being loosely fit.

Furthermore, when the imaging unit 2 is pushed in the direction toward the side face portion 1C, engagement of the engaging protrusions 14 with the engaging holes 22' is started, and electrical connection between the connector 12 and the connector 11 is started slightly after the engagement of the engaging protrusions 14. In this way, the electrical connection between the connector 12 and the connector 11 is established without applying an excessive force to the connector 11 and the connector 12.

Meanwhile, when the imaging unit 2 is pushed in the direction toward the side face portion 1C, the abutting wall 41d' of the lock plate 41 abuts on the inclined wall 35c' of the fall-out prevention piece 35c as shown in FIG. 20 along with the start of engagement of the engaging protrusions 14 with the engaging holes 22'. Further, when the imaging unit 2 is moved in the direction of the arrow B toward the side face portion 1C, the lock plate 41 is moved downward against the upward biasing force of the extension coil spring 45 due to a cooperative action of the abutting wall 41d' and the inclined wall 35c'. Then, along with the further movement of the imaging unit 2 in the direction toward the side face portion 1C, the engagement claw piece 41d passes the fall-out prevention piece 35c.

The engagement claw piece 41d enters the locking groove 35b after the engagement claw piece 41d passes the fall-out prevention piece 35c since the lock plate 41 is moved upward by the upward biasing force of the extension coil spring 45. In this way, the imaging unit 2 is locked on the camera body 1.

Here, the release lever 42 is biased in an direction opposite to a direction of a releasing operation by the biasing force of the torsion coil spring 44, and the state of abutment between the collar tube 43 and the slide wall 41f is temporarily released by the downward movement of the lock plate 41. Thereby, the collar tube 43 is located in a clearance defined by the notch portion 41f. Accordingly, the release lever 42 receives no force when the imaging unit 2 is attached to the camera body 1, and maintains the original state.

Next, procedures for detaching the imaging unit 2 of this second embodiment from the camera body 1 will be described.

As shown in FIG. 22, when the release lever 42 is operated in the direction to pull out the imaging unit 2 while holding the camera body 1, the direction being the direction opposite to the rotational biasing direction of the torsion coil spring 44, for example, the release lever 42 is rotated around the spindle 38, and the lock plate 41 is moved downward against the upward biasing force of the extension coil spring 45 by abutment of the collar tube 43 on the slide wall 41f. In this way, the engagement claw piece 41d recedes from the locking groove 35, and the fall-out prevention piece 35c and the engagement claw piece 41d are disengaged from each other.

At the same time, the imaging unit 2 is allowed to move in the direction to recede from the side face portion 1C by a cooperative action of the inclined wall 8a and the inclined wall 41e. In this way, the engagement between the connector 11 and the connector 12 is released, and the electrical connection is cut off. When the release lever 42 is released, the release lever 42 is rotated around the spindle 38 in the rotational biasing direction of the torsion coil spring 44, and the release lever 42 returns to the original position. Meanwhile, the lock plate 41 is moved upward by the upward biasing force of the extension spring 45, and the lock plate 41 returns to the original position.

In this embodiment, the camera body 1 is provided with the guide holes 30a to 30d as the guide grooves while the imaging unit 2 is provided with the guide pins 31a' to 31d'. However, it is also possible to provide the camera body 1 with the guide pins and to provide the imaging unit 2 with the guide grooves instead.

Meanwhile, the two guide grooves, the two guide pins, the two engagement plate portions, the two biasing plate springs, the two concave grooves, the two engaging protrusions, and the two engaging holes are provided in these embodiments. However, it is also possible to provide three or more pieces of any of these constituents.

(Detailed Description of Connectors Common to First and Second Embodiments)

Next, structures and electrical connection of the connectors 11 and 12 will be described in detail. It is to be noted that the following description may partially include the explanation that has been previously made herein as a matter of convenience.

Figure 23:
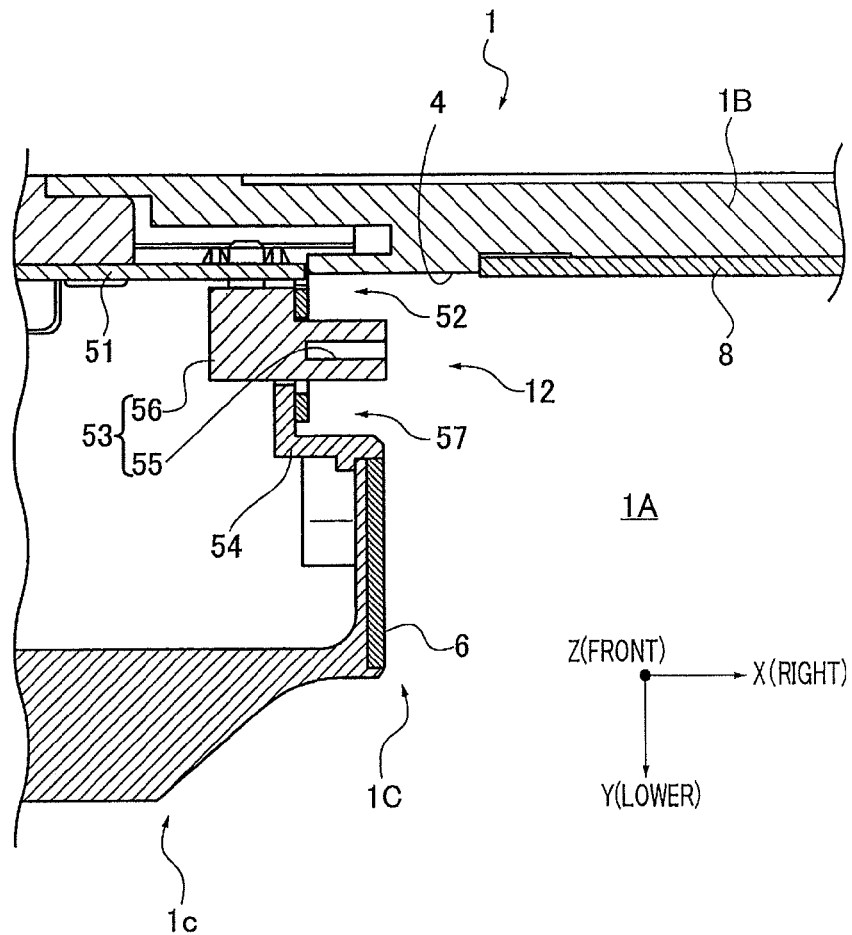
FIG. 23 is a view schematically showing a cross-section of a central portion of a camera body-side connector shown in FIG. 7, the cross-section taken along a plane parallel to an upper face portion and orthogonal to a back face wall.
Figure 24:
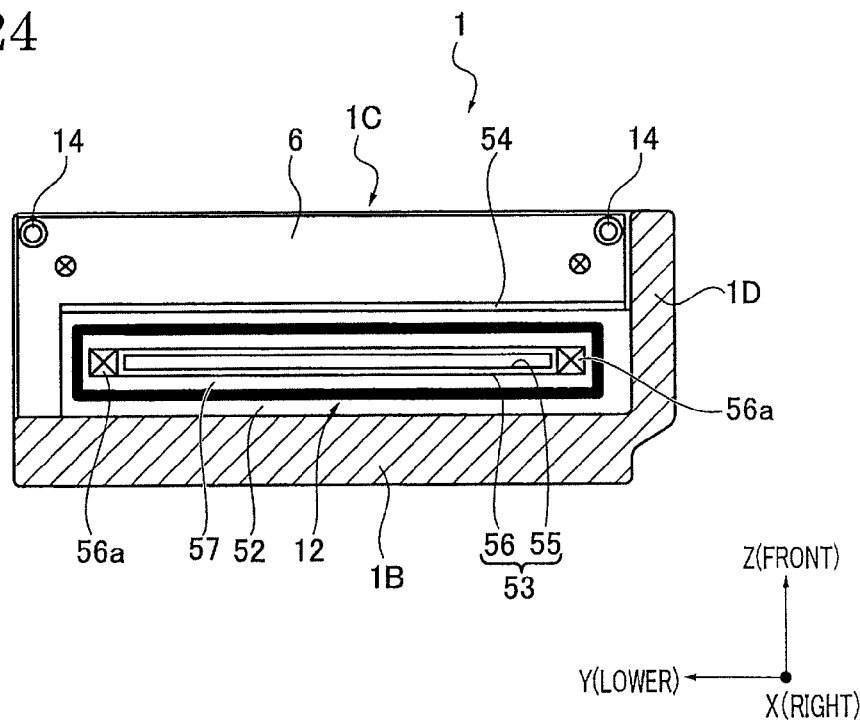
FIG. 24 is a view schematically showing a cross-section of the central portion of the camera body-side connector, the cross-section taken along a plane parallel to a side face wall and orthogonal to the back face wall.
Figure 25:
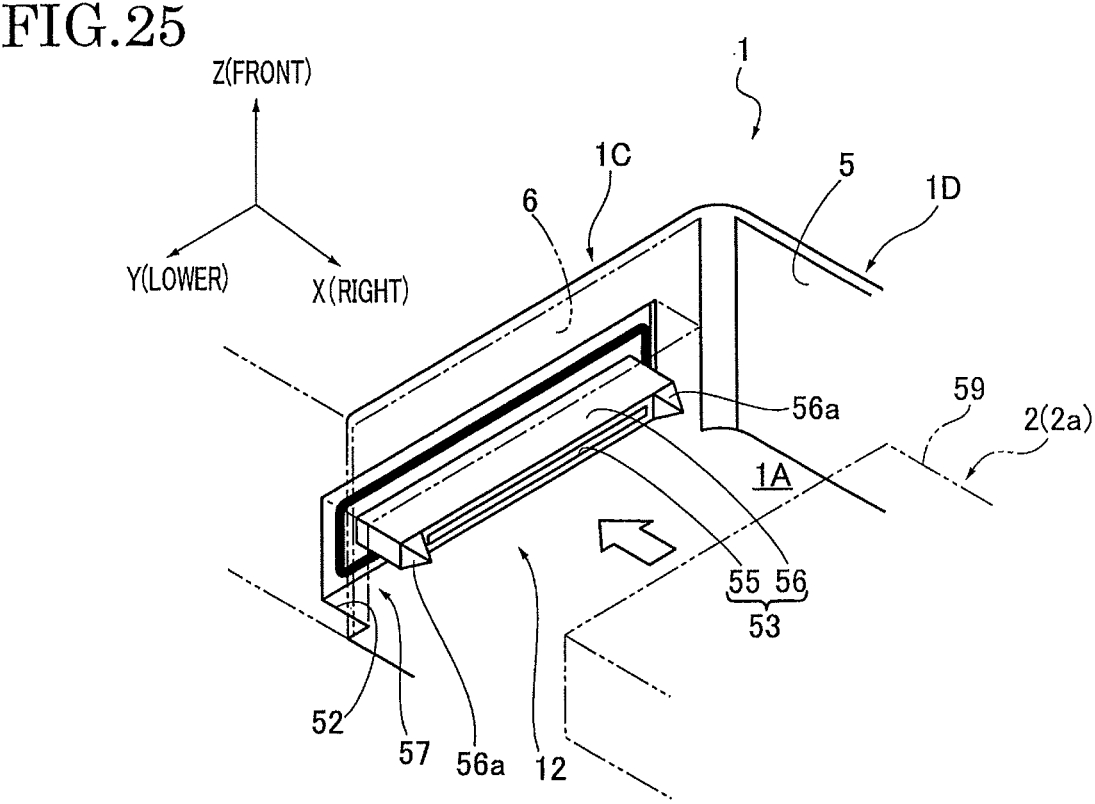
FIG. 25 is a perspective view schematically showing a configuration of the camera body-side connector.

As shown in FIG. 23, the connector 12 is configured by disposing a connector body 53 in an engaging groove portion 52 provided in the side face portion 1C of the camera body 1. The engaging groove portion 52 is a position for locating the body of the connector 12.

The engaging groove portion 52 is located on a lower part (on the back face portion 1B side) constituting a rising base of the side face portion 1C which seems in a rising manner from the back face portion 1B when a plate member 6 (side face wall 6) of the camera body 1 is viewed while seeing the back face portion 1B on the lower side, seeing the upper face portion 1D on the right side, and seeing a forward portion on the upper side. The engaging groove portion 52 is a concave portion which is dented inward from the plate member 6, i.e., the side face portion 1C (dented leftwards from the concave portion 1A).

An outline shape of this engaging groove portion 52 is defined by cooperation of a connector cover member 54 provided on the side face portion 1C, the side face portion 1C, and the back face portion 1B, and an end on the concave portion 1A side, or namely, the right side is open. The engaging groove portion 52 has a sufficient size and dimensions for forming a space (a clearance) around the connector body 53 when the connector body 53 is disposed therein. By this configuration, the connector 12, or the connector body 53 in particular, is avoided from being carelessly touched while allowing a connection (electrical connection) with a connector body 60 of the connector 11 to be described later by means of relative movement of the imaging unit 2 in the right-left direction.

The connector body 53 disposed in this engaging groove portion 52 is electrically connected to the connector body 60 of the connector 11 of the imaging unit 2 to enable data transfer between the camera body 1 and the imaging unit 2. This connector body 53 is formed by covering a connector terminal 55 with a covering member 56.

The connector terminal 55 is the connector terminal which can establish electrical connection to a connector terminal 61 of the connector body 60 of the connector 11 by movement in the right to left direction relative to the connector terminal 61. The connector terminal 55 applies a female type connector terminal.

The connector terminal 55 is electrically connected to a connector board 51 fixed to the camera body 1. This connector board 51 is provided with electrical circuits such as a circuit for controlling the imaging unit 2 by operating the operating unit, a processing circuit for processing an image taken by the imaging unit 2.

The covering member 56 has a longitudinal shape that can cover the connector terminal 55, and is provided with a pair of positioning protrusions 56a on both ends in the vertical direction (both end positions in the Y direction). This covering member 56 has a function to prevent the electric circuits, electric elements, and the like from being damaged by an electrostatic discharge from a human body which may occur upon contact of the hand of the person when the imaging unit 2 is attached to the camera body 1.

In the connector 12, an engaging groove 57 surrounding the connector body 53 is formed inside the engaging groove portion 52 due to a difference in the size between the engaging groove portion 52 and the connector body 53. The engaging groove 57 is formed into a size so that a connector cover portion 59 of the connector 11 of the imaging unit 2 can enter inside the engaging groove 57 while surrounding the connector body 53 and the connector body 60 of the connector 11 connected to each other.

Figure 28:
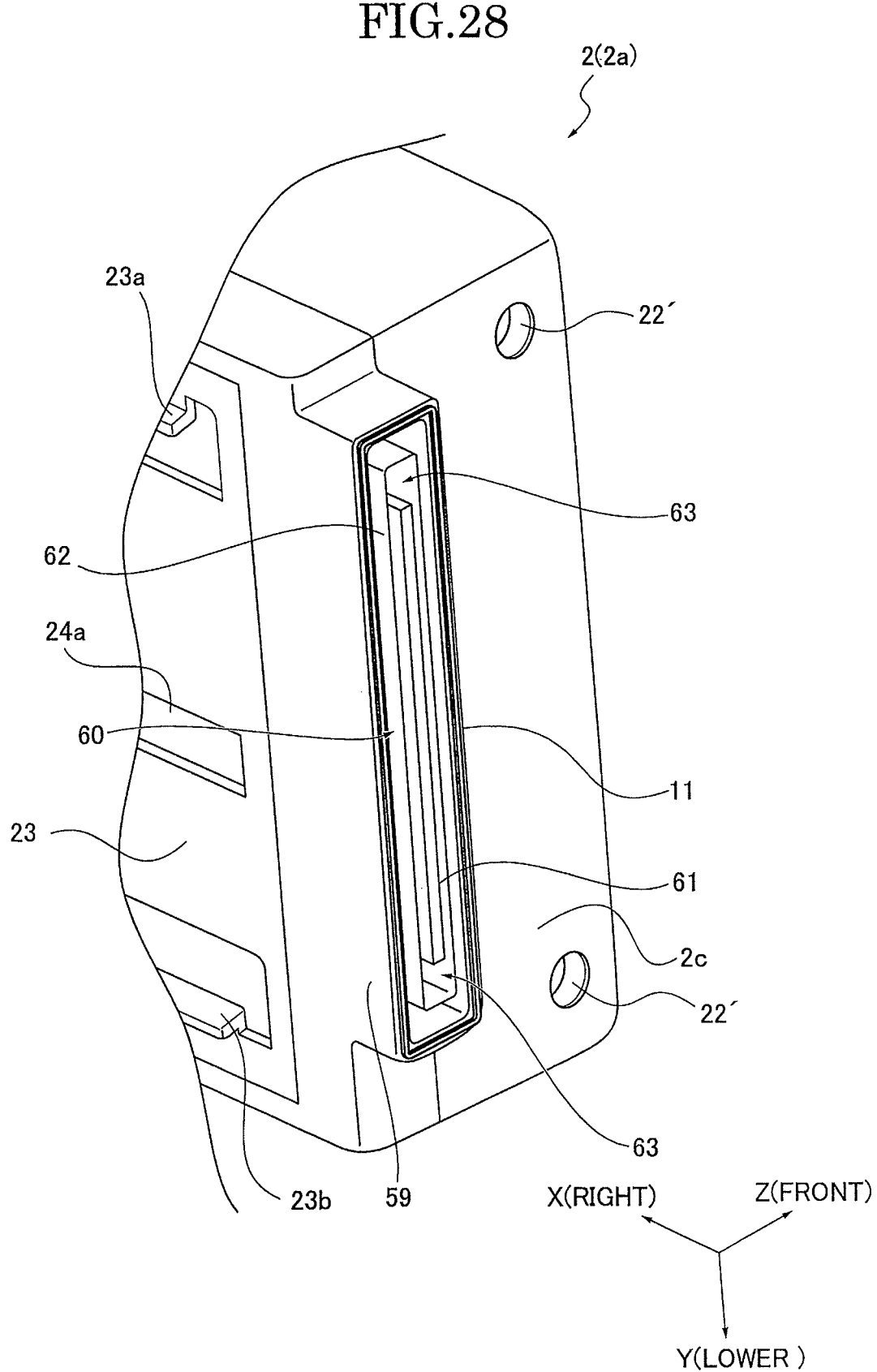
FIG. 28 is a perspective view showing the connector of the imaging unit in an enlarged manner.
Figure 29:
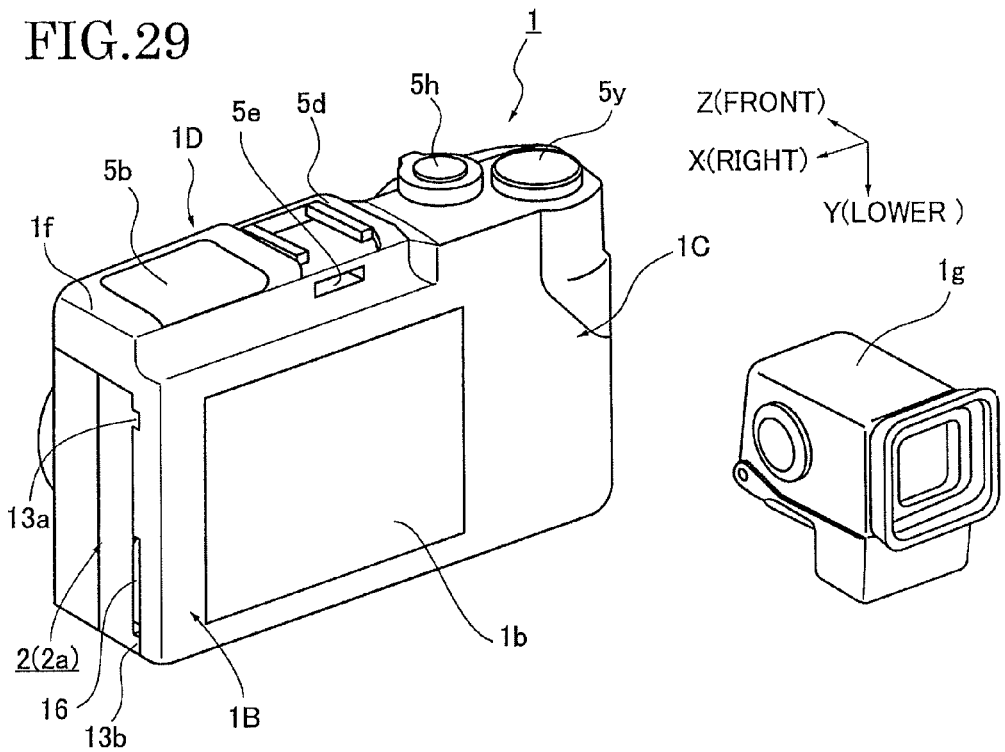
FIG. 29 is an external view showing a state of the camera body viewed from the back face side before an electronic viewfinder is attached to the camera body.

As shown in FIGS. 9, 21 and 28, the connector 11 is formed by disposing the connector body 60 in the connector cover portion 59 which protrudes outward from the left side face 2c of the imaging unit 2 and extends in the vertical direction.

The connector cover portion 59 is formed of a pair of vertically extending walls and a pair of frontward-backward extending walls. The vertically extending walls protrude from the left side face 2c in a direction in which the imaging unit 2 is caused to approach the side face portion 1C and extend in the vertical direction. The frontward-backward extending walls protrude from the left side face 2c in a direction in which the imaging unit 2 is caused to approach the side face portion 1C, connect an upper ends and a lower ends of the vertically extending walls, and extend in the front-back direction (in the state attached to the camera body 1). When the left side face 2c of the imaging unit 2 is viewed from the front thereof, the connector cover portion 59 exhibits a rectangular annular shape which is long in the vertical direction.

This connector cover portion 59 has a positional relationship in which the vertically extending wall on the back face side out of the pair of vertically extending walls is flush (forms substantially the same plane) with the back surface in order to correspond to a positional relation of the connector 12 in the concave portion 1A of the camera body 1.

The connector cover portion 59 has a size so that an outer peripheral surface thereof is allowed to be located inside the engaging groove 57 of the connector 12, that is, so that outer peripheral surface thereof is freely fitted into the engaging groove 57 of the connector 12. The connector body 60 is disposed inside this connector cover portion 59 with a clearance therebetween.

Figure 26:
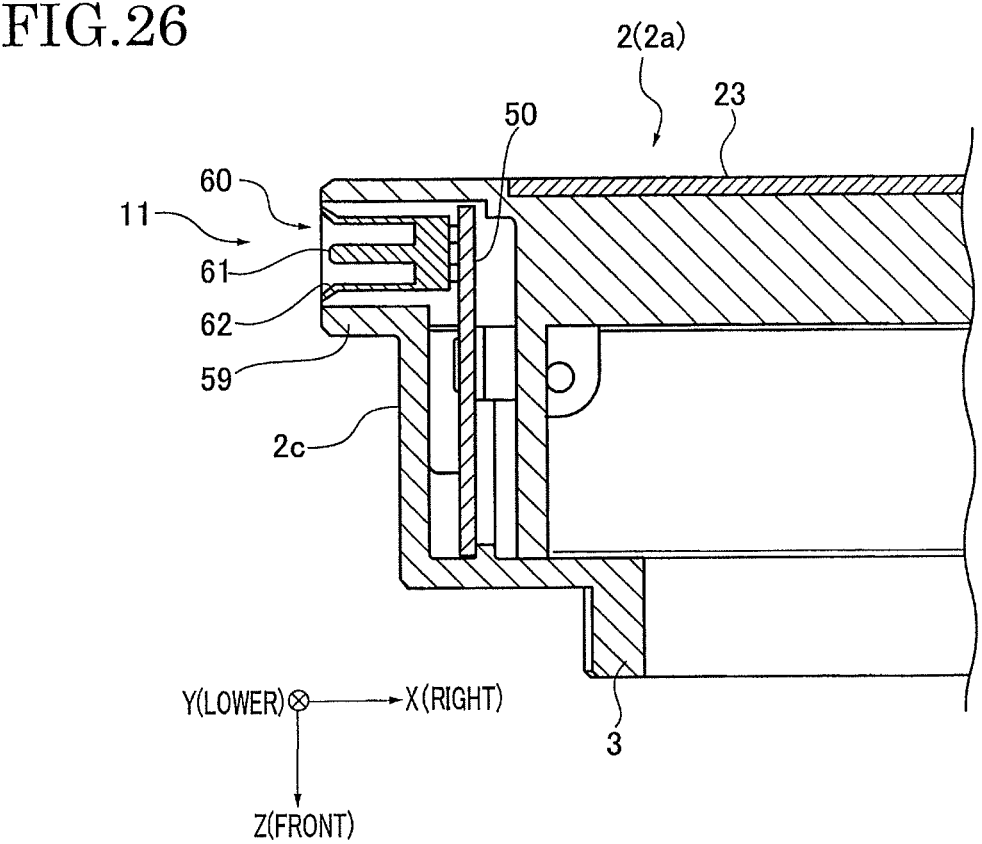
FIG. 26 is a view schematically showing a cross-sectional configuration of an imaging unit-side connector.

The connector body 60 is electrically connected to the connector body 53 of the connector 12 of the camera body 1. As shown in detail in an enlarged manner in FIG. 26, the connector terminal 61 of this connector body 60 is covered with a skirting member 62.

The connector terminal 61 is the connector terminal configured to be electrically connectable to the connector terminal 55 of the connector body 53 of the connector 12 by movement in the right-left direction relative to the connector terminal 55. The connector terminal 61 applies a male type connector terminal protruding leftwards. The connector terminal 61 is electrically connected to a connector board 50 fixed to the imaging unit 2. This connector board 50 is provided with electrical circuits such as a circuit for drive in response to a control instruction from the camera body 1, a circuit for transmitting taken image data to the camera body 1.

The skirting member 62 has a function to prevent electric circuits, electric elements, and the like from being damaged by an electrostatic discharge from a human body which may occur upon contact of the hand of the person when the imaging unit 2 is attached to the camera body 1. This skirting member 62 has an annular shape surrounding the connector terminal 61 with a clearance therebetween so as to receive the covering member 56 of the connector 12 of the camera body 1 therein.

In the connector 11, a pair of positioning holes 63 (see FIGS. 21 and 28) is formed on both ends in the vertical direction between the connector terminal 61 and the skirting member 62 so as to correspond to the pair of positioning protrusions 56a on the connector 12.

Figure 27:
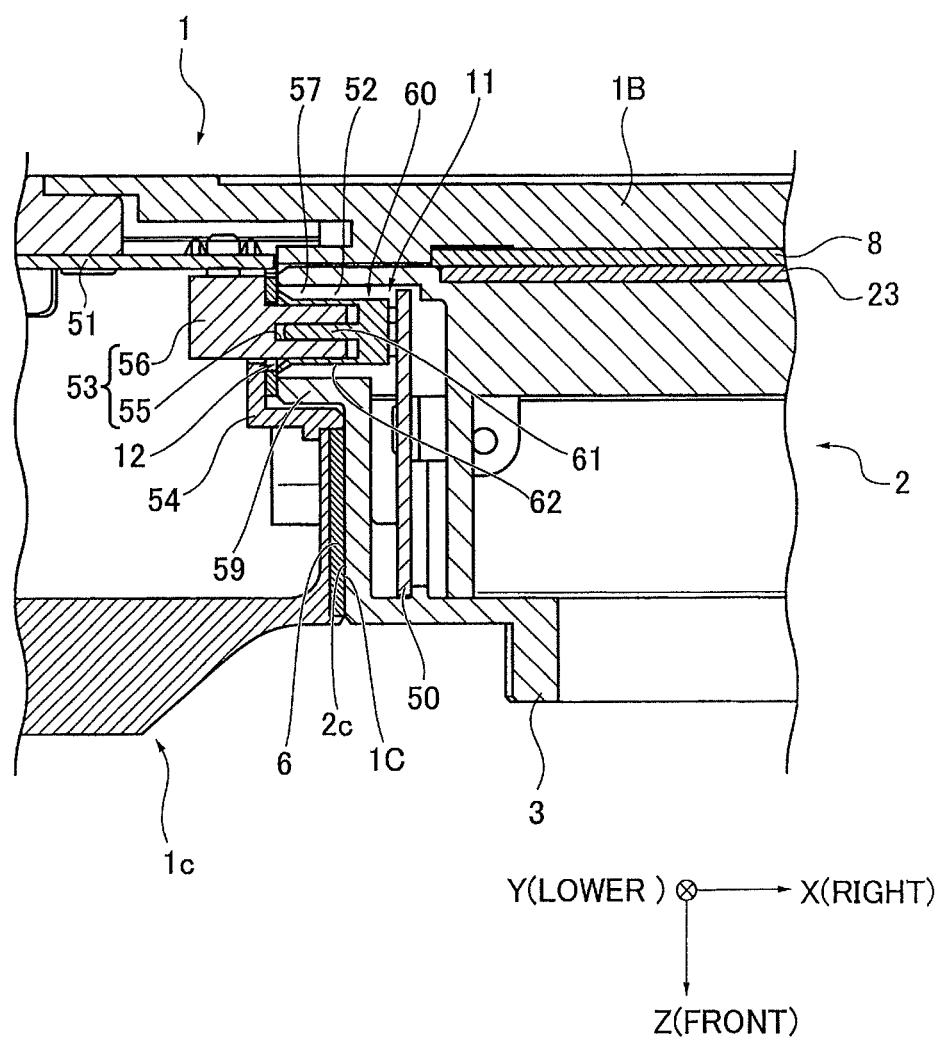
FIG. 27 is a cross-sectional view showing a state where the camera body-side connector is connected to the imaging unit-side connector.

The connector body 60 establishes a connected state with the connector body 53 of the connector 12 in a following manner. The connector terminal 61 is inserted into the connector terminal 55 of the connector 12 in an appropriate state by use of the pair of positioning holes 63 and the pair of positioning protrusions 56a, and thereby the covering member 56 is fitted into the skirting member 62 (see FIG. 27).

When the imaging unit 2 is properly attached to the concave portion 1A of the camera body 1, the left side face 2c of the case 2a abuts on the side face portion 1C, or namely, the metal plate member 6 (side face wall 6). Hence the imaging unit 2 is appropriately positioned in the right-left direction (X direction) in the concave portion 1A.

In this state, the connector cover portion 59 of the connector 11 is formed into the size to be freely fitted to the engaging groove 57 of the connector 12 while annularly surrounding the connector body 60 and the connector body 53 connected thereto with the clearance. Accordingly, the connector cover portion 59 is located inside the engaging groove 57 without contacting the connector body 60 and the connector body 53.

According to the structures of the connectors 11 and 12, positional control of the connector 11 to the connector 12 is substantially established by use of the auxiliary engaging protrusions 14 and the auxiliary engaging holes 22'. Then, the connector cover portion 59 of the connector 11 is freely fitted to the engaging hole 57 of the connector 12, and the connector body 60 of the connector 11 faces the connector body 53 of the connector 12 in a proper position by the guiding action of the pair of the positioning holes 63 and the pair of positioning protrusions 56a.

Subsequently, when the imaging unit 2 is positioned in right-left direction in the concave portion 1A, the connector body 60 of the connector 11 is properly connected to the connector body 53 of the connector 12, whereby the camera body 1 is electrically and communicatably connected to the imaging unit 2.

Third Embodiment

Figure 33:
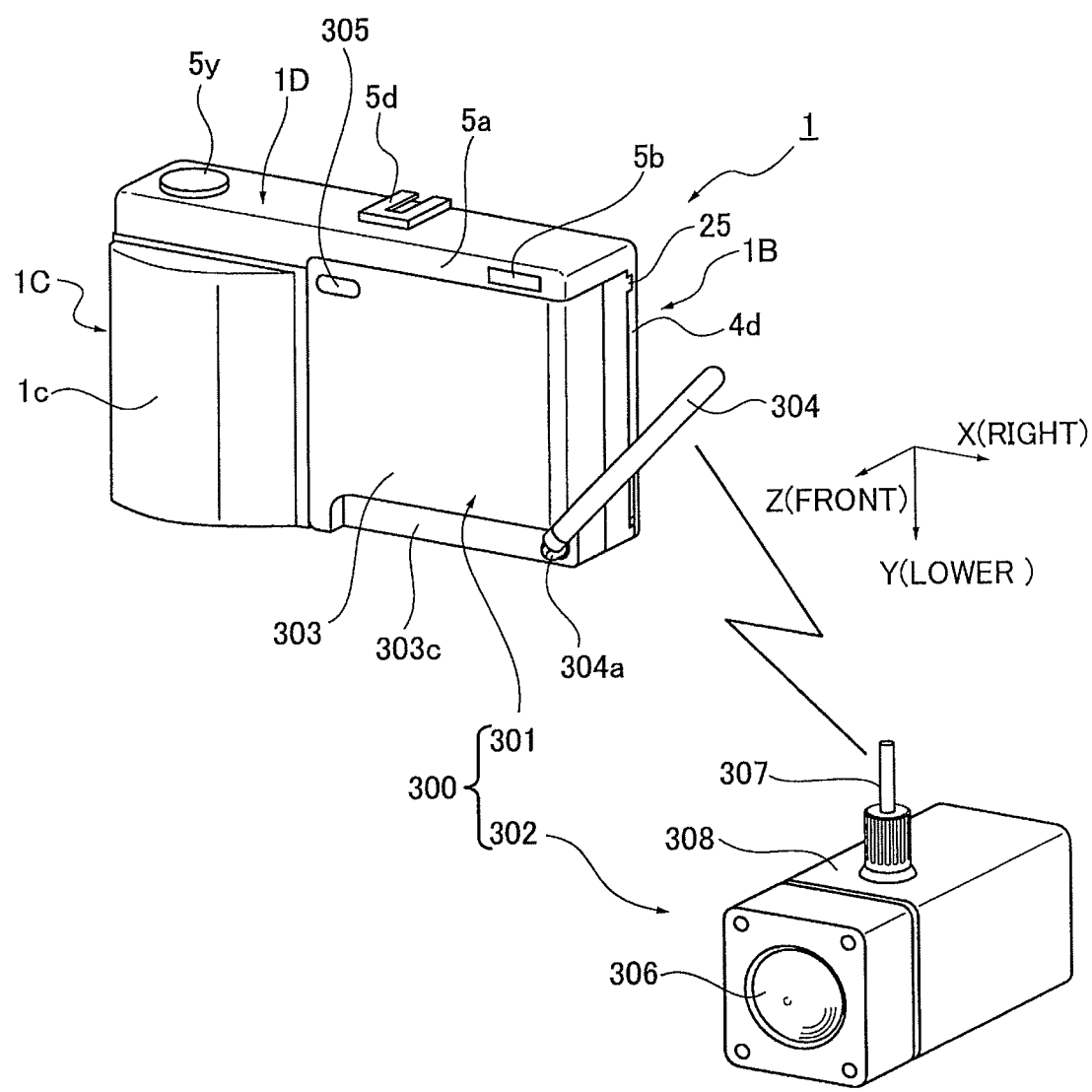
FIG. 33 is an explanatory view schematically showing a wireless camera unit of a third embodiment including a receiver attached to a camera body and a received-image transmitter configured to transmit image data to the receiver.
Figure 34A:
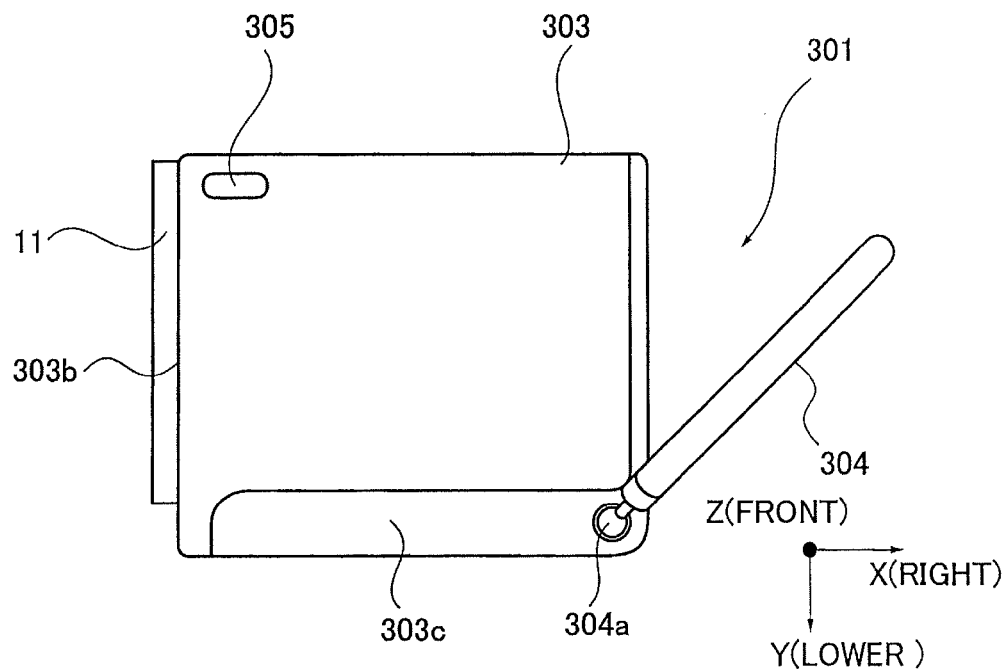
Figure 34B:
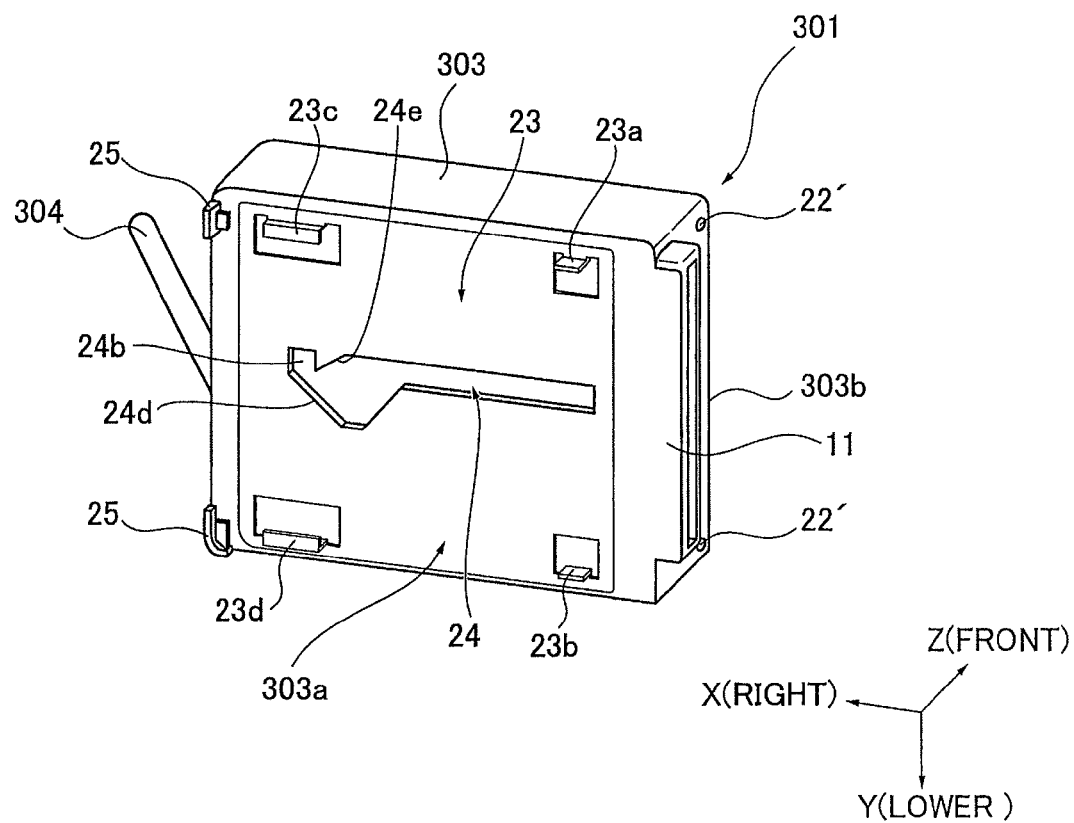
Figure 35A:
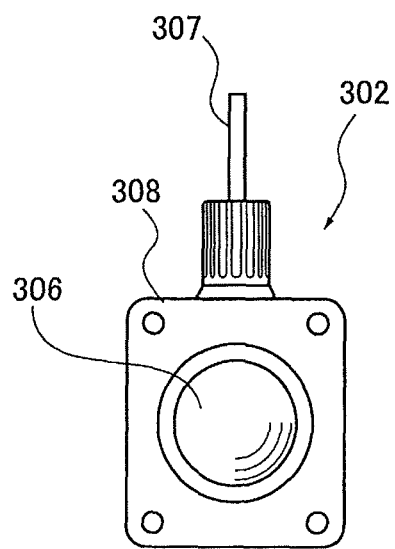
Figure 35B:
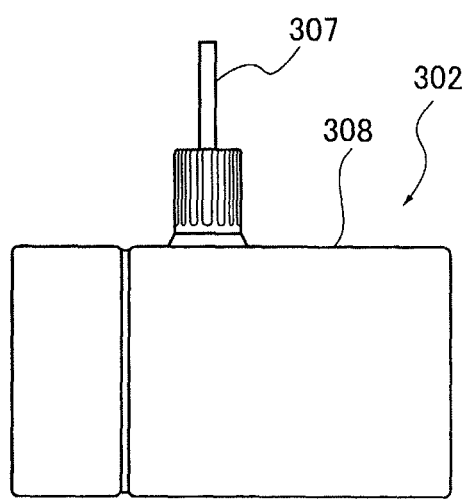
Figure 36:
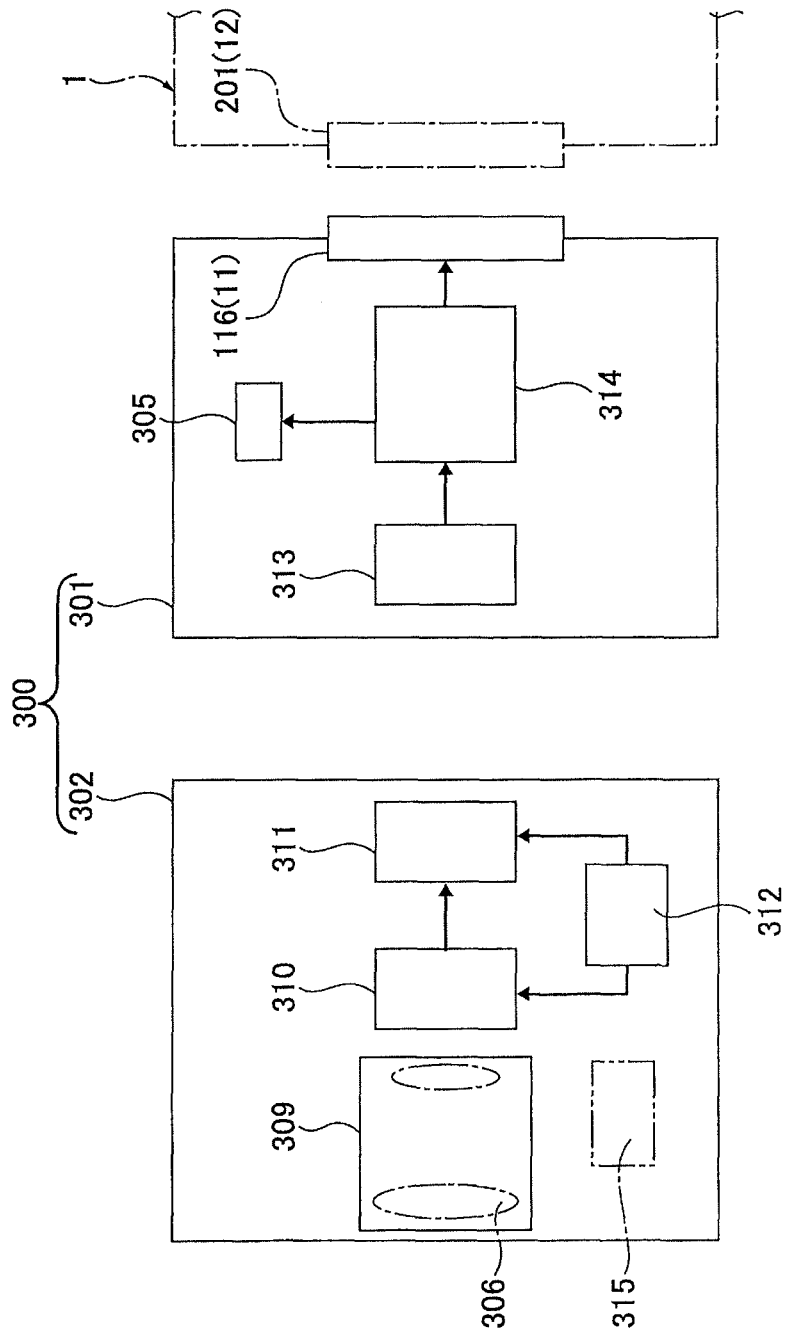
FIG. 36 is a block diagram showing an electrical configuration of the wireless camera unit.

Next, a wireless camera unit 300 as an external unit according to a third embodiment of the present invention will be described. In this third embodiment, the wireless camera unit 300 is shown as another example of the external unit having functions different from those of the imaging unit to be attached to the concave portion 1A of the camera body 1. In this third embodiment, the configuration of the camera body 1 for attaching the wireless camera unit 300 (configuration for attachment) is basically similar to that of the camera body 1 of the above-described first embodiment. Accordingly, the same constituents are designated by the same reference numerals and detailed description thereof will be omitted. FIG. 33 is an explanatory view schematically showing the wireless camera unit 300 including a receiver 301 attached to the camera body 1 and a received-image transmitter 302 configured to transmit image data to the receiver 301. FIGS. 34A and 34B are explanatory views for explaining the receiver 301. FIG. 34A is a schematic diagram of the receiver 301 viewed from a front face side (the positive side in the Z direction). FIG. 34B is a schematic diagram of the receiver 301 viewed from a back face side (the negative side in the Z direction). FIGS. 35A and 35B are explanatory views for explaining the received-image transmitter 302. FIG. 35A is a schematic diagram of the received-image transmitter 302 viewed from a front face side (the positive side in the Z direction). FIG. 35B is a schematic diagram of the received-image transmitter 302 viewed from a side face side (the positive side in the X direction). FIG. 36 is a block diagram showing an electrical configuration of the wireless camera unit 300.

This wireless camera unit 300 includes the receiver 301 attachable to the camera body 1 and the received-image transmitter 302 as a camera which can acquire images. This wireless camera unit 300 is capable of wirelessly transmitting images (image signals) acquired (taken) by the received-image transmitter 302 to the receiver 301 in a state where the receiver 301 is attached to the camera body 1, and further transmitting the images (image signals) received by this receiver 301 to the camera body 1 (main CPU 208 thereof). In other words, the wireless camera unit 300 is configured to acquire the image data and to transmit the image data to the camera body 1 (main CPU 208 thereof), thereby functioning as a wireless camera in cooperation with the camera body 1. Thus, by using the wireless camera unit 300, the camera body 1 (main CPU 208 thereof) is capable of storing the images acquired (taken) with the received-image transmitter 302 located away from the camera body 1 into a storage medium, or displaying such images on the display face 1b.

As shown in FIGS. 33 to 34B, this receiver 301 is formed by housing a reception mechanism to be described later in a case 303 attachable to the concave portion 1A of the camera body 1 (see FIG. 3A) of the first embodiment. As shown in FIG. 34B, in this case 303, a back face 303a facing the back face wall 4 of the camera body 1 and a left side face 303b facing the side face wall 6 of the camera body 1 have configurations which are similar to those in the imaging unit 2 (or 2') of the first embodiment (see FIG. 3B so as to be attachable to the concave portion 1A. Since these configurations are similar to those in the imaging unit 2 (or 2') (see FIG. 3B), the same constituents are designated by the same reference numerals, and detailed description thereof will be omitted.

Moreover, in the third embodiment, the case 303 includes a receiving antenna 304 and an indicator light 305. The receiving antenna 304 is the antenna for receiving the image signals and the like for a reception circuit 313 to be described later. This receiving antenna 304 is rotatably fitted to the case 303 by use of a universal joint 304a and is retractable into a notch portion 303c formed on a front face (a face on the front side in the Z direction) of the case 303. The indicator light 305 is a light emitting part configured to notify whether the receiver 301 is in operation to receive the image signals from the received-image transmitter 302, and is turned on when the receiver is in operation.

As shown in FIGS. 35A and 35B, the received-image transmitter 302 is formed by housing a received-image transmission mechanism to be described later in a case 308 provided with a lens 306 on a front face and a transmitting antenna 307 on an upper face. In the third embodiment, this case 308 applies a waterproof structure with water-tightness. The lens 306 is an object lens constituting part of a imaging optical system 309 to be described later, which is capable of acquiring light outside the case 308 (incident light from an object) while maintaining the water-tightness. The transmitting antenna 307 is the antenna used for transmitting the image signals and the like of a transmission circuit 311 to be described later.

Next, an electrical configuration of this wireless camera unit 300 will be described. As shown in FIG. 36, the received-image transmitter 302 includes the imaging optical system 309, an imaging device 310, the transmission circuit 311, and a power source 312 collectively as an image transmission mechanism. Meanwhile, the receiver 301 includes a reception circuit 313, a controller 314, the indicator light 305 collectively as a reception mechanism, and the connector terminal 116 as the connector 11.

The imaging optical system 309 of the received-image transmitter 302 guides incident light from an object to the imaging device 310. The imaging device 310 converts an object image guided by the imaging optical system 309 into electric signals (image signals), and outputs the signals to the transmission circuit 311. The transmission circuit 311 converts the image signals from the imaging device 310 into signals receivable by the reception circuit 313 of the receiver 301, and transmits the signals via the transmission antenna 307 (see FIGS. 34A and 34 B). The power source 312 supplies power to the imaging device 310 and the transmission circuit 311.

The reception circuit 313 of the receiver 301 receives the signals (image signals) transmitted from the transmission circuit 311 via the receiving antenna 304, and outputs the received signals (image signals) to the controller 314. The transmission and reception between this reception circuit 313 and the transmission circuit 311 may apply an analog mode or a digital mode. Although illustration is omitted, the controller 314 includes an image generation circuit configured to generate image data on the basis of the signals (image signals) inputted from the reception circuit 313, and a drive control circuit configured to perform control of drive of the reception circuit 313, the indicator light 305, and the like as a whole. This drive control circuit outputs the image data generated by the image generation circuit to the connector terminal 116 to output the image data to the main CPU 208 (see FIGS. 16 and 17) of the camera body 1 as appropriate. This connector terminal 116 constitutes the connector 11, and is similar to the connector terminal 116 (see FIGS. 16 and 17) provided in the imaging unit 2 (or 2') (see FIG. 3B). The power is supplied from the camera body 1 to this reception mechanism, i.e., the transmitter 301, through the connector terminal 116.

This wireless camera unit 300 is capable of causing the camera body 1 to function as the wireless camera by attaching the receiver 301 to the camera body 1 as similar to the imaging unit 2 (or 2') of the first embodiment (see FIG. 3B).

Moreover, since the configuration for attaching the receiver 301 of the wireless camera unit 300 to the camera body 1 is similar to that for attaching the imaging unit 2 (or 2') of the first embodiment (see FIG. 3B), it is possible to obtain an effect similar to that of the imaging unit 2 (or 2').

In the configuration of the third embodiment, the controller 314 (image generation circuit) of the receiver 301 generates the image data on the basis of the signals (image signals) acquired (taken) by the received-image transmitter 302. However, it is also possible to provide this image generation circuit in the received-image transmitter 302 or in the camera body 1 instead. In this context, the present invention will not be limited only to the configuration of the third embodiment.

Moreover, in the configuration of the third embodiment, the signals (image signals) acquired (taken) by the received-image transmitter 302 are transmitted to the receiver 301. However, it is also possible to apply a configuration in which signals are transmitted from the receiver 301 to the received-image transmitter 302 instead. As for such a configuration, it is conceivable to provide the received-image transmitter 302 with a driving mechanism 315 (see FIG. 36) as a driver for the imaging optical system 309 and a drive motor, and provide the camera body 1 with an operating unit (not shown) for focus adjustment of the received-image transmitter 302, and to transmit a signal corresponding to an operation by the operating unit from the receiver 301 to the received-image transmitter 302, for example.

Further, in the configuration of the third embodiment, the receiver 301 and the received-image transmitter 302 are configured to perform transmission and reception of the signals wirelessly. However, the receiver 301 and the received-image transmitter 302 may perform transmission and reception of the signals through a wire instead. In this context, the present invention will not be limited only to the configuration of the third embodiment.

In the third embodiment, the received-image transmitter 302 is provided with the power source 312. However, a cable for supplying power may be provided between the receiver 301 and the received-image transmitter 302. In this context, the present invention will not be limited only to the configuration of the third embodiment.

In the configuration of the third embodiment, the received-image transmitter 302 is formed by housing the received-image transmission mechanism in the case 308 applying the waterproof structure. However, it is also possible to embed the image transmission mechanism in a housing which does not apply a waterproof structure. In this context, the present invention will not be limited only to the configuration of the third embodiment.

According to the third embodiment, the receiver 301 is formed into a size so that the receiver 301 is capable of being fitted into the concave portion 1A of the camera body 1 as shown in FIG. 33. However, since the concave portion 1A of the camera body 1 is open on the three sides, the size of the case 303, i.e. the receiver 301 is not particularly limited as long as the connector 11 connectable to the connector 12 provided on the camera body 1 is provided so as to correspond to the configuration of the concave portion 1A. In this case, since the case 303 is configured to be attached to the concave portion 1A of the camera body 1, it is preferable to provide the case 303 with legs or other components for stabilizing the posture when attached to the concave portion 1A, if the case 303 has a larger size as compared to the size of the camera body 1.

According to the third embodiment, in the case 303 of the receiver 301, the configurations of the back face 303a and the left side face 303b are similar to those of the imaging unit 2 (or 2') of the first embodiment (see FIG. 3B) in order to allow attachment to the concave portion 1A of the camera body 1 of the first embodiment (see FIG. 3A). However, the back face 303a and the left side face 303b may apply similar configurations to those of the imaging unit 2 (or 2') of the second embodiment (see FIG. 21) in order to allow attachment to the concave portion 1A of the camera body 1 of the second embodiment (see FIG. 19) instead. Alternatively, it is also possible to provide the unit with the structure for allowing attachment to the concave portion 1A which is originally provided on the camera body, and to provide the camera body with the structure which is originally provided on the unit. In this context, the present invention will not be limited only to the configuration of the third embodiment.

Fourth Embodiment

Figure 37:
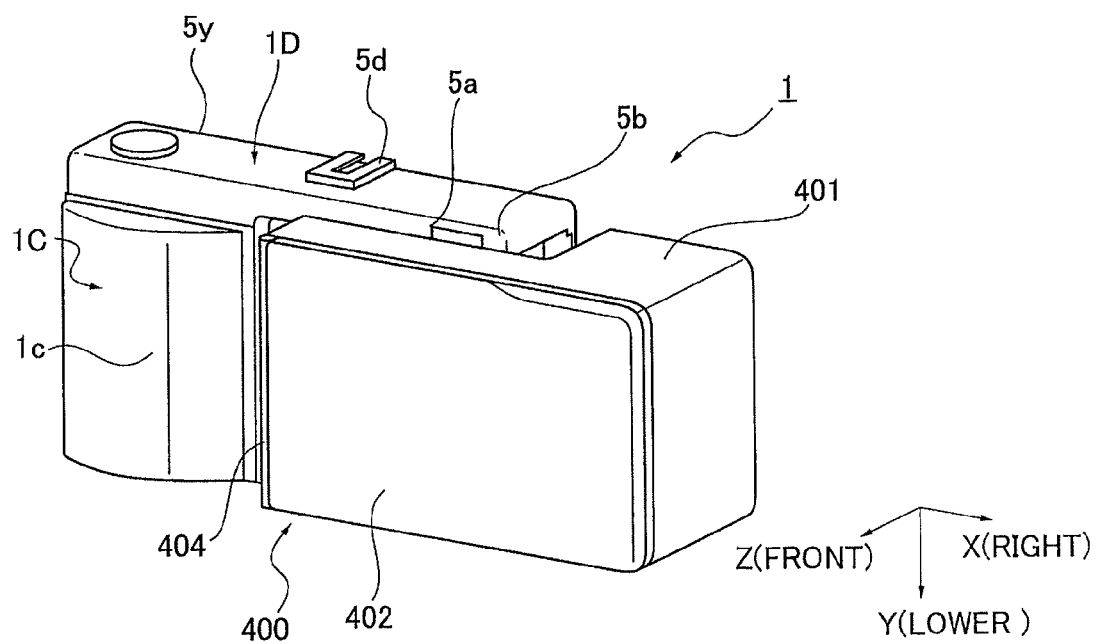
FIG. 37 is an explanatory view schematically showing an image reader unit of a fourth embodiment attached to a camera body.
Figure 38A:
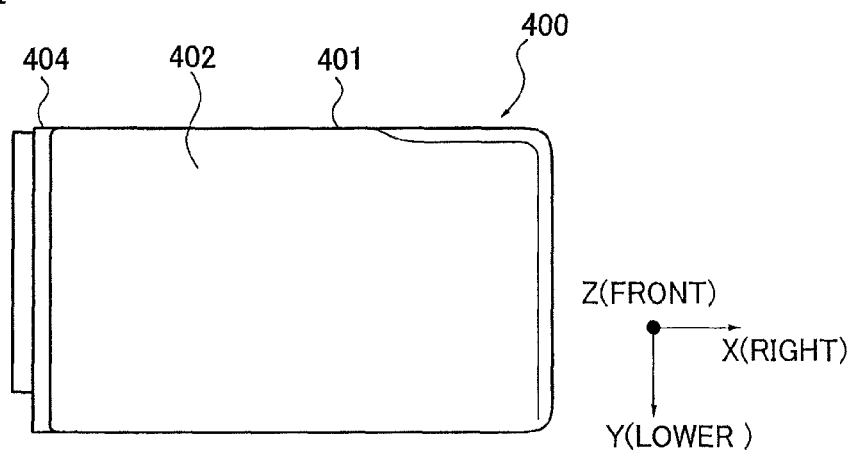
Figure 38B:
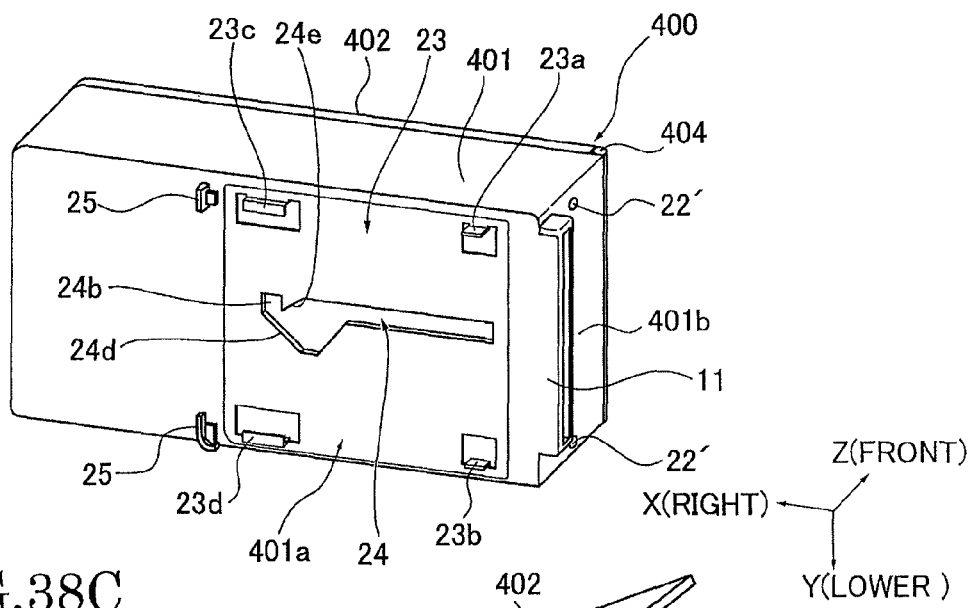
Figure 38C:
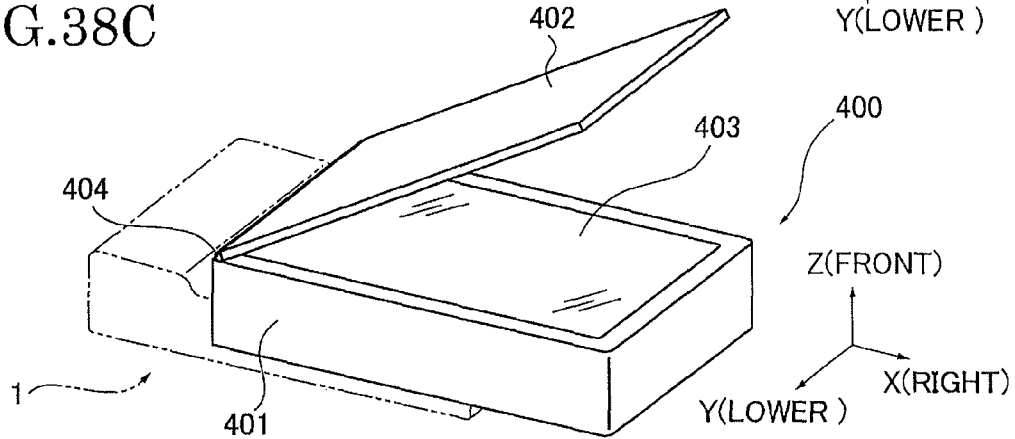
Figure 39:
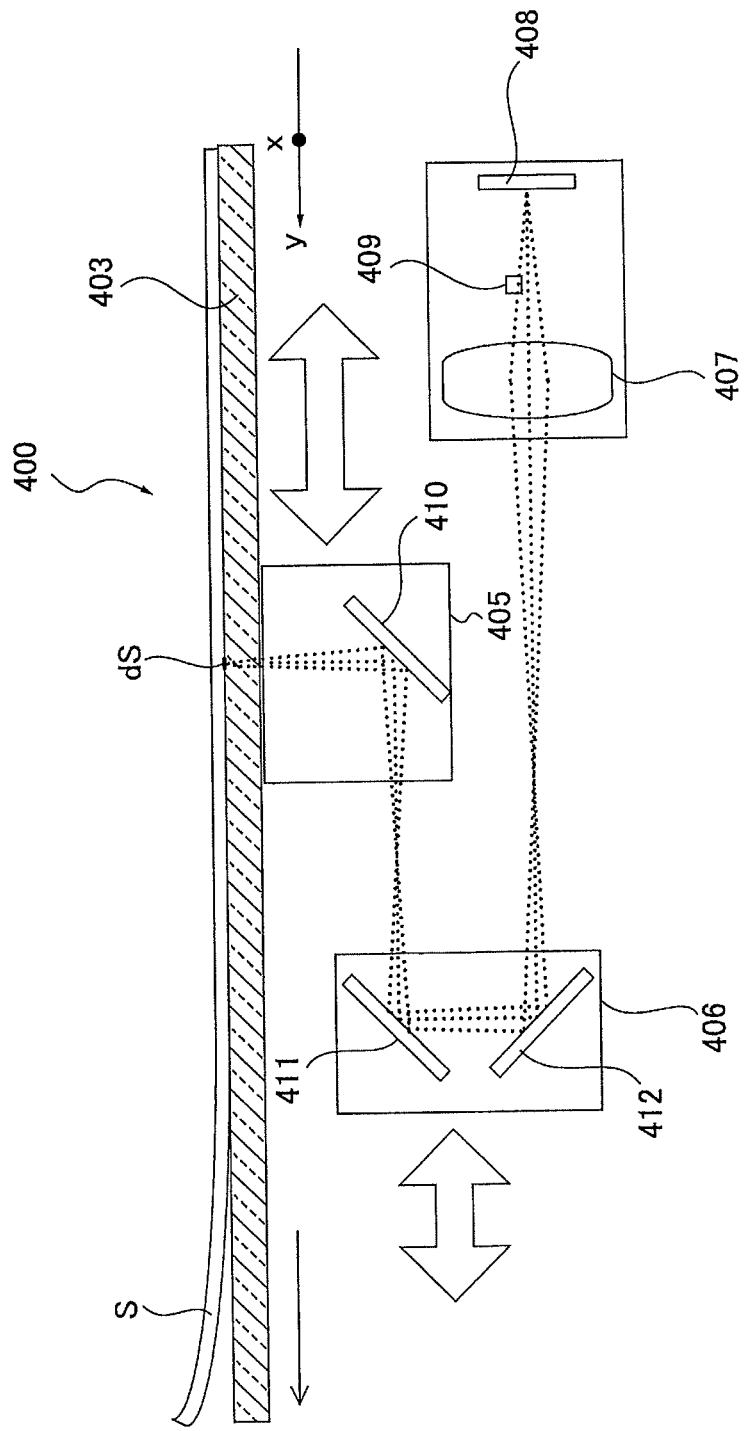
FIG. 39 is an explanatory view schematically showing a configuration of an optical system of the image reader unit.
Figure 40:
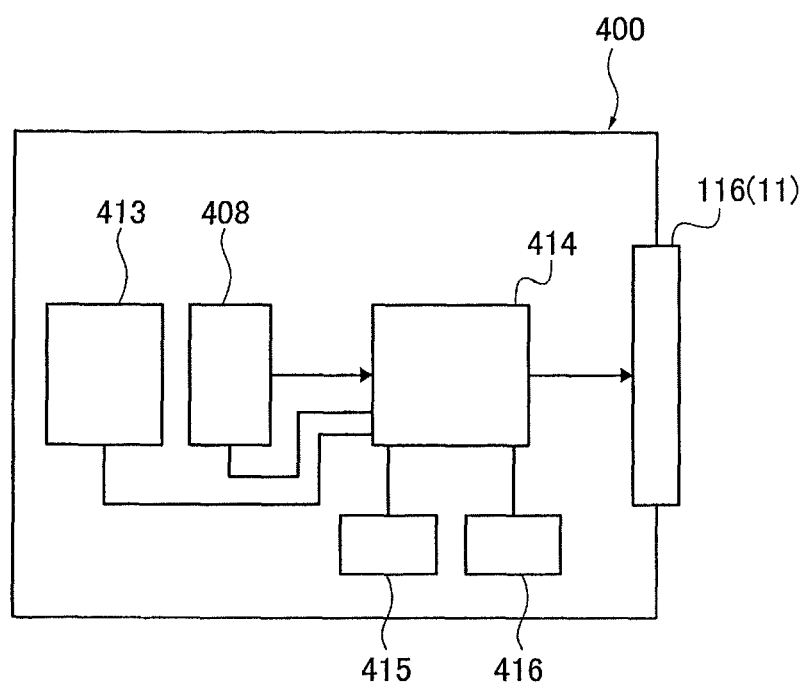
FIG. 40 is a block diagram showing an electrical configuration of the image reader unit.

Next, an image reader unit 400 as an external unit according to a fourth embodiment of the present invention will be described. In this fourth embodiment, the image reader unit 400 is shown as another example of the external unit having functions different from those of the imaging unit and the wireless camera unit to be attached to the concave portion 1A of the camera body 1. In this fourth embodiment, the configuration of the camera body 1 for attaching the image reader unit 400 (configuration for attaching the image reader unit 400) is basically similar to that of the camera body 1 of the above-described first embodiment. Accordingly, the same constituents are designated by the same reference numerals and detailed description thereof will be omitted. FIG. 37 is an explanatory view schematically showing the image reader unit 400 attached to the camera body 1. FIGS. 38A to 38C are explanatory views for explaining the image reader unit 400. FIG. 38A is a schematic diagram of the image reader unit 400 viewed from a front face side (the positive side in the Z direction). FIG. 38B is a schematic diagram of the image reader unit 400 viewed from a back face side (the negative side in the Z direction). FIG. 38C is a schematic diagram showing a usage example of the image reader unit 400. FIG. 39 is an explanatory view schematically showing a configuration of an optical system of the image reader unit 400. FIG. 40 is a block diagram showing an electrical configuration of the image reader unit 400.

This image reader unit 400 is formed by housing an image reading mechanism to be described later in a case 401 attachable to the camera body 1. This image reader unit 400 is capable of acquiring an image of a reading target (a script S) placed on a contact glass 403 to be described later in a state attached to the camera body 1, and transmitting the acquired image (image signal) to the camera body 1 (main CPU 208 thereof). In other words, the image reader unit 400 is configured to acquire the image data and to transmit the image data to the camera body 1 (main CPU 208 thereof), thereby functioning as a scanner in cooperation with the camera body 1. Thus, by using the image reader unit 400, the camera body 1 (main CPU 208 thereof) is capable of reading an image formed on any reading target, and then storing the image thus read out into a storage medium or displaying the images on the display face 1b.

As shown in FIGS. 37 to 38C, in this image reader unit 400, the case 401 for housing the image reading mechanism to be described later therein is attachable to the concave portion 1A of the camera body 1 (see FIG. 3A) of the first embodiment. As shown in FIG. 38B, in this case 401, a back face 401a facing the back face wall 4 of the camera body 1 and a left side face 401b facing the side face wall 6 of the camera body 1 have configurations which are similar to those in the imaging unit 2 (or 2') of the first embodiment (see FIG. 3B) so as to be attachable to the concave portion 1A. Since these configurations are similar to those in the imaging unit 2 (or 2') (see FIG. 3B), the same constituents are designated by the same reference numerals and detailed description thereof will be omitted.

Moreover, in the fourth embodiment, the case 401 includes a lid portion 402 and the contact glass 403 (see FIGS. 38C and 39). The lid portion 402 is attached to the case 401 by use of a hinge 404 and is rotatable relative to the case 401. This lid portion 402 has a size entirely covering the front face (the face on the front side in the Z direction) of the case 401, and is configured to shield the contact glass 403 in a closed state. This contact glass 403 (see FIGS. 38C and 39) is provided for placing the script S as the reading target thereon.

As shown in FIG. 39, the image reader unit 400 includes, as the image reading mechanism, a first traveling body 405, a second traveling body 406, a focusing lens 407, an imaging device 408, and a light source 409, which are located below the contact glass 403.

The first traveling body 405 is movable in a sub-scanning direction (see an arrow y) by a first driving mechanism 415 to be described later, and is provided with a reflecting mirror 410. The second traveling body 406 is movable in the sub-scanning direction by a second driving mechanism 416 to be described later without causing an interference with the first traveling body 405. This second traveling body 406 is provided with a reflecting mirror 411 facing the reflecting mirror 410 of the first traveling body 405, and a reflecting mirror 412 facing the reflecting mirror 411.

The focusing lens 407 is provided in a manner facing the reflecting mirror 412 of the second traveling body 406. A cylindrical lens is used for this focusing lens 407, which is disposed so as to focus light on a receiving surface of the imaging device 408 in a linearly extending manner in a main scanning direction (see an arrow x).

The imaging device 408 is provided on a focal position of the focusing lens 407. The imaging device 408 is a so-called line sensor formed by arraying multiple photo-receiving elements in a line. The imaging device 408, the reflecting mirror 410, the reflecting mirror 411, and the reflecting mirror 412 have longitudinal shapes that extend in the main scanning direction (see the arrow x).

The light source 409 is formed of a longitudinal small fluorescent lamp (such as a backlight fluorescent lamp), an LED, or the like, and is located between the focusing lens 407 and the imaging device 408 so as to extend in the main scanning direction.

In this image reading mechanism (image reader unit 400), an illuminating light flux emitted from the light source 409 passes through the focusing lens 407, is reflected by the reflecting mirror 412, the reflecting mirror 411, and the reflecting mirror 410, and then passes through the contact glass 403 to illuminate a reading region (imaging region) dS on the script S as the reading target. The light reflected by this script S passes through contact glass 403 again, is reflected by the reflecting mirror 410, the reflecting mirror 411, and the reflecting mirror 412, then guided to the focusing lens 407, and is focused on and read by the imaging device 408. It is possible to acquire the entire image of the scrip S two-dimensionally by carrying out series of this processing carried out while moving the first traveling body 405 and the second traveling body 406 in the sub-scanning direction so that the focal position is such that an image of a script surface remains focused on an imaging surface of the imaging device 408 and while sequentially accumulating images of tiny reading regions dS on the script S.

Next, an electrical configuration of this image reader unit 400 will be described. As shown in FIG. 40, the image reader unit 400 includes an imaging optical system 413, the imaging device 408, a controller 414, the first driving mechanism 415, the second driving mechanism 416, and the connector terminal 116 as the connector 11.

The imaging optical system 413 includes the first traveling body 405, the second traveling body 406, the focusing lens 407, and the light source 409 described above, and is configured to acquire the entire image of the scrip S two-dimensionally in cooperation with the imaging device 408. The imaging device 408 converts an object image guided by the imaging optical system 413 into electric signals (image signals) and outputs the electric signals (image signals) to the controller 414. Although illustration is omitted, the controller 414 includes an image generation circuit configured to generate image data on the basis of the electric signals (image signals) inputted from the imaging device 408, and a drive control circuit configured to control drive of the imaging optical system 413 (light source 409, first driving mechanism 415, and second driving mechanism 416) and the like as a whole. This drive control circuit outputs the image data generated by the image generation circuit to the connector terminal 116 to output the image data to the main CPU 208 (see FIGS. 16 and 17) of the camera body 1 as appropriate. This connector terminal 116 constitutes the connector 11, and is similar to the connector terminal 116 (see FIGS. 16 and 17) provided in the imaging unit 2 (or 2') (see FIG. 3B). The power is supplied from the camera body 1 to this reception mechanism, i.e., the image reader unit 400 through the connector terminal 116. The first driving mechanism 415 whose drive is controlled by the drive control circuit is configured to control movement of the first traveling body 405 in the sub-scanning direction. The second driving mechanism 416 is configured to control movement of the second traveling body 406 in the sub-scanning direction.

This image reader unit 400 is capable of causing the camera body 1 to function as the scanner by attaching the image reader unit 400 to the camera body 1 as similar to the imaging unit 2 (or 2') of the first embodiment (see FIG. 3B).

Moreover, since the configuration for attaching the image reader unit 400 to the camera body 1 is similar to that for attaching the imaging unit 2 (or 2') of the first embodiment (see FIG. 3B), it is possible to obtain an effect similar to that of the imaging unit 2 (or 2').

In configuration of the fourth embodiment, the controller 414 (image generation circuit) of the image reader unit 400 generates the image data on the basis of the acquired (taken) signals (image signals). However, it is also possible to provide this image generation circuit on the camera body 1 instead. In this context, the present invention will not be limited only to the configuration of the fourth embodiment.

Moreover, in the configuration of the fourth embodiment, the signals (image signals) acquired (taken) by the image reader unit 400 are transmitted to the camera body 1. However, it is also possible to apply a configuration in which signals are transmitted from the camera body 1 to the image reader unit 400 instead.

Moreover, in the fourth embodiment, the image reader unit 400 is assumed to read the scrip S in the size of a business card as the reading target. Accordingly, the case 401 has a size slightly protruding in the right direction (the positive side in the X direction) and in the forward direction (the positive side in the Z direction) from the camera body 1 as illustrated in FIG. 38C. However, since the concave portion 1A of the camera body 1 is open on the three sides, the size of the case 401, i.e. the image reader unit 400 is not particularly limited as long as the connector 11 connectable to the connector 12 provided on the camera body 1 is provided so as to correspond to the configuration of the concave portion 1A. In this case, since the case 401 is configured to be attached to the concave portion 1A of the camera body 1, it is preferable to provide the case 401 with legs or other components for stabilizing the posture when attached to the concave portion 1A, if the case 401 has a larger size as compared to the size of the camera body 1.

According to the fourth embodiment, the image reader unit 400 is configured to read the entire image of the reading target (script S) by illuminating the reading region (imaging region) dS that extends in the main scanning direction and moving the reading region dS in the sub-scanning direction. However, the image reader unit 400 is at least required to be able to read the entire image of the reading target (script S) placed on the contact glass 403 and to output the image data. In this context, the present invention will not be limited only to the configuration of the fourth embodiment.

According to the fourth embodiment, in the case 401 of the image reader unit 400, the configurations of the back face 401a and the left side face 401b are similar to those of the imaging unit 2 (or 2') of the first embodiment (see FIG. 3B) in order to allow attachment to the concave portion 1A of the camera body 1 of the first embodiment (see FIG. 3A). However, the back face 401a and the left side face 401b may apply similar configurations to those of the imaging unit 2 (or 2') of the second embodiment (see FIG. 21) in order to allow attachment to the concave portion 1A of the camera body 1 of the second embodiment (see FIG. 19) instead. Alternatively, it is also possible to provide the unit with the structure for allowing attachment to the concave portion 1A which is originally provided on the camera body, and to provide the camera body with the structure which is originally provided on the unit. In this context, the present invention will not be limited only to the configuration of the fourth embodiment.

Fifth Embodiment

Figure 41:
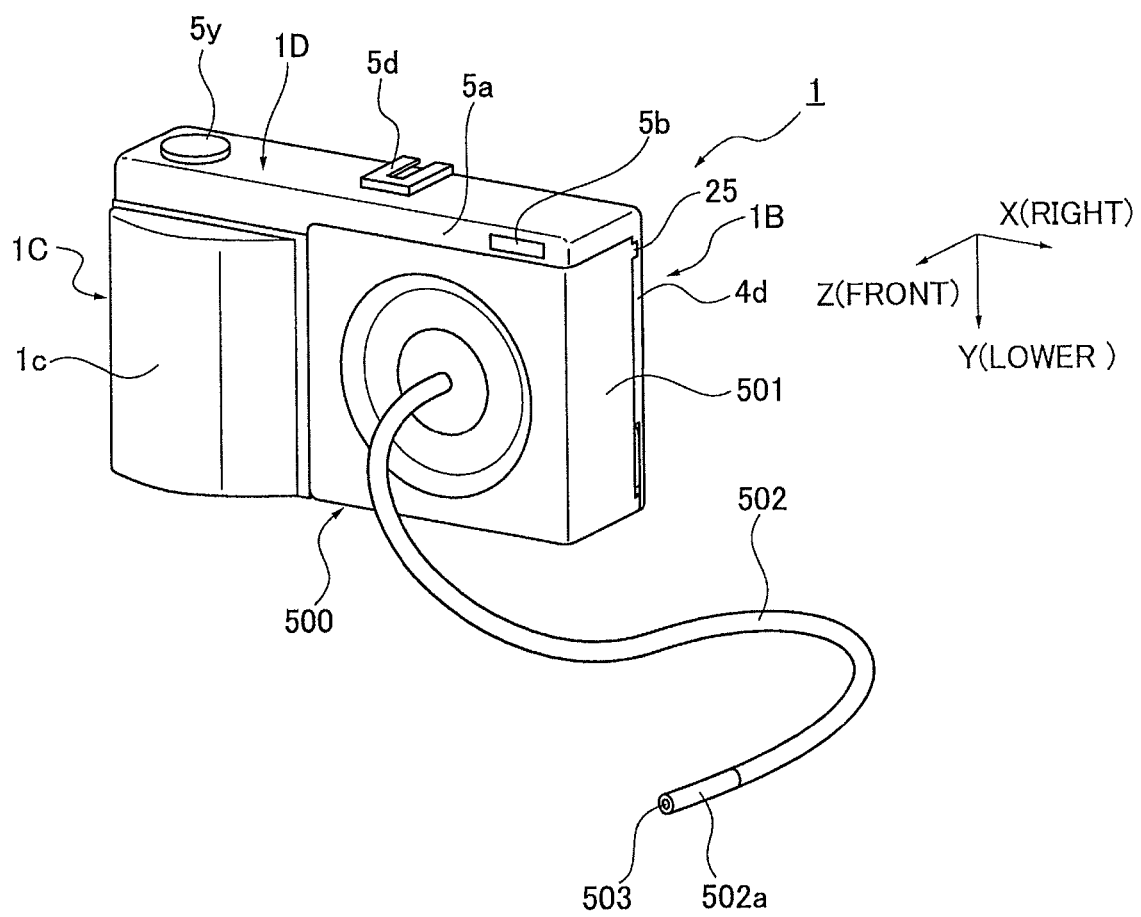
FIG. 41 is an explanatory view schematically showing a fiberscope unit of a fifth embodiment attached to a camera body.
Figure 42A:
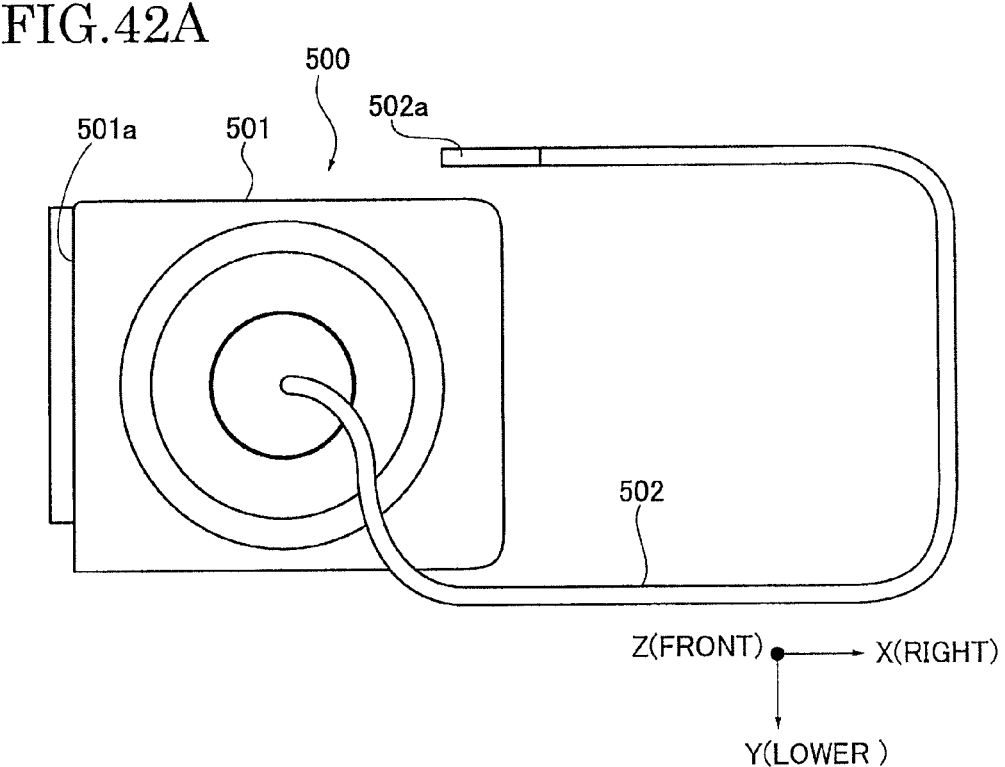
Figure 42B:
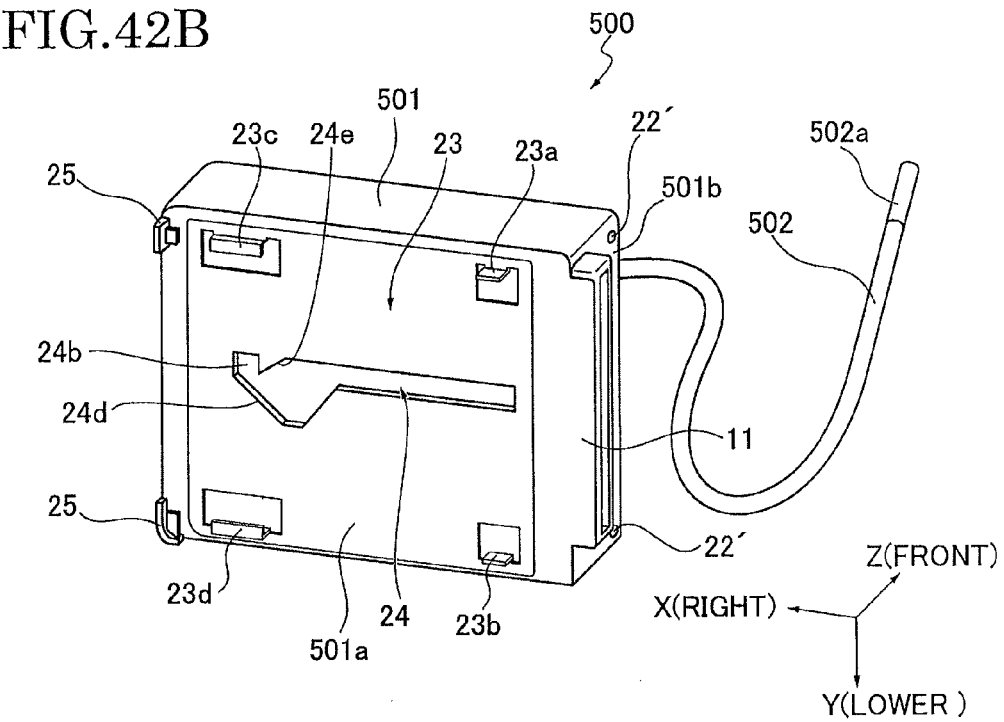

Next, a fiberscope unit 500 as an external unit according to a fifth embodiment of the present invention will be described. In this fifth embodiment, the fiberscope unit 500 is shown as another example of the external unit having functions different from those of the imaging unit, the wireless camera unit, and the image reader unit to be attached to the concave portion 1A of the camera body 1. In this fifth embodiment, the configuration of the camera body 1 for attaching the fiberscope unit 500 (configuration for attaching the fiberscope unit 500 is basically similar to that of the camera body 1 of the above-described first embodiment. Accordingly, the same constituents are designated by the same reference numerals and detailed description thereof will be omitted. FIG. 41 is an explanatory view schematically showing the fiberscope unit 500 attached to the camera body 1. FIGS. 42A and 42B are explanatory views for explaining the fiberscope unit 500.

Figure 43:
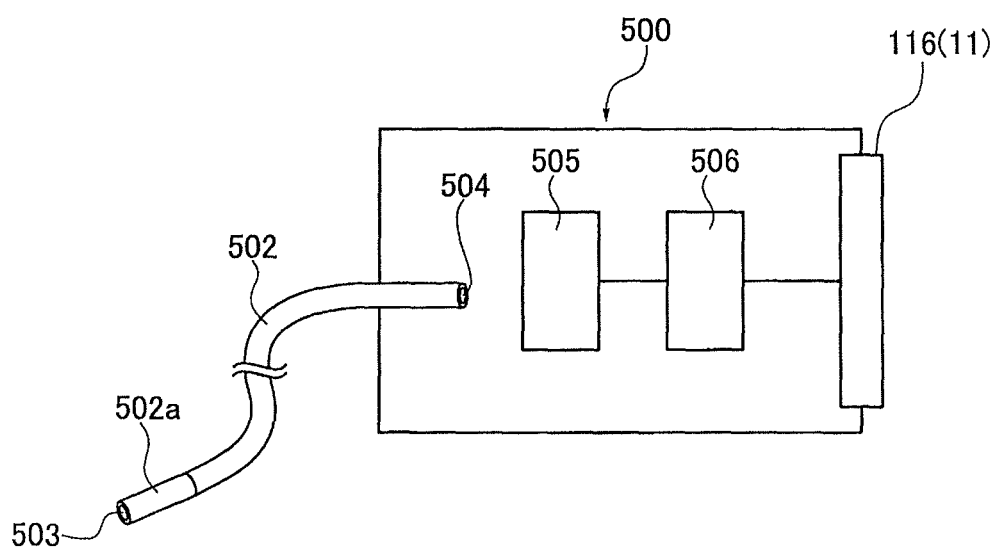
FIG. 43 is a block diagram showing an electrical configuration of the fiberscope unit.

FIG. 42A is a schematic diagram of the fiberscope unit 500 viewed from a front face side (the positive side in the Z direction). FIG. 42B is a schematic diagram of the fiberscope unit 500 viewed from a back face side (the negative side in the Z direction). FIG. 43 is a block diagram showing an electrical configuration of the fiberscope unit 500.

The fiberscope unit 500 is formed by housing an image acquisition mechanism to be described later in a case 501 attachable to the camera body 1 and providing a long tube portion 502 on the case 501. This fiberscope unit 500 is capable of transmitting an image (image signal) acquired through the tube portion 502 to the camera body 1 (main CPU 208 thereof) in a state attached to the camera body 1. In other words, the fiberscope unit 500 is configured to acquire the image data and to transmit the image data to the camera body 1 (main CPU 208 thereof), thereby functioning as a fiberscope in cooperation with the camera body 1. For this reason, by using the fiberscope unit 500, the camera body 1 (main CPU 208 thereof) is capable of reading an image acquired through the tube portion 502, and then storing the image thus read out into a storage medium or displaying the images on the display face 1b.

As shown in FIGS. 41 to 42B, this fiberscope unit 500 is formed by housing the image acquisition mechanism to be described later in the case 501 attachable to the concave portion 1A of the camera body 1 (see FIG. 3A) of the first embodiment. As shown in FIG. 42B, in this case 501, a back face 501a facing the back face wall 4 of the camera body 1 and a left side face 501b facing the side face wall 6 of the camera body 1 have configurations which are similar to those in the imaging unit 2 (or 2') of the first embodiment (see FIG. 3B) so as to be attachable to the concave portion 1A. Since these configurations are similar to those in the imaging unit 2 (or 2') (see FIG. 3B), the same constituents are designated by the same reference numerals and detailed description thereof will be omitted.

The tube portion 502 provided on this case 501 is formed by placing an objective lens 503 on a front end portion 502a of the tube portion 502, placing an eyepiece lens 504 on a tail end (see FIG. 43) thereof, and providing multiple glass fibers (not shown) so as to connect these lenses. This tube portion 502 can acquire an image captured by the objective lens 503 through the eyepiece lens 504.

Next, an electrical configuration of this fiberscope unit 500 will be described. As shown in FIG. 43, the fiberscope unit 500 includes an imaging device 505 provided to face the eyepiece lens 504 of the tube portion 502, a controller 506, and the connector terminal 116 as the connector 11.

The imaging device 505 converts an object image guided by the tube portion 502 into electric signals (image signals), and outputs the electric signals (image signals) to the controller 506. Although illustration is omitted, the controller 506 includes an image generation circuit configured to generate image data on the basis of the electric signals (image signals) inputted from the imaging device 505, and a drive control circuit configured to perform control of drive of a light source for supplying illumination light (illuminating a direction in which the objective lens 503 of the tube portion 502 faces) to the tube portion 502, and the like, the light source and the like being not illustrated. This drive control circuit outputs the image data generated by the image generation circuit to the connector terminal 116 to output the image data to the main CPU 208 (see FIGS. 16 and 17) of the camera body 1 as appropriate. This connector terminal 116 constitutes the connector 11, and is similar to the connector terminal 116 (see FIGS. 16 and 17) provided on the imaging unit 2 (or 2') (see FIG. 3B). The power is supplied from the camera body 1 to this fiberscope unit 500 (controller 506) through the connector terminal 116.

This fiberscope unit 500 is capable of causing the camera body 1 to function as the fiberscope by attaching the fiberscope unit 500 to the camera body 1 as similar to the imaging unit 2 (or 2') of the first embodiment (see FIG. 3B).

Moreover, since the configuration for attaching the fiberscope unit 500 to the camera body 1 is similar to that for attaching the imaging unit 2 (or 2') of the first embodiment (see FIG. 3B), it is possible to obtain an effect similar to that of the imaging unit 2 (or 2').

In the configuration of the fifth embodiment, the controller 506 (image generation circuit) generates the image data on the basis of the acquired (taken) signals (image signals). However, it is also possible to provide this image generation circuit in the camera body 1 instead. In this context, the present invention will not be limited only to the configuration of the fifth embodiment.

Moreover, in the configuration of the fifth embodiment, the signals (image signals) acquired (taken) by the fiberscope unit 500 are transmitted to the camera body 1. However, it is also possible to apply a configuration in which signals are transmitted from the camera body 1 to the fiberscope unit 500 instead.

Moreover, in the fifth embodiment, the fiberscope unit 500 is formed as the so-called fiberscope provided with the tube portion 502 including the objective lens 503 on the front end portion 502a and the eyepiece lens 504 on the tail end. Instead, it is also possible to form this unit as a so-called video scope by placing a micro imaging device such as a CCD or CMOS on the front end portion of the tube portion.

According to the fifth embodiment, the fiberscope unit 500 is formed into a size capable of being fitted into the concave portion 1A of the camera body 1 as shown in FIG. 41. However, since the concave portion 1A of the camera body 1 is open on the three sides, the size of the case (501), i.e. the fiberscope unit 500 is not particularly limited as long as the connector 11 connectable to the connector 12 provided on the camera body 1 is provided so as to correspond to the configuration of the concave portion 1A. In this case, since the case 501 is configured to be attached to the concave portion 1A of the camera body 1, it is preferable to provide the case 501 with legs or other components for stabilizing the posture when attached to the concave portion 1A, if the case 501 has a larger size as compared to the size of the camera body 1.

According to the fifth embodiment, in the case 501 of the fiberscope unit 500, the configurations of the back face 501a and the left side face 501b are similar to those of the imaging unit 2 (or 2') of the first embodiment (see FIG. 3B) in order to allow attachment to the concave portion 1A of the camera body 1 of the first embodiment (see FIG. 3A). However, the back face 501a and the left side face 501b may apply similar configurations to those of the imaging unit 2 (or 2') of the second embodiment (see FIG. 21) in order to allow attachment to the concave portion 1A of the camera body 1 of the second embodiment (see FIG. 19) instead. Alternatively, it is also possible to provide the unit with the structure for allowing attachment to the concave portion 1A which is originally provided on the camera body, and to provide the camera body with the structure which is originally provided on the unit. In this context, the present invention will not be limited only to the configuration of the fifth embodiment.

Sixth Embodiment

Figure 44:
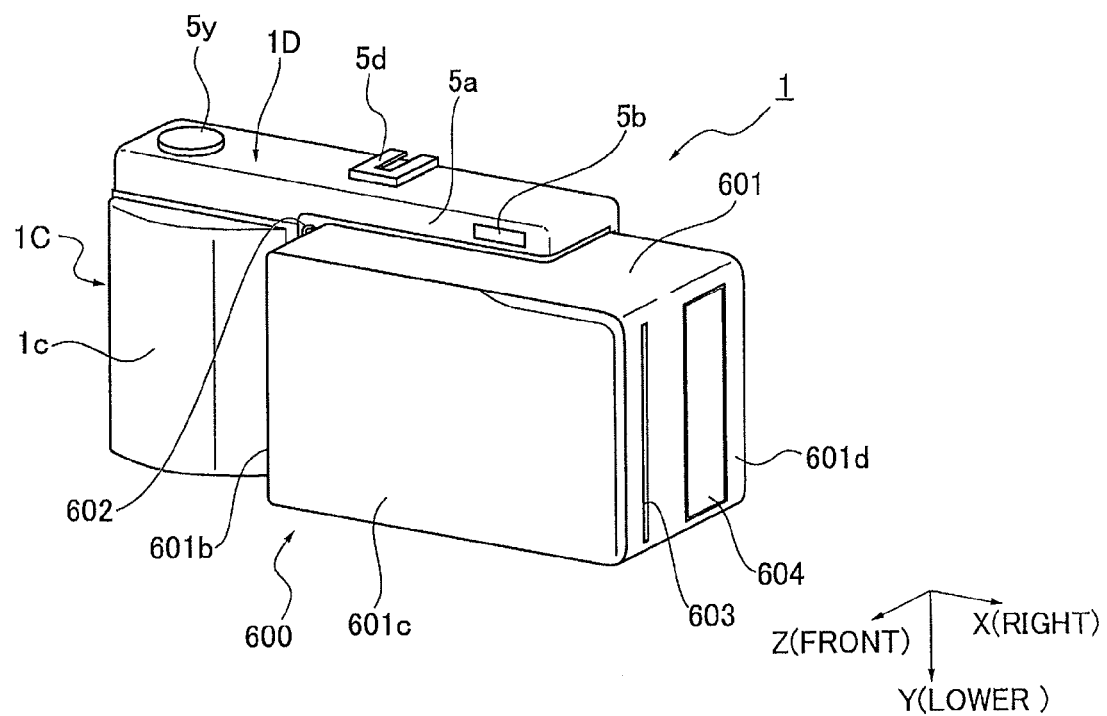
FIG. 44 is an explanatory view schematically showing an image printing unit of a sixth embodiment attached to a camera body.
Figure 45A:
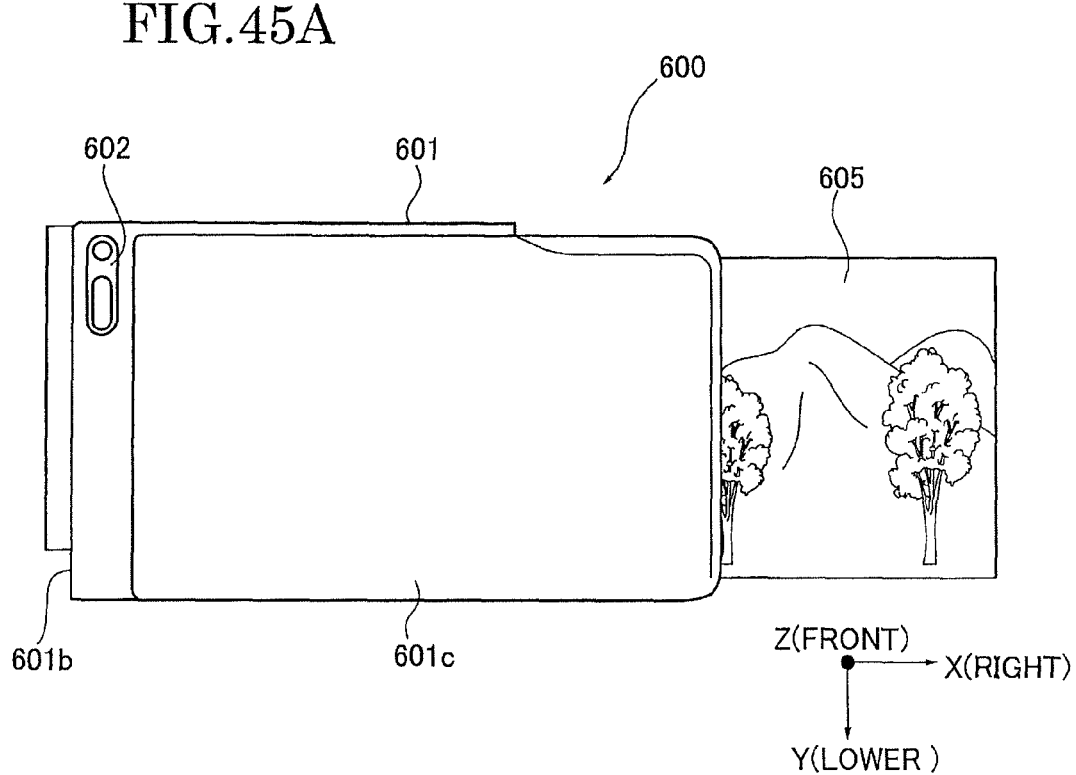
Figure 45B:
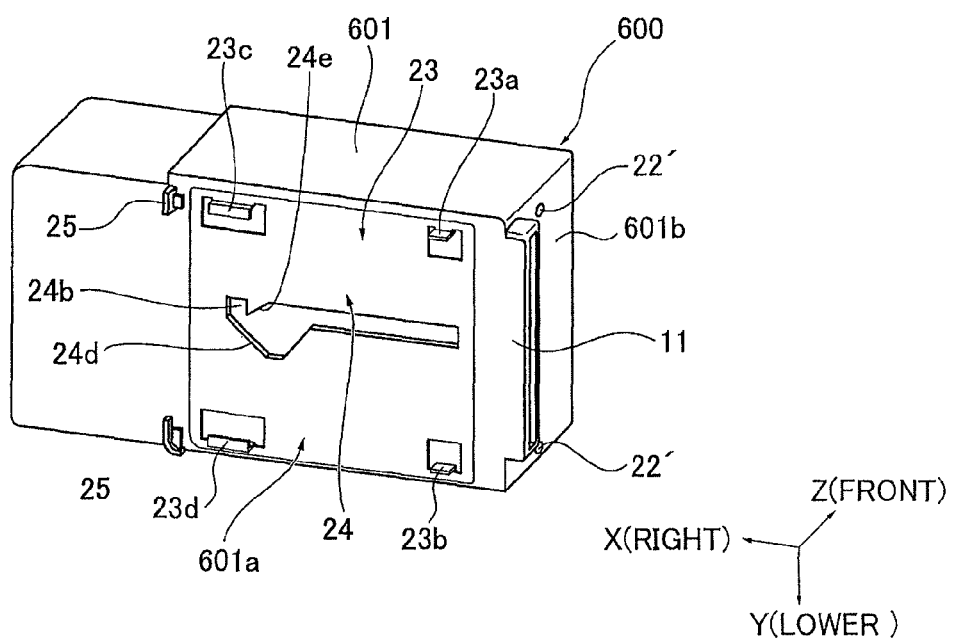
Figure 46:
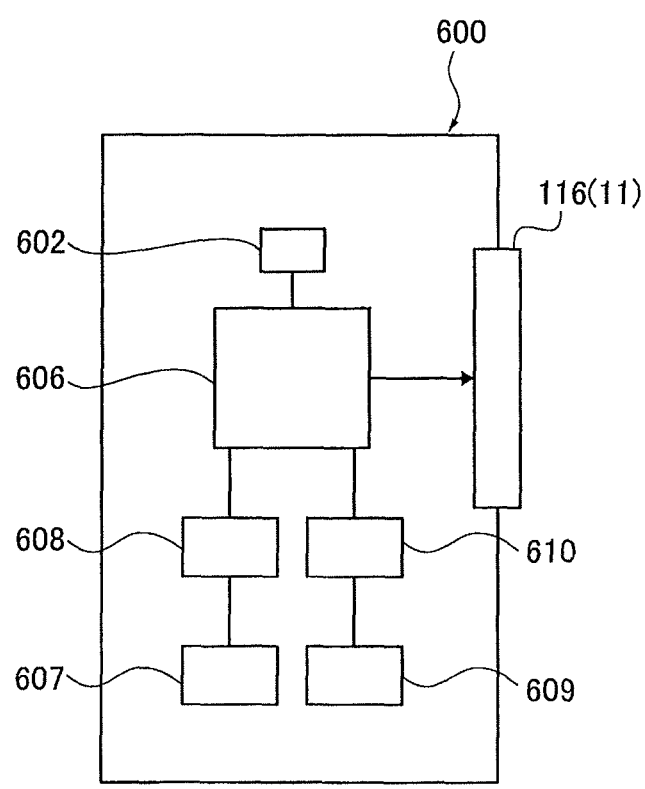
FIG. 46 is a block diagram showing an electrical configuration of the image printing unit.

Next, an image printing unit 600 as an external unit according to a sixth embodiment of the present invention will be described. In this sixth embodiment, the image printing unit 600 is shown as another example of the external unit having functions different from those of the imaging unit, the wireless camera unit, the image reader unit, and the fiberscope unit to be attached to the concave portion 1A of the camera body 1. In this sixth embodiment, the configuration of the camera body 1 for attaching the image printing unit 600 (configuration for attaching the image printing unit 600) is basically similar to that of the camera body 1 of the above-described first embodiment. Accordingly, the same constituents are designated by the same reference numerals and detailed description thereof will be omitted. FIG. 44 is an explanatory view schematically showing the image printing unit 600 attached to the camera body 1. FIGS. 45A and 45B are explanatory views for explaining the image printing unit 600. FIG. 45A is a schematic diagram of the image printing unit 600 viewed from a front face side (the positive side in the Z direction). FIG. 45B is a schematic diagram of the image printing unit 600 viewed from a back face side (the negative side in the Z direction). FIG. 46 is a block diagram showing an electrical configuration of the image printing unit 600.

The image printing unit 600 is formed by housing an image printing mechanism to be described later in a case 601 attachable to the camera body 1. This image printing unit 600 is capable of forming an image (image signal) acquired from the camera body 1 (main CPU 208 thereof) on a printing target (instant film 605 in the sixth embodiment) in a state attached to the camera body 1. In other words, the image printing unit 600 is configured to output the image data transmitted from the camera body 1 (main CPU 208 thereof), thereby functioning as a printer in cooperation with the camera body 1.

As shown in FIGS. 44 to 45B, in this image printing unit 600, the case 601 for housing the image printing mechanism to be described later therein is attachable to the concave portion 1A of the camera body 1 (see FIG. 3A) of the first embodiment. As shown in FIG. 45B, in this case 601, a back face 601a facing the back face wall 4 of the camera body 1 and a left side face 601b facing the side face wall 6 of the camera body 1 have configurations which are similar to those in the imaging unit 2 (or 2') of the first embodiment (see FIG. 3B) so as to be attachable to the concave portion 1A. Since these configurations are similar to those in the imaging unit 2 (or 2') (see FIG. 3B), the same constituents are designated by the same reference numerals and detailed description thereof will be omitted.

Moreover, in the sixth embodiment, the case 601 includes an indicator light 602 on a front face 601c (a face on the positive side in the Z direction) located on the other side of the back face 601a, and a film discharge port 603 and a film door 604 on a right side face 601d (a face on the positive side in the X direction) located on the other side of the left side face 601b as shown in FIG. 44. The indicator light 602 is a light emitting part configured to notify whether the image printing unit 601 is in operation, and is turned on when the image printing unit 601 is in operation. The film discharge port 603 is an opening for discharging the instant film 605 (see FIG. 45A) after an image is recorded. The film door 604 is provided for opening and closing an unillustrated film container. Although illustration is omitted, the image printing unit 600 of the sixth embodiment can be loaded with several instant films 605 in the film container 605 by opening the film door 604.

As shown in FIG. 46, the image printing unit 600 includes, as an image printing mechanism, a controller 606, a conveyor mechanism 607, a conveyor mechanism driver 608, a print head 609, a head driver 610, and includes the connector terminal 116 as the connector 11.

The controller 606 performs control of the conveyor mechanism driver 608 and the head driver 610 as a whole in response to a control signal from the main CPU 208 of the camera body 1 inputted through the connector terminal 116 to execute processing for printing the image data inputted from the main CPU 208. Moreover, the controller 606 also performs lighting control of the indicator light 602. The connector terminal 116 constitutes the connector 11, and is similar to the connector terminal 116 (see FIGS. 16 and 17) provided on the imaging unit 2 (or 2') (see FIG. 3B). The power is supplied from the camera body 1 to this image printing unit 600 (controller 606) through the connector terminal 116.

The conveyor mechanism 607 is configured to covey the instant film 605. The conveyor mechanism driver 608 is configured to control drive of the conveyor mechanism 607. Although illustration is omitted, the conveyor mechanism 607 includes a conveyor roller, spread rollers, and the like. The conveyor roller conveys the instant film 605 located closest to the front face inside the unillustrated film container toward the film discharge port 603. The spread rollers interpose the conveyed instant film 605 and spread a developer by crushing a developer reservoir provided in the instant film 605.

The print head 609 is configured to draw an image on the instant film 605. The head driver 610 is configured to control drive of the print head 609. Although illustration is omitted, the print head 609 includes LEDs (light sources) each emitting any one of three colors of R (red), G (green), and B (blue), an optical guide, a liquid crystal shutter, and the like. The print head 609 is configured so that the LEDs emit light in three colors sequentially and the optical guide guides the light beams in the respective colors onto the instant film 605. The liquid crystal shutter is provided in the middle of an optical path, and is controlled so that amounts of transmission of the respective light beams correspond to the image data. A latent image equivalent to one line extending in a main scanning direction (a width direction of the instant film 605) is recorded on the instant film 605 subjected to irradiation of the light beams in the respective colors corresponding to the image data by this print head 609. By repeating the above-described operation while conveying this instant film 605 in a sub-scanning direction orthogonal to the main scanning direction, the lines are sequentially recorded on the instant film 605 whereby a latent image of the image corresponding to the image data is recorded. As the developer is spread over the instant film 605 recorded with this latent image, the image corresponding the image data becomes conspicuous. The instant film 605 with the conspicuous (recorded) image is discharged from the film discharge port 603 (see FIG. 45(A)).

This image printing unit 600 is capable of causing the camera body 1 to function as the printer by attaching the image printing unit 600 on the camera body 1 as similar to the imaging unit 2 (or 2') of the first embodiment (see FIG. 3B).

Moreover, since the configuration for attaching the image printing unit 600 to the camera body 1 is similar to that for attaching the imaging unit 2 (or 2') of the first embodiment (see FIG. 3B), it is possible to obtain an effect similar to that of the imaging unit 2 (or 2').

Although the sixth embodiment shows the image printing unit 600 as the printer having the simple mechanism that uses the instant film 605 as the printing target, it is also possible to form a printer having a more complicated structure including a fixing function. In this context, the present invention will not be limited only to the configuration the sixth embodiment. Here, if the printer has a more complicated structure, then it is conceivable that the image printing unit 600 becomes larger in size. However, since the concave portion 1A of the camera body 1 is open on the three sides, the size of the case 601, i.e. the image printing unit 600 is not particularly limited as long as the connector 11 connectable to the connector 12 provided on the camera body 1 is provided so as to correspond to the configuration of the concave portion 1A. In this case, since the case 601 is configured to be attached to the concave portion 1A of the camera body 1, it is preferable to provide the case 601 with legs or other components for stabilizing the posture when attached to the concave portion 1A, if the case 601 has a larger size as compared to the size of the camera body 1.

Moreover, according to the sixth embodiment, in the case 601 of the image printing unit 600, the configurations of the back face 601a and the left side face 601b are similar to those of the imaging unit 2 (or 2') of the first embodiment (see FIG. 3B) in order to allow attachment to the concave portion 1A of the camera body 1 of the first embodiment (see FIG. 3A). However, the back face 601a and the left side face 601b may apply similar configurations to those of the imaging unit 2 (or 2') of the second embodiment (see FIG. 21) in order to allow attachment to the concave portion 1A of the camera body 1 of the second embodiment (see FIG. 19) instead. Alternatively, it is also possible to provide the unit with the structure for allowing attachment to the concave portion 1A which is originally provided on the camera body, and to provide the camera body with the structure which is originally provided on the unit. In this context, the present invention will not be limited only to the configuration of the sixth embodiment.

Seventh Embodiment

Figure 47:
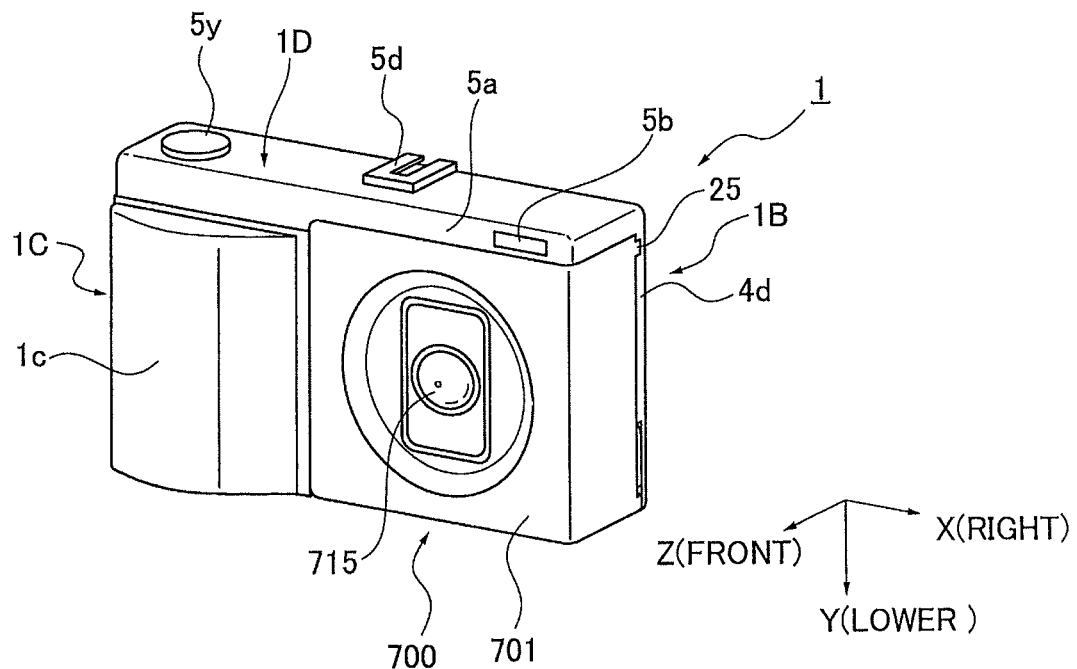
FIG. 47 is an explanatory view schematically showing an image projection unit of a seventh embodiment attached to a camera body.
Figure 48A:
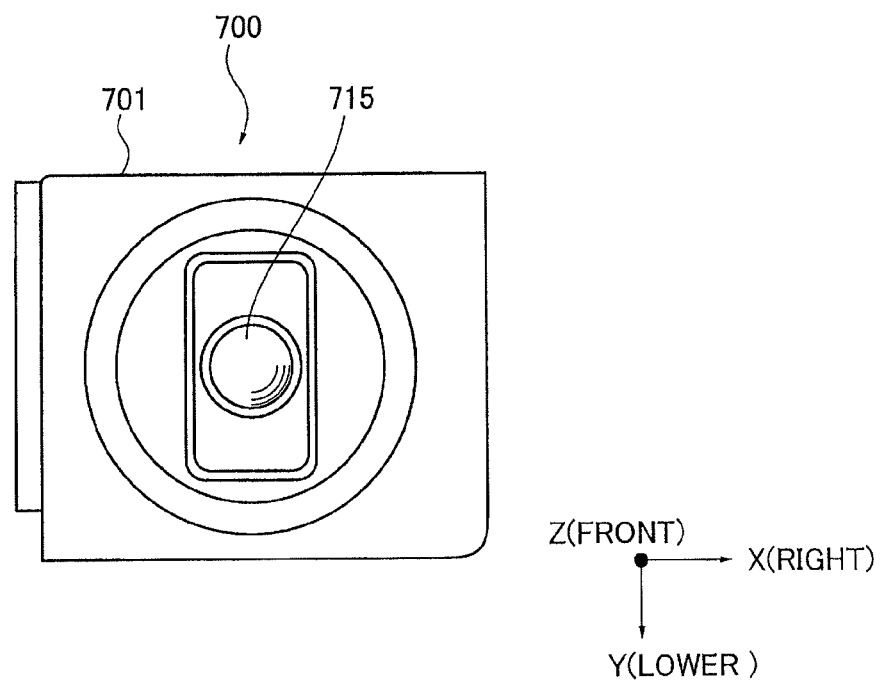
Figure 48B:
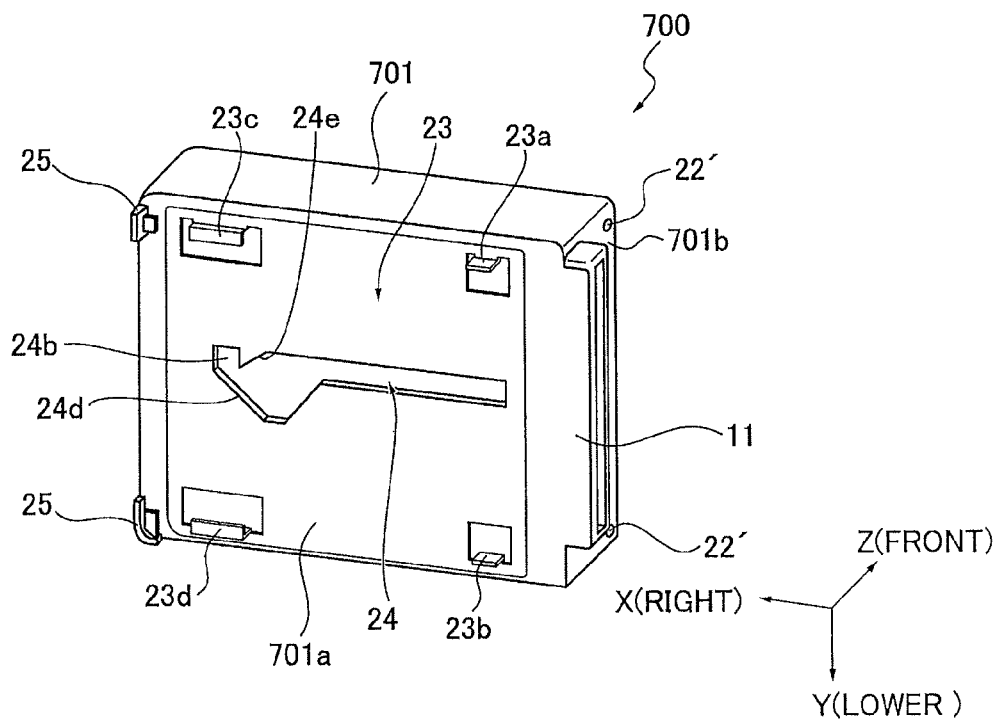
Figure 49:
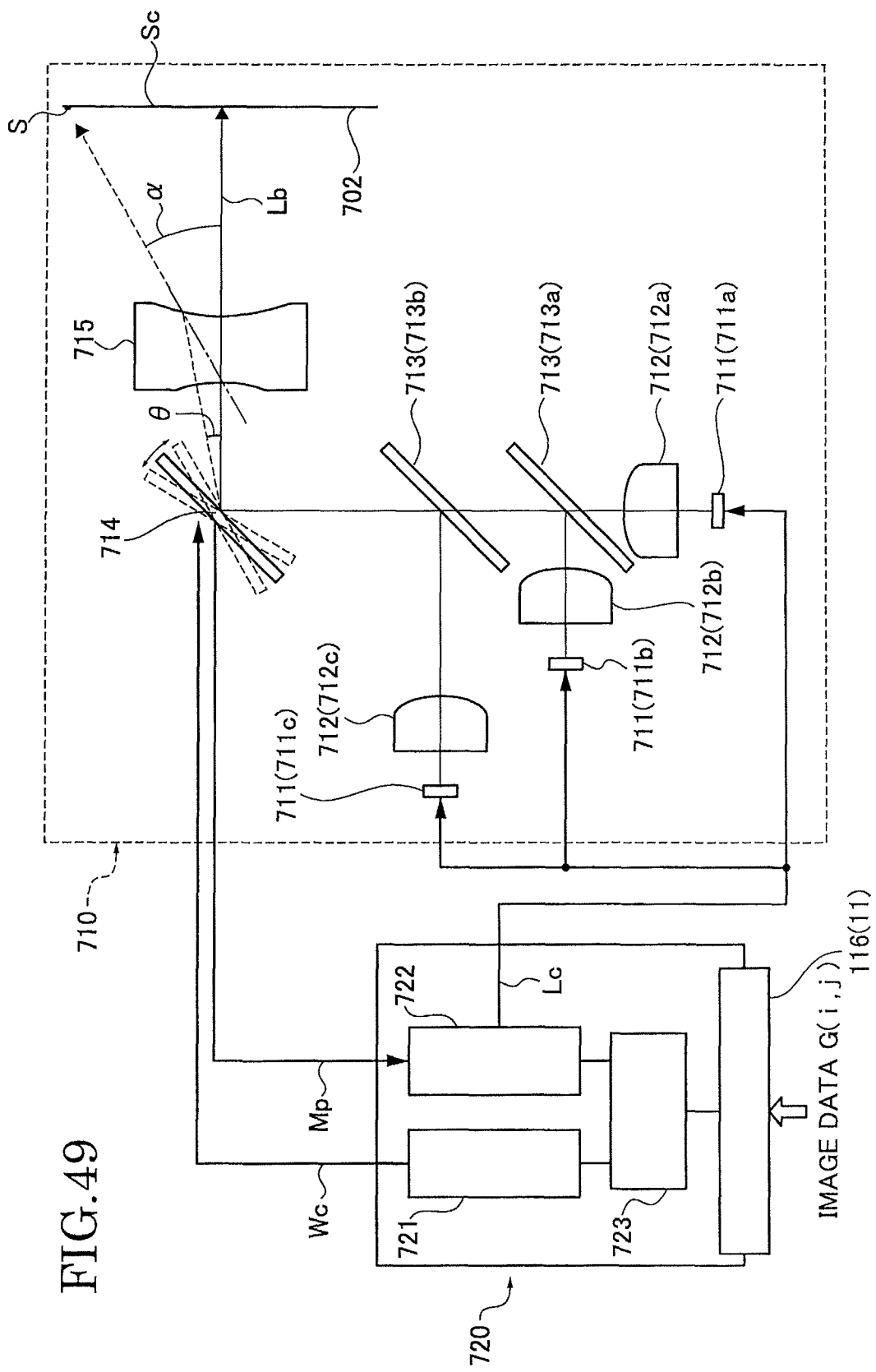
FIG. 49 is an explanatory view schematically showing a configuration of an optical system of the image projection unit.

Next, an image projection unit 700 as an external unit according to a seventh embodiment of the present invention will be described. In this seventh embodiment, the image projection unit 700 is shown as another example of the external unit having functions different from those of the imaging unit, the wireless camera unit, the image reader unit, the fiberscope unit, and the image printing unit to be attached to the concave portion 1A of the camera body 1. In this seventh embodiment, the configuration of the camera body 1 for attaching the image projection unit 700 (the configuration for attaching the image projection unit 700) is basically similar to that of the camera body 1 of the above-described first embodiment. Accordingly, the same constituents are designated by the same reference numerals and detailed description thereof will be omitted. FIG. 47 is an explanatory view schematically showing the image projection unit 700 attached to the camera body 1. FIGS. 48A and 48B are explanatory views for explaining the image projection unit 700. FIG. 48A is a schematic diagram of the image projection unit 700 viewed from a front face side (the positive side in the Z direction). FIG. 48B is a schematic diagram of the image projection unit 700 viewed from a back face side (the negative side in the Z direction). FIG. 49 is an explanatory view schematically showing a configuration of an optical system of the image projection unit 700.

The image projection unit 700 is formed by housing an image projection mechanism to be described later in a case 701 attachable to the camera body 1. This image projection unit 700 is configured to acquire image data G from the camera body 1 (main CPU 208 thereof) and to form a projection image corresponding to the acquired image data G onto a projection target (screen Sc in the seventh embodiment) in a state attached to the camera body 1. In other words, the image projection unit 700 is configured to output the image data transmitted from the camera body 1 (main CPU 208 thereof), thereby functioning as a projector in cooperation with the camera body 1. Thus, the camera body 1 (main CPU 208 thereof) can form an image stored in a storage medium onto the projection target (screen Sc in the seventh embodiment) by use of the image projection unit 700.

As shown in FIGS. 47 to 48B, in this image projection unit 700, the case 701 for housing the image projection mechanism to be described later therein is attachable to the concave portion 1A of the camera body 1 (see FIG. 3A of the first embodiment. As shown in FIG. 48B, in this case 701, a back face 701a facing the back face wall 4 of the camera body 1 and a left side face 701b facing the side face wall 6 of the camera body 1 have configurations which are similar to those in the imaging unit 2 (or 2') of the first embodiment (see FIG. 3B) so as to be attachable to the concave portion 1A. Since these configurations are similar to those in the imaging unit 2 (or 2') (see FIG. 3B), the same constituents are designated by the same reference numerals and detailed description thereof will be omitted.

Moreover, in the seventh embodiment, the case 701 includes a magnifying lens 715 on a front face (a face on the positive side in the Z direction) of the case 701. This magnifying lens 715 constitutes part of the image projection mechanism to be described later.

As shown in FIG. 49, in the seventh embodiment, the image projection unit 700 includes a projection optical system 710 and a control mechanism 720 as the image projection mechanism. This image projection unit 700 (projection optical system 710) is configured to form a projection image on a projection surface 702 of the screen Sc as the projection target. The projection optical system 710 essentially includes three light sources 711 (individually indicated as 711a, 711b, and 711c), three collimating lenses 712 (individually indicated as 712a, 712b, and 712c), two optical path synthesizers 713 (individually indicated as 713a and 713b), a deflecting optical element 714, and the magnifying lens 715.

The projection optical system 710 (image projection unit 700) is configured to form a color projection image, as an example, and the three light sources 711a, 711b, and 711c are monochromatic light sources of red, green, and blue, respectively, for forming the color projection image. These monochromatic light sources can be achieved by using laser light sources having appropriate wavelengths. In the seventh embodiment, a semiconductor laser having a wavelength of 638 nm for a red light source is used as the light source 711a, a second harmonic wave at 530 nm of a semiconductor laser having a wavelength of 1060 nm for a green light source is used as the light source 711b, and a semiconductor laser having a wavelength of 445 nm for a blue light source is used as the light source 711c. As will be described later, the control mechanism 720 controls drive of these three light sources 711 together with the deflecting optical element 714 (control of blinking operations are performed on the light sources 711).

The three collimating lenses 712a, 712b, and 713c concentrate light fluxes emitted from the respective light sources 711a, 711b, and 711c, and form the light fluxes into convergent light. The respective collimating lenses 712 are formed into aspheric shapes which are set in consideration of setting locations of the respective light sources 711 and other factors so that divergent angles of the emitted light beams are converted into angles in which the light beams converge to form a spot S with a predetermined size in the same position (projecting positions are the same) on the screen Sc (projection surface 702).

The two optical path synthesizers 713a and 713b are configured to synthesize the light fluxes which are emitted from the respective light sources 711a, 711b, and 711c and pass through the corresponding collimating lenses 712a, 712b, and 712c, and to cause the synthesized light fluxes to pass through a single light path to reach the deflecting optical element 714 used for scanning. In the seventh embodiment, the optical path synthesizers 713 is formed of multilayered dielectric filters which have a characteristic to reflect light in a predetermined wavelength range and to transmit the light outside the predetermined wavelength range.

The optical path synthesizer 713a is disposed on an optical path of the light flux which is emitted from the light source 711a and passes through the collimating lens 712a to be directed to the deflecting optical element 714. This optical path synthesizer 713a permits transmission of the light emitted from the light source 711a, and reflects the light flux which is emitted from the light source 711b and passes through the collimating lens 712b onto the optical path from the light source 711a to the deflecting optical element 714. Meanwhile, the optical path synthesizer 713b is disposed on an optical path of the light flux which is emitted from the light source 711a and passes through the collimating lens 712a and the optical path synthesizer 713a to be directed to the deflecting optical element 714. This optical path synthesizer 713b permits transmission of the light emitted from the light source 711a and the light source 711b, and reflects the light flux which is emitted from the light source 711c and passes through the collimating lens 712c onto the optical path from the light source 711a to the deflecting optical element 714 (the optical path of the light flux which is reflected by the optical path synthesizer 713a and directed from the light source 711b to the deflecting optical element 714).

The light fluxes emitted from the respective light sources 711 are formed into the convergent light by the respective divergent angle conversion elements 712, and then synthesized by the optical path synthesizer 713a and the optical path synthesizer 713b. Thereafter, the light fluxes are directed to the deflecting optical element 714.

The deflecting optical element 714 is configured to deflect the synthesized light fluxes to two directions that are two-dimensionally orthogonal to each other, i.e. to a first scanning direction and a second scanning direction in order to allow scanning in the first scanning direction and in the second scanning direction orthogonal thereto. The first scanning direction and the second scanning direction are included in the projection surface 702 as the projection target (screen Sc in this example). This deflecting optical element 714 may be formed of a publicly-known MEMS mirror.

The light beam (light fluxes) concentrated into the convergent light by the collimating lenses 712 and synthesized by the optical path synthesizers 713 is scanned in the first scanning direction and the second scanning direction, which are two-dimensionally orthogonal to each other, by the deflecting optical element 714 formed of this MEMS mirror, whereby the spot S travels in a region having a predetermined dimension on the unillustrated projection surface.

The magnifying lens 715 is configured to convert a deflection angle θ of the light beam deflected by the deflecting optical element 714 into a scanning angle α which is greater than the deflection angle θ. Here, the deflection angle θ means an angle of a traveling direction of the light beam deflected by the deflecting optical element 714 to a reference optical axis Lb. The scanning angle α means an angle of the light beam emitted from the magnifying lens 715 to the reference optical axis Lb. Moreover, the reference optical axis Lb is a traveling direction of the light beam reflected by the deflecting optical element 714 at a predetermined scanning reference position. This magnifying lens 715 focuses the light beam R which is converted into the convergent light by the collimating lenses 712 in cooperation with the deflecting optical element 714 on the projection surface 702 of the screen Sc (designated as the spot S having a smaller diameter than a predetermined size), and forms a projection image on the screen Sc (projection surface 702 thereof) by scanning a predetermined area (scanning area) on the projection surface 702 by the spot S.

The control mechanism 720 controls drive of each of the light sources 711 and the deflecting optical element 714 in this projection optical system 710. The control mechanism 720 includes a deflecting optical element drive controller 721 being a deflection angle control circuit, a light amount controller 722 being a light source control circuit, a controller 723, and the connector terminal 116 as the connector 11.

In the control mechanism 720, the deflecting optical element drive controller 721 controls drive of the deflecting optical element 714, and the light amount controller 722 controls drive of the light sources 711 on the basis of the image data G (i, j) and a mirror position signal Mp. The deflecting optical element drive controller 721 controls drive of the deflecting optical element 714 by transmitting a turn control signal Wc. The light amount controller 722 controls drive of the light sources 711 by transmitting a light amount control signal Lc. This mirror position signal Mp is a signal indicating a position of displacement of a reflecting surface of the turned deflecting optical element 714. Although illustration is omitted, the controller 723 includes a drive control circuit configured to perform control of drive of the above-described image projection mechanism as a whole. This drive control circuit acquires the image data G from the main CPU 208 (see FIGS. 16 and 17) of the camera body 1 through the connector terminal 116, and outputs the image data G to the light amount controller 722. Moreover, when a signal indicating execution of the image projection function is inputted from the main CPU 208 (see FIGS. 16 and 17) of the camera body 1, the drive control circuit performs control of drive of the above-described image projection mechanism as a whole to form the projection image corresponding to the image data G. The connector terminal 116 constitutes the connector 11, and is similar to the connector terminal 116 (see FIGS. 16 and 17) provided on the imaging unit 2 (or 2') (see FIG. 3B). The power is supplied from the camera body 1 to this image projection unit 700 through the connector terminal 116.

In the control mechanism 720, the deflecting optical element drive controller 721 and the light amount controller 722 are operated so that the coordinates (i, j) in the image data G correspond to coordinates (i, j) in the above-described scanning area on the projection surface 702. Specifically, when a scanning position on the projection surface 702 becomes a pixel corresponding position (i, j) that corresponds to a pixel position defined as (i, j), the projection image is formed on the screen Sc (projection surface 702 thereof) by transmitting, to the light sources 711, the light amount control signal Lc, which instructs the light sources 711 to respectively output the light beams (emitted light) in the amounts based on the image data G (i, j) corresponding to that pixel.

This image projection unit 700 is capable of causing the camera body 1 to function as the projector by attaching the image projection unit 700 to the camera body 1 as similar to the imaging unit 2 (or 2') of the first embodiment (see FIG. 3B).

Moreover, since the configuration for attaching the image projection unit 700 to the camera body 1 is similar to that for attaching the imaging unit 2 (or 2') of the first embodiment (see FIG. 3B), it is possible to obtain an effect similar to that of the imaging unit 2 (or 2').

According to the seventh embodiment, the case 701 of the image projection unit 700 is formed into a size capable of being housed in the concave portion 1A of the camera body 1 as shown in FIG. 47. However, since the concave portion 1A of the camera body 1 is open on the three sides, the size of the case 701, i.e. the image projection unit 700 is not particularly limited as long as the connector 11 connectable to the connector 12 provided on the camera body 1 is provided so as to correspond to the configuration of the concave portion 1A. Here, since the case 701 is configured to be attached to the concave portion 1A of the camera body 1, it is preferable to provide the case 701 with legs or other components for stabilizing the position or posture when attached to the concave portion 1A, if the case 701 has a larger size as compared to the size of the camera body 1.

According to the seventh embodiment, in the case 701 of the image projection unit 700, the configurations of the back face 701a and the left side face 701b are similar to those of the imaging unit 2 (or 2') of the first embodiment (see FIG. 3B) in order to allow attachment to the concave portion 1A of the camera body 1 of the first embodiment (see FIG. 3A). However, the back face 701a and the left side face 701b may apply similar configurations to those of the imaging unit 2 (or 2') of the second embodiment (see FIG. 21) in order to allow attachment to the concave portion 1A of the camera body 1 of the second embodiment (see FIG. 19) instead. Alternatively, it is also possible to provide the unit with the structure for allowing attachment to the concave portion 1A which is originally provided on the camera body, and to provide the camera body with the structure which is originally provided on the unit. In this context, the present invention will not be limited only to the configuration of the seventh embodiment.

Eighth Embodiment

Figure 50:
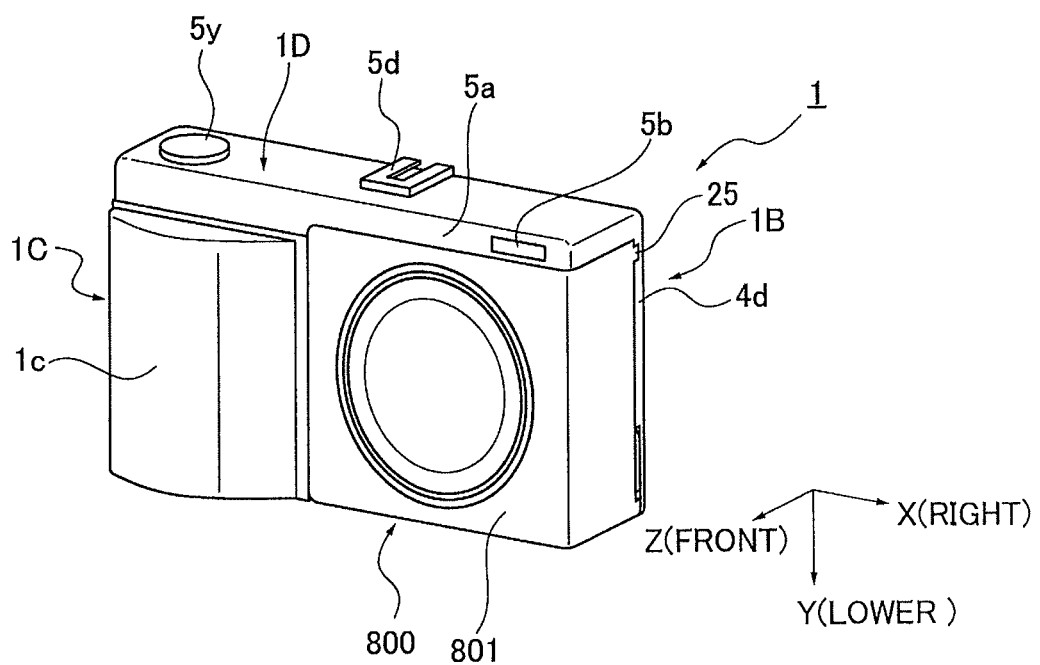
FIG. 50 is an explanatory view schematically showing an external storage unit of an eighth embodiment attached to a camera body.
Figure 51A:
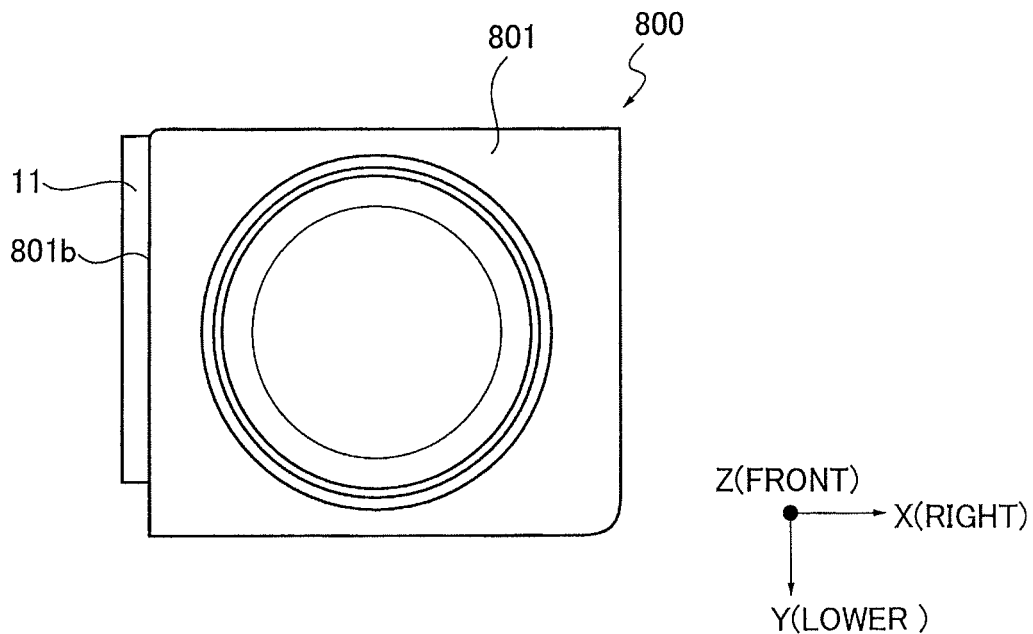
Figure 51B:
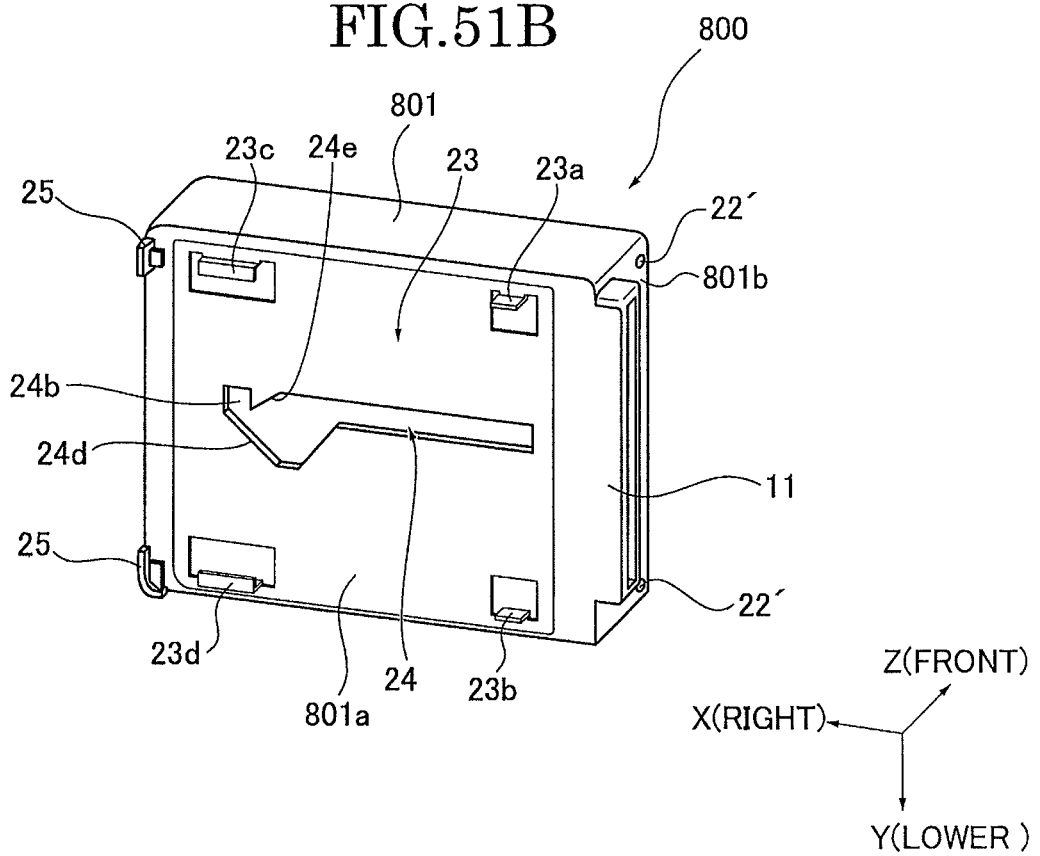
Figure 52:
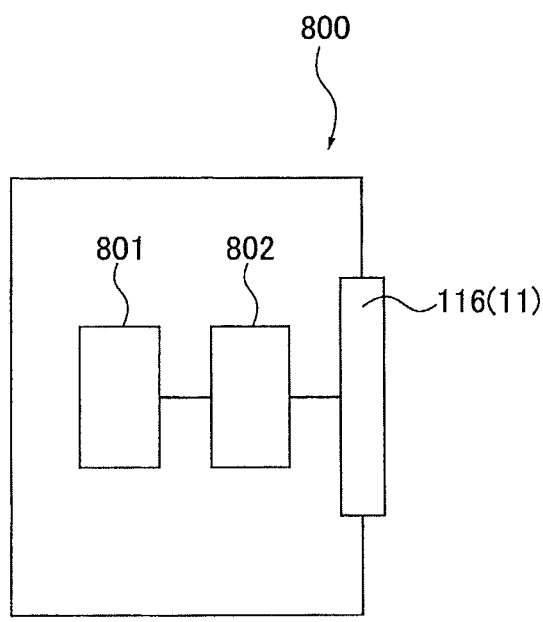
FIG. 52 is a block diagram for explaining a configuration of the external storage unit.

Next, an external storage unit 800 as an external unit according to an eighth embodiment of the present invention will be described. In this eighth embodiment, the external storage unit 800 is shown as another example of the external unit having functions different from those of the imaging unit, the wireless camera unit, the image reader unit, the fiberscope unit, the image printing unit, and the image projection unit to be attached to the concave portion 1A of the camera body 1. In this eighth embodiment, the configuration of the camera body 1 for attaching the external storage unit 800 (configuration for attaching the external storage unit 800) is basically similar to that of the camera body 1 of the above-described first embodiment. Accordingly, the same constituents are designated by the same reference numerals and detailed description thereof will be omitted. FIG. 50 is an explanatory view schematically showing the external storage unit 800 attached to the camera body 1. FIGS. 51A and 51B are explanatory views for explaining the external storage unit 800. FIG. 51A is a schematic diagram of the external storage unit 800 viewed from a front face side (the positive side in the Z direction). FIG. 51B is a schematic diagram of the external storage unit 800 viewed from a back face side (the negative side in the Z direction). FIG. 52 is a block diagram for explaining a configuration of the external storage unit 800.

The external storage unit 800 is formed by housing a hard disk mechanism to be described later in a case 801 attachable to the camera body 1. The main CPU 208 of the camera body 1 stores (writes) and acquires (reads) arbitrary data to and from this external storage unit 800 while the external storage is attached to the camera body 1. In other words, the external storage unit 800 is configured to output image data transmitted from the camera body 1 (main CPU 208 thereof), thereby functioning as an external storage unit (an external hard disk unit) in cooperation with the camera body 1.

As shown in FIGS. 50 to 51B, this external storage unit 800 is formed by housing the hard disk mechanism to be described later in the case 801 attachable to the concave portion 1A of the camera body 1 (see FIG. 3A) of the first embodiment. As shown in FIG. 51B, in this case 801, a back face 801a facing the back face wall 4 of the camera body 1 and a left side face 801b facing the side face wall 6 of the camera body 1 have configurations, which are similar to those in the imaging unit 2 (or 2') of the first embodiment (see FIG. 3B) so as to be mountable to the concave portion 1A. Since these configurations are similar to those in the imaging unit 2 (or 2') (see FIG. 3B), the same constituents are designated by the same reference numerals and detailed description thereof will be omitted.

In the eighth embodiment, the external storage unit 800 includes a hard disk mechanism 801, an interface 802, and the connector terminal 116 as the connector 11 as shown in FIG. 52. The interface 802 converts signal modes so as to enable communication and data transfer between the main CPU 208 of the camera body 1 and the hard disk mechanism 801. The hard disk mechanism 801 stores the data inputted from the main CPU 208 or reads and outputs the stored data as appropriate in response to signals inputted from the main CPU 208 of the camera body 1 through the connector terminal 116 and the interface 802. The connector terminal 116 constitutes the connector 11, and is similar to the connector terminal 116 (see FIGS. 16 and 17) provided in the imaging unit 2 (or 2') (see FIG. 3B). The power is supplied from the camera body 1 to this external storage unit 800 (hard disk mechanism 801) through the connector terminal 116.

In the eighth embodiment, the main CPU 208 of the camera body can achieve an automatic backup function by use of the external storage unit 800. To be more precise, the main CPU 208 monitors whether there is a connection to a given pin (a camera body side connection detecting pin) in the connector 12. When detecting a connection between the camera body side connection detecting pin and an external storage unit-side connection detecting pin (not shown), the main CPU 208 starts power transmission (supply) between the connector 11 and the connector 12, and also acquires image data information stored in the hard disk mechanism 801. Thereafter, the main CPU 208 compares image data information stored in a storage medium on the camera body 1 side (such as a SD card connected through the SD card interface 215 shown in FIGS. 16 and 17) with the image data information stored in the hard disk mechanism 801, and extract image data which is not stored in the hard disk mechanism 801 out of the image data stored on the camera body 1 side. Then, the main CPU 208 outputs the extracted image data to the connector terminal 201 (12) (see FIGS. 16 and 17) for storage. The external storage unit 800 stores the image data inputted from the main CPU 208 in response to a signal inputted from the main CPU 208 through the connector 116 and the interface 802.

This external storage unit 800 is capable of causing the camera body 1 to function as the external hard disk unit by attaching the external storage unit 800 to the camera body 1 as similar to the imaging unit 2 (or 2') of the first embodiment (see FIG. 3B).

Moreover, since the configuration for attaching the external storage unit 800 to the camera body 1 is similar to that for attaching the imaging unit 2 (or 2') of the first embodiment (see FIG. 3B), it is possible to obtain an effect similar to that of the imaging unit 2 (or 2').

According to the eighth embodiment, the case 801 of the external storage unit 800 is formed into a size capable of being housed into the concave portion 1A of the camera body 1 as shown in FIG. 50. However, since the concave portion 1A of the camera body 1 is open on the three sides, the size of the case 801, i.e. the external storage unit 800 is not particularly limited as long as the connector 11 connectable to the connector 12 provided on the camera body 1 is provided so as to correspond to the configuration of the concave portion 1A. In this case, since the case 801 is configured to be attached to the concave portion 1A of the camera body 1, it is preferable to provide the case 801 with legs or other components for stabilizing the posture when attached to the concave portion 1A, if the case (801) has a larger size as compared to the size of the camera body 1.

The eighth embodiment shows the external storage unit 800 that functions as the external storage unit (external hard disk unit) when attached to the concave portion 1A of the camera body 1. Instead, there may be formed a connector compatible with a storage medium of an external insertion type such as a SD card or formed a connector compatible with a USB cable. In this context, the present invention will not be limited only to the configuration of the eighth embodiment.

Moreover, in the eighth embodiment, in the case 801 of the external storage unit 800, the configurations of the back face 801a and the left side face 801b are similar to those of the imaging unit 2 (or 2') of the first embodiment (see FIG. 3B) in order to allow attachment to the concave portion 1A of the camera body 1 of the first embodiment (see FIG. 3A). However, the back face 801a and the left side face 801b may apply similar configurations to those of the imaging unit 2 (or 2') of the second embodiment (see FIG. 21) in order to allow attachment to the concave portion 1A of the camera body 1 of the second embodiment (see FIG. 19) instead. Alternatively, it is also possible to provide the unit with the structure for allowing attachment to the concave portion 1A which is originally provided on the camera body, and to provide the camera body with the structure which is originally provided on the unit. In this context, the present invention will not be limited only to the configuration of the eighth embodiment.

The body structure according to the present invention exerts the following advantageous effects.

It is possible to attach and detach imaging units having different sizes to and from a common body portion. In addition, relationship between the body portion and the imaging unit can be made more flexible. Accordingly, it is easier to upgrade the body portion and the imaging unit separately.

Moreover, since the body portion does not have a lower face wall, it is possible to downsize the body portion and to enhance freedom of attachment and design.

It is possible to achieve attachment of the imaging unit and connection between the body portion and the imaging unit at the same time.

The imaging unit can be attached to the body portion stably without being loose even when the housing part is open on three sides.

It is possible to relax a torsion stress in engagement, which is added to the two connectors when attaching the imaging unit to the body portion.

It is also possible to ensure connection between the camera body-side connector and the imaging unit-side connector.

There is another advantageous effect that it is possible to hold the imaging unit more stably without looseness.

It is possible to perform a series of operations from unlocking the imaging unit from the body portion to disengagement of the two connectors only by operating the release mechanism. Moreover, since the release mechanism is provided on the body portion, it is possible to avoid an increase in size of the imaging unit which may occur if the release mechanism is provided on the imaging unit.

By providing the release mechanism on the imaging unit, it is possible to form the downsized and compact body portion.

Since there is provided an image processing circuit for processing an image acquired by the imaging device, it is possible to prevent deterioration of an object image acquired by the imaging device.

There are also advantageous effects that it is possible to relax a torsion stress in engagement which is added to the two connectors when the imaging unit is attached to the body portion, and that it is possible to hold the imaging unit stably without looseness.

It is possible to attach the imaging unit more stably to the body portion without looseness.

There is also an advantageous effect that it is possible to prevent the imaging unit from coming off from the body portion unexpectedly.

It is possible to perform a series of operations from unlocking the imaging unit from the body portion to disengagement of the two connectors only by operating the release mechanism.

The body portion and the imaging unit can be made more compact.

When setting the imaging unit on the body portion, the imaging unit disposed inside the housing part by being attached to the back face portion of the body portion and then moved toward the sidewall portion. Accordingly, it is possible to ensure connection between the imaging unit and the body portion. Here, in a case of pulling the imaging unit out of the body portion, the imaging unit can be pulled out of the body portion by a series of operations from unlocking to pulling out without applying an excessive force to the imaging unit.

It is possible to push the imaging unit into the housing part in front-to-back direction and then move the imaging unit sideways. Accordingly, it is possible to ensure connection between the imaging unit and the body portion. Moreover, the imaging unit can be securely fitted to the concave portion while locking the imaging unit on the body portion.

It is possible to pull the imaging unit out of the body portion without applying an excessive force to the imaging unit.

Although several embodiments have been described, it is to be understood that the imaging apparatus according to the present invention can also be formed by combining the configurations of the respective embodiments as appropriate.

In the above-described embodiments, the engaging groove as a body attachment position is formed on the camera body 1 by use of the connector cover member. However, the engaging groove only needs to be configured to dispose the body-side connector body while enabling the connection to the connector (unit-side connector body) 11 of the imaging unit 2 attached to the concave portion 1A (so as to communicate with the concave portion). In this context, the configuration of the engaging groove will not be limited to those described in the embodiment.

Moreover, the configuration of the imaging apparatus is not limited to the structure described in the embodiments. For example, as shown in FIGS. 29 to 32, the imaging apparatus may be provided with a hot shoe portion 5d to which a strobe device or an electronic viewfinder 1g can be attached, an electronic viewfinder connection terminal 5e, the strobe light source 5b of a pop-up type, and a mode dial switch 5h on an upper face 1f of the upper face portion 1D of the camera body 1. Here, the electronic viewfinder connection terminal 5e shown in FIG. 29 applies a female type connector, and an electronic view finder connection terminal 5e' applying a male type connector as shown in FIG. 31 is engaged with this electronic viewfinder connection terminal 5e.

Figure 30:
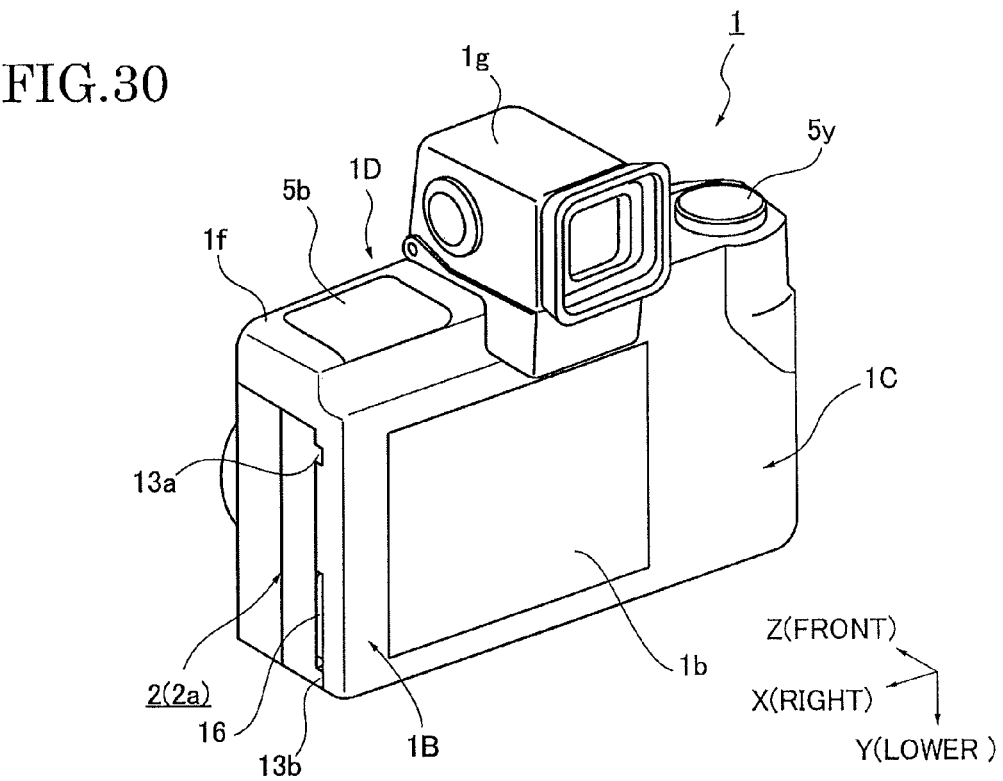
FIG. 30 is an external view showing a state of the camera body viewed from the back face side when the electronic viewfinder is attached to the camera body.
Figure 31:
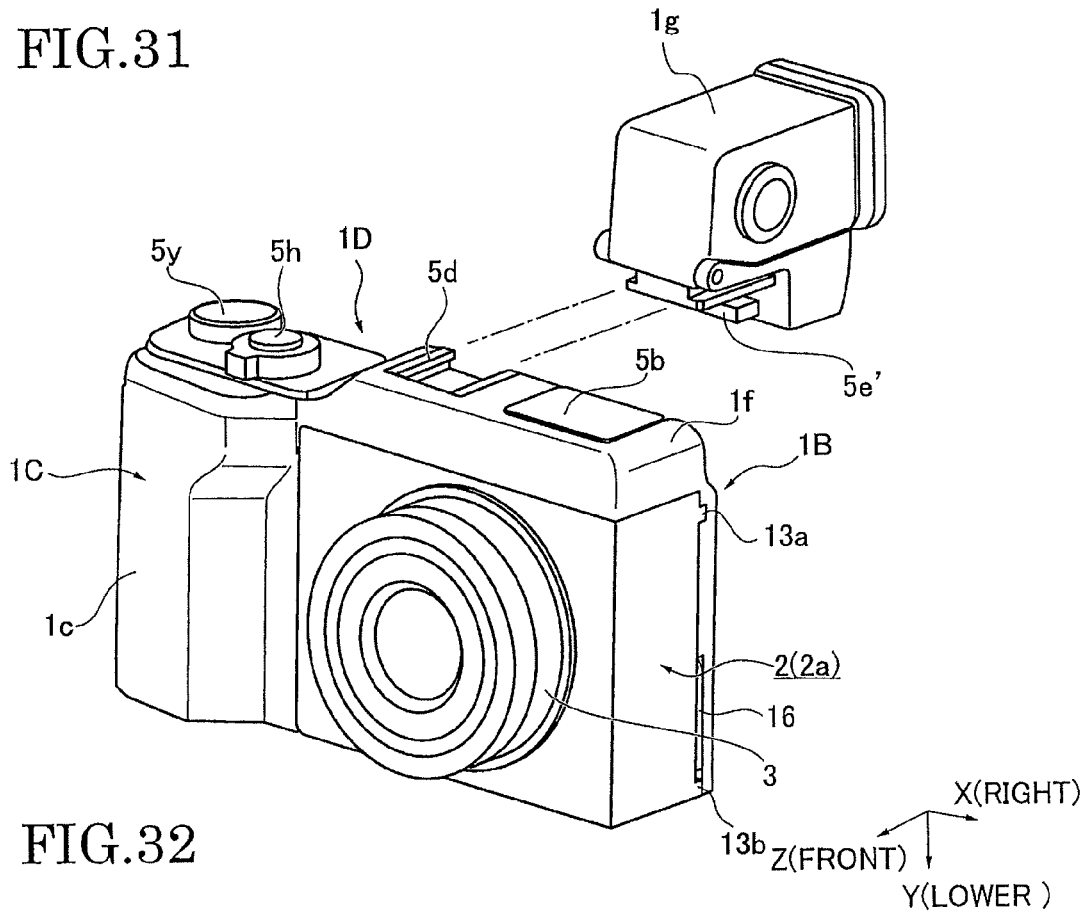
FIG. 31 is an external view showing the state of the camera body viewed from a front face side before the electronic viewfinder is attached to the camera body.
Figure 32:
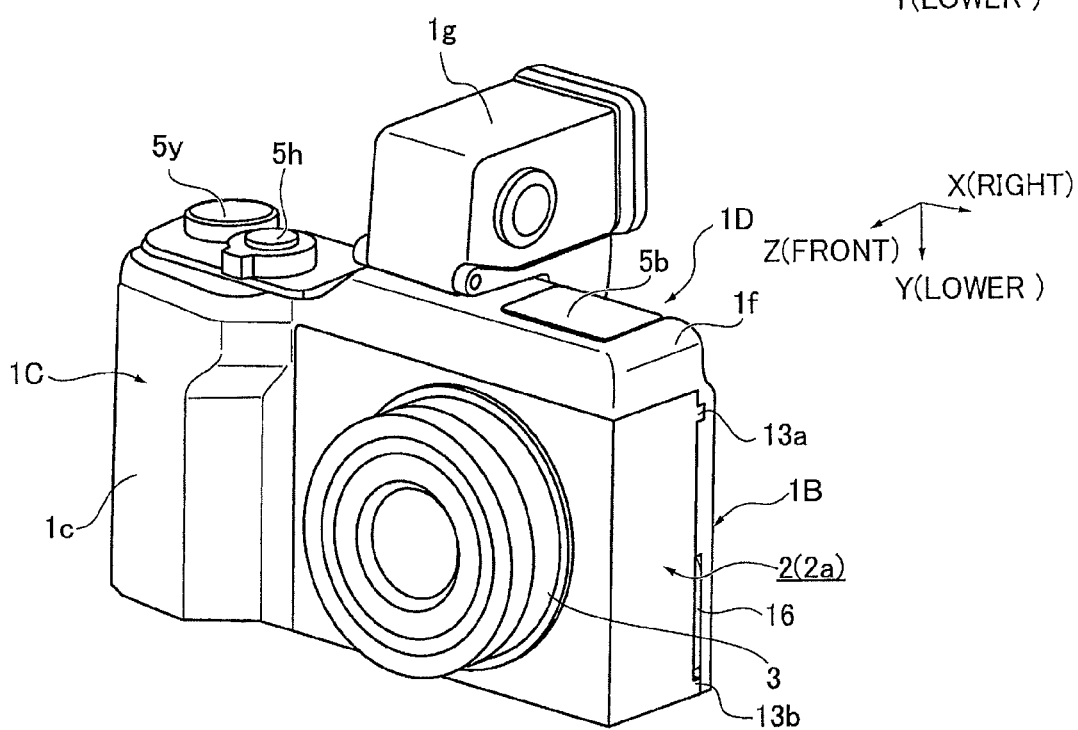
FIG. 32 is an external view showing the state of the camera body viewed from the front face side when the electronic viewfinder is attached to the camera body.

In FIGS. 29 to 32, FIG. 29 illustrates a state of the camera body 1 viewed from the back face side before the electronic viewfinder 1g is attached to the camera body 1. FIG. 30 illustrates a state of the camera body 1 viewed from the back face side when the electronic viewfinder 1g is attached to the camera body 1. FIG. 31 illustrates the state of the camera body 1 viewed from the front face side before the electronic viewfinder 1g is attached to the camera body 1. FIG. 32 shows the state of the camera body 1 viewed from the front face side when the electronic viewfinder 1g is attached to the camera body 1.

In the aforementioned embodiments, the housing part has a rectangular shape in which a front wall, one of opposite side walls, and a back wall are opened, and consequently, the housing part is formed by one side wall, an upper wall and a back wall. The housing part is not limited to such a configuration. For example, the housing part may be formed to have at least a back wall, and a rock mechanism may be provided on the back wall. Furthermore, the housing part is not limited to the rectangular shape, and may be formed to have a circular outer circumferential portion. In this case, the circular outer circumferential portion is configured to have openings formed from one side and down directions, and the openings are communicated adequately, thereby a body portion having a housing part in which an imaging unit is contained can be provided.

Although the preferred embodiments of the present invention have been described, it should be understood that the present invention is not limited to these embodiments, various modifications and changes can be made to the embodiments.

The invention claimed is:

1. A body structure comprising a body portion configured so that an imaging unit is to be attached to and detached from the body portion, the imaging unit including a fitted portion and at least an optical system provided on the fitted portion, wherein the body portion includes a housing part in which the fitted portion of the imaging unit is to be detachably housed, and at least three walls of walls that close the housing part are opened; and wherein the walls of the housing part include a plurality of walls orthogonal to one another, and at least three walls of the plurality of walls that close the housing part are opened;

wherein the body portion includes a display device for displaying an image captured by the imaging unit; and wherein, when the imaging unit is attached to the body portion, a front wall of the body portion close to the imaging unit along an optical axis of the imaging unit, one of two sidewalls in a horizontal direction perpendicular to the optical axis, and one of an upper wall and a lower wall in a vertical direction perpendicular to the optical axis are opened, and wherein the body portion includes a back face portion, the back face portion faces away from the front wall of the body portion, the display device is located on the back face portion, and the display device faces away from the front wall of the body portion.

2. The body structure according to claim 1, wherein the imaging unit further includes an imaging device provided on the fitted portion.

3. The body structure according to claim 1, further comprising a locking mechanism which is provided between the body portion and the fitted portion and which is configured to lock the fitted portion on the body portion when the fitted portion of the imaging unit is housed in the housing part.

4. The body structure according to claim 3, further comprising a release mechanism configured to unlock the locking mechanism.

5. The body structure according to claim 4, further comprising: a first electric circuit unit included in the imaging unit; a second electric circuit unit included in the body portion; and an electrical connection mechanism provided between the fitted portion and the body portion and configured to electrically connect the first electric circuit to the second electric circuit when the fitted portion of the imaging unit is housed in the housing part, wherein the release mechanism is configured to perform a series of operations from an operation to unlock the imaging unit by the locking mechanism to an operation to unlock the electrical connection mechanism.

6. The body structure according to claim 1, further comprising: a first electric circuit unit included in the imaging unit; a second electric circuit unit included in the body portion; and an electrical connection mechanism provided between the fitted portion and the body portion and configured to electrically connect the first electric circuit to the second electric circuit when the fitted portion of the imaging unit is housed in the housing part.

7. The body structure according to claim 1, further comprising a guide mechanism provided between the fitted portion of the imaging unit and the body portion, the guide mechanism being configured to guide the fitted portion of the imaging unit when the fitted portion of the imaging unit is housed in the housing part.

8. The body structure according to claim 1, wherein any one of a plurality of types of external units inclusive of the imaging unit is attachably and detachably housed in the housing part, and the external units have mutually different functions.

9. The body structure according to claim 1, wherein a container chamber is formed in the body portion, and the container chamber houses any of a battery, a circuit used for controlling the imaging unit, a processing circuit configured to process an image taken by the imaging unit, a storage medium configured to record and to store the image taken by the imaging unit, a power circuit, a strobe control circuit, and a circuit board on which circuit components constituting any of these constituents are mounted.

10. A body structure comprising a body portion configured so that an imaging unit is to be attached to and detached from the body portion, the imaging unit including a fitted portion and at least an optical system provided on the fitted portion, wherein the body portion includes a housing part in which the fitted portion of the imaging unit is to be detachably housed, and at least three walls of walls that close the housing part are opened; and wherein the walls of the housing part include a plurality of walls orthogonal to one another, and at least three walls of the plurality of walls that close the housing part are opened;

wherein the body portion includes a display device for displaying an image captured by the imaging unit; and wherein the imaging unit is any of a first imaging unit and a second imaging unit, the first imaging unit including a first optical system, a first imaging device, and a first imaging unit-side connector, the second imaging unit including a second optical system, a second imaging device, and a second imaging unit-side connector, each of the first imaging unit and the second imaging unit is attachable to and detachable from the housing part, the second imaging device has a different size from the first imaging device, and the second imaging unit has a different size from the first imaging unit.

11. A body structure comprising a body portion configured so that an imaging unit is to be attached to and detached from the body portion, the imaging unit including a fitted portion and at least an optical system provided on the fitted portion, wherein the body portion includes a housing part in which the fitted portion of the imaging unit is to be detachably housed, and at least three walls of walls that close the housing part are opened; and wherein the body structure further comprises a guide mechanism provided between the fitted portion of the imaging unit and the body portion, the guide mechanism being configured to guide the fitted portion of the imaging unit when the fitted portion of the imaging unit is housed in the housing part;

wherein the guide mechanism includes a biasing portion configured to bias the imaging unit toward a back side of the body portion in a state where the imaging unit is attached to the body portion; and wherein the biasing portion includes: at least two engagement claws formed on the imaging unit; at least two engagement plate portions which are formed on the body portion and which respectively face the engagement claws in a state where the imaging unit is attached to the body portion; and at least two biasing springs provided on surfaces of the engagement plate portions, the surfaces being opposed to the engagement claws, the biasing springs being engaged with the engagement claws to bias the imaging unit toward the back side of the body portion.

* * * * *